US009038377B2

(12) United States Patent
Anteau

(10) Patent No.: US 9,038,377 B2
(45) Date of Patent: May 26, 2015

(54) POWER GENERATOR

(71) Applicant: Mark R. Anteau, Columbus, OH (US)

(72) Inventor: Mark R. Anteau, Columbus, OH (US)

( * ) Notice: Subject to any disclaimer, the term of this patent is extended or adjusted under 35 U.S.C. 154(b) by 0 days.

(21) Appl. No.: 14/160,972

(22) Filed: Jan. 22, 2014

(65) Prior Publication Data

US 2014/0130497 A1 May 15, 2014

Related U.S. Application Data

(63) Continuation-in-part of application No. 13/537,046, filed on Jun. 28, 2012, and a continuation-in-part of application No. 14/133,637, filed on Dec. 18, 2013, which is a continuation-in-part of application No. 13/537,046, filed on Jun. 28, 2012.

(60) Provisional application No. 61/501,870, filed on Jun. 28, 2011, provisional application No. 61/755,204, filed on Jan. 22, 2013, provisional application No. 61/738,693, filed on Dec. 18, 2012.

(51) Int. Cl.
*F16D 31/02* (2006.01)
*F03B 17/00* (2006.01)
*F03G 7/04* (2006.01)
*F03B 17/02* (2006.01)

(52) U.S. Cl.
CPC .............. *F03B 17/005* (2013.01); *Y02E 10/20* (2013.01); *F03G 7/04* (2013.01); *F03B 17/025* (2013.01)

(58) Field of Classification Search
CPC ........ F03B 15/00; F03B 15/14; F03B 17/005; F03B 17/02; F03B 17/025; F03B 7/04
USPC .......................... 60/398, 495–507; 290/42, 53
See application file for complete search history.

(56) References Cited

U.S. PATENT DOCUMENTS

| 3,648,458 | A | * | 3/1972 | McAlister | 60/415 |
|---|---|---|---|---|---|
| 4,450,690 | A | * | 5/1984 | Clark, Jr. | 62/116 |
| 4,617,801 | A | | 10/1986 | Clark, Jr. | |
| 4,819,697 | A | | 4/1989 | Randa et al. | |
| 4,883,411 | A | * | 11/1989 | Windle | 417/331 |
| 5,329,497 | A | | 7/1994 | Previsic et al. | |
| 5,426,332 | A | | 6/1995 | Ullman et al. | |
| 6,250,199 | B1 | * | 6/2001 | Schulte et al. | 91/4 R |
| 7,926,501 | B2 | * | 4/2011 | Springett et al. | 137/14 |
| 2010/0194116 | A1 | * | 8/2010 | Mahawili | 290/55 |
| 2011/0258996 | A1 | | 10/2011 | Ingersoll et al. | |
| 2012/0167563 | A1 | | 7/2012 | Cherepashenets et al. | |

* cited by examiner

*Primary Examiner* — Craig Schneider
*Assistant Examiner* — Angelisa Hicks
(74) *Attorney, Agent, or Firm* — Standley Law Group LLP

(57) ABSTRACT

The power plant disclosed is an engine that derives its usefulness in the pursuit of energy generation by utilizing hydrostatic pressure differentials found or created in various liquids, gases or solutions, such as but not limited to water and air. It is generally provided as a two-stroke piston cycle power generating system, wherein the actions of the pistons perform work or replenish working fluid from a lower head to a higher head, and can be utilized to generate power, pump fluids, or perform work, for example. Multiple power generating systems are interconnected to provide continuous and constant power generation through a penstock and turbine system.

10 Claims, 38 Drawing Sheets

POWER GENERATOR

CROSS-REFERENCE TO RELATED APPLICATIONS

This application claims priority to, the benefit of, and is a continuation in part of co-pending U.S. patent application Ser. No. 14/133,637 filed 18 Dec. 2013, a continuation in part of co-pending U.S. patent application Ser. No. 13/537,046 filed 28 Jun. 2012, and also claims priority to and the benefit of U.S. Provisional Application No. 61/755,204 filed 22 Jan. 2013, the content of each of which being hereby incorporated by reference as if fully recited herein.

TECHNICAL FIELD

This disclosure relates to the field of power generation, and more specifically to power generation systems and methods based on renewable energy and pressure differential principles.

BACKGROUND OF THE INVENTION

As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy.

A particularly salient obstacle to power generation is the power input needed for use in the generation scheme. The input power required will inherently reduce the efficiency, and therefore the viability of, the system. Therefore, there is a need for a power generation scheme that utilizes natural phenomenon to both reduce the input power required to operate the system and to provide an energy source greater than the input power that the system can convert to a form of usable energy.

Previous work by the inventor has disclosed a power generation system based upon the use of, in combination or in part, natural pressure gradients, fluid flow and buoyant forces, for example in U.S. patent application Ser. No. 13/537,046. While those disclosed systems and methods have been shown to be effective in power generation, there remains further need for efficiency gains and variations upon these systems and methods in order to meet society's ever-growing energy needs effectively and in an environmentally friendly manner.

BRIEF SUMMARY OF THE INVENTION

Exemplary embodiments of the present disclosure pertain to power generation systems of reusable and renewable energy sources, and improvements thereon having increased efficiencies. An object of the invention is to provide an apparatus for generating power from a fluid in a reservoir having a power station, a first return system in fluid receiving connection with a first power chamber of the power station at a first attachment point, a second return system in fluid receiving connection with a second power chamber of the power station at a second attachment point, and a means for reciprocally draining and filling the first and second pontoon chambers of the power station. The power station is further provided with a first power chamber having an external valve actuatable to control flow of the fluid between the reservoir and the first power chamber, a first upper coil tube having fixed and free ends, the fixed end thereof being secured at a first upper seal to an interior wall of the first power chamber, and the free end thereof forming a first movable boundary, a first lower coil tube having fixed and free ends, the fixed end thereof being secured at a first lower seal to the interior wall of the first power chamber below the first upper seal, whereby the first upper seal and the first lower seal define a first pontoon chamber, a first pontoon positioned between the free ends of the first upper coil tube and the first lower coil tube, a second power chamber having an external valve actuatable to control flow of the fluid between the reservoir and the second power chamber, a second upper coil tube having fixed and free ends, the fixed end thereof being secured at a second upper seal to an interior wall of the second power chamber, and the free end thereof forming a second movable boundary, a second lower coil tube having fixed and free ends, the fixed end thereof being secured at a second lower seal to the interior wall of the second power chamber below the second upper seal, whereby the second upper seal and the first lower seal define a second pontoon chamber, a second pontoon positioned between the free ends of the second upper coil tube and the second lower coil tube, a connecting pipe coupled to the first power chamber and the second power chamber, and a constant volumetric flow region defined by the first movable boundary and the second movable boundary, wherein the first and second movable boundaries move synchronously, thereby maintaining the volume of the constant volumetric flow region during movement induced by pressure differentials in the power station.

Another object of the invention is to provide the apparatus with an integral return station in fluid receiving connection with the first return system and the second return system. The integral return station may be adapted to receive fluid from the first return system at a first fountain connection and from the second return system at a second fountain connection by hydrostatic pressure. It may also be provided with at least one return station pump adapted to pump the fluid received by the integral return station into the reservoir.

Another object is to alternatively, or in combination, provide the return systems with a first return station in fluid receiving connection with the first return system at a first return station valve, a second return station in fluid receiving connection with the first return system at a second return station valve, a third return station in fluid receiving connection with the second return system at a third return station valve, and a fourth return station in fluid receiving connection with the second return system at a fourth return station valve, wherein each return station further comprises a return station pump adapted to pump the fluid received by the return station into the reservoir. The return stations may alternate receiving fluid from a return system and reciprocally empty the fluid contents.

Yet another object of the invention is to provide the means for reciprocally draining and filling the first and second pontoon chambers as, for each pontoon chamber: a middle pontoon chamber compartment coupled to the pontoon chamber at a middle compartment valve, a lower pontoon chamber compartment coupled to the pontoon chamber at a lower compartment valve, a pontoon chamber pump adapted to pump working fluid from the lower pontoon chamber compartment to the reservoir, and a pontoon chamber filling valve in fluid connection with the fluid in the reservoir.

Another object of the invention is to provide a means for replenishing a dam. The means for replenishing a dam may be a replenishment system adapted to return fluid from a low head side of a penstock to a high head side of the penstock.

An additional object of the invention is to provide a return connecting pipe in actuatable fluid connection with the first and second pontoon chambers and the first and second pontoons at an upper position in each of the first and second pontoon chambers, a penstock in fluid receiving connection with the return connecting pipe at a penstock inlet valve, a turbine chamber in fluid receiving connection with the penstock, and a common feed pipe in actuatable fluid connection with the first and second pontoon chambers and the first and second pontoons at a lower position in each of the first and second pontoon chambers, and in actuatable fluid receiving connection with the turbine chamber, wherein the common feed pipe is adapted to transfer fluid from the turbine chamber reciprocally to the first and second pontoons at the lower position, the first and second pontoons are adapted to reciprocally transport the fluid to the upper position and transfer the fluid to the penstock via the penstock inlet valve and the return connecting pipe.

Yet another object of the invention is served wherein the means for reciprocally draining and filling the first and second pontoon chambers is provided including a first middle pontoon chamber compartment coupled to the first pontoon chamber at a first middle compartment valve and adapted to receive a first portion of the fluid in the first pontoon chamber via the first middle compartment valve to partially drain the first pontoon chamber, and a second middle pontoon chamber compartment coupled to the second pontoon chamber at a second middle compartment valve and adapted to receive a first portion of the fluid in the second pontoon chamber via the second middle compartment valve to partially drain the second pontoon chamber, wherein a second portion of the fluid in the first pontoon chamber is adapted for draining into the second pontoon via the common feed pipe and a second portion of the fluid in the second pontoon chamber is adapted for draining into the first pontoon via the common feed pipe.

These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Figure 1:
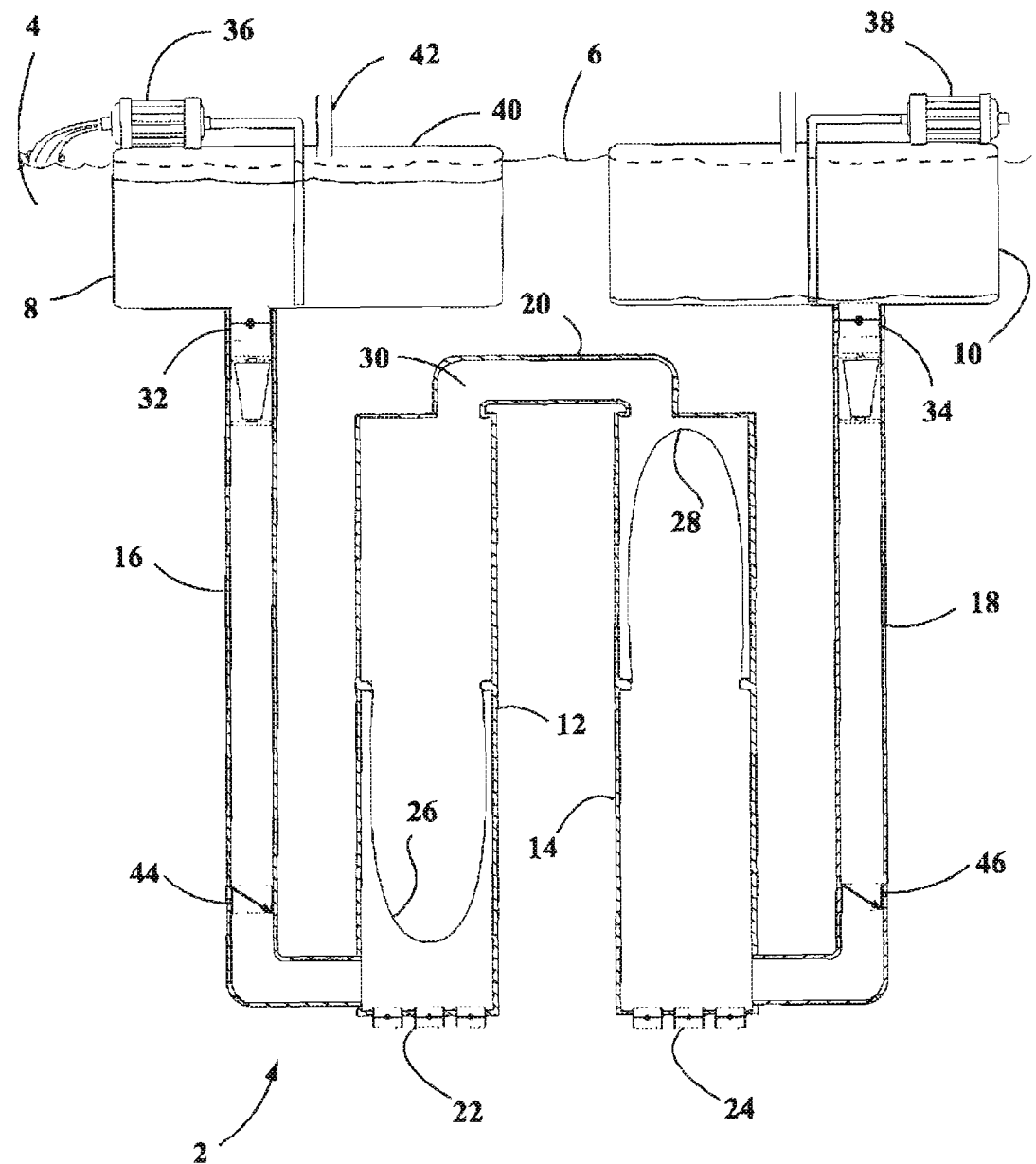
FIG. 1 depicts a first exemplary embodiment of the invention utilizing fluid flow turbine generators to generate power at the beginning of a stroke.

The invention is a power generation plant that incorporates new efficient systems and methods of extracting and converting energy through fluid flow based upon renewable energy. It preferably provides a constant rate of power twenty-four hours a day for as long as necessary. It is designed to provide alternating current (AC), direct current (DC), or any other desired type of electricity, a direct mechanical force to perform work, or a combination thereof.

The invention can be perceived as an engine that runs on water or some other suitable liquid, gas, or combination of liquids and gases, which make up the "fuel" that operates its two-stroke piston cycle. As will be explained in further detail below, the invention is modular in that many of the embodiments described herein may be interconnected (e.g., daisy-chained) to form more complicated systems that may be more properly categorized as multi-stroke systems. Therefore, the use of the term stroke is meant to be illustrative and for explanatory purposes only, and should not be perceived as limiting the claimed invention.

Fluid flow through the system due to pressure differentials performs the work. Two examples of such work that can be performed are electricity generation and pumping fluids. Direct mechanical work can be performed as needed as well, depending on the application and environmental circumstances.

The invention is made up of a power station that performs work and a return system that evacuates the water from the power plant and returns it back to the head. The exact specifications disclosed herein including, but not limited to shapes, sizes, positioning of components, the elevation/depth of components and materials utilized will be chosen by those skilled in the art to meet particular application parameters, and should be tested for maximum efficiency. Additionally, any design specifications mentioned in this document are merely illustrative of the operation of the overall system. These calculations and tests are within the abilities of one skilled in the art of power generation and fluid dynamics, enabling them to practice the invention disclosed herein without undue experimentation or further invention.

Additionally, the diagrams that are presented herein merely serve to facilitate the explanation of the principles of operation of the invented system and its various methods of operation and are not meant to imply exact scale of any particular design that has been engineered for a specific purpose. The relative volumes and configurations of various power plant components, which will vary according to individual needs and certain applications, will be of particular importance to efficiency results. The physical dimensions of certain features depicted in the figures that follow have been exaggerated in order to more clearly explain the principles taught by this disclosure, and thus it should be understood that the functionality described herein is not considered to be limited by physical dimension.

Furthermore, the structural frame supporting the power plant, the support frame and configuration of pontoons, as well as mechanical systems, electronic devices, and general control systems utilized in the operation of this system are not described but they are implied. Control systems will need to be employed in any given application of the invention to operate doors and coordinate the timing of the various systems, pumps, doors, multiple return stations, etc. Control systems and electronic devices can include but are not limited to computers, smart boards, motors, microwave devices, sensors and solenoids required to operate doors, pumps, valves, vents, generator connections and other operational systems. Again, the design of these systems and devices is within the ability of one skilled in the relevant arts without undue experimentation or further invention, and may vary depending on the particular application on which the invention is being implemented.

The invention can operate in various environments such as but not limited to: lakes, oceans, above ground, below ground, under water, space stations, man-made reservoirs (including tanks), in open atmosphere, combinations thereof, and other environments. Placing the invention in a man-made reservoir enables this type of power plant to operate away from large sources of water such as but not limited to: oceans, lakes, and rivers. The water supply for the man-made reservoir can be supplied by items such as but not limited to: a pipe system, water tankers (trains, trucks, ships, barges, planes, jets, helicopters, blimps), and underground water, or it may be entirely self supplied wherein no additional working fluids or solutions are necessary once the system is filled appropriately and started. The size of this type of reservoir and the size of the system being placed inside of it depends upon the amount of work or electricity desired. For the purposes of this disclosure, the term "reservoir" shall be taken to encompass any receptacle, container or fluid body generally, whether open or closed, or formed naturally or made by man.

Although this specification discloses the invention primarily using water and air in its operation, any suitable liquid, gas or solution can be substituted or combined if desirable for a particular application. One example would be to add something to the water to inhibit the water from freezing in very cold climates. Another might utilize natural liquids or gases present nearest to the point of power need, such as bodily fluids for small applications. If something is used other then water to generate electricity by the power plant that is environmentally unfriendly, then the invention may need to be placed in a man-made reservoir and its water supply recycled so there is no adverse impact on the environment.

This type of power plant can be built and operated as a source for distributed allocation of electric power allowing it to provide electricity to a power grid system. Connecting the invention to a power grid system would allow the power plant to provide electricity to large regions such as but not limited to towns, cities, counties, districts, provinces and states. The invention can also be implemented as a single free standing unit or a system of interconnecting units to provide electricity to specific facilities such as but not limited to: manufacturing plants, shopping malls, stores, office buildings, hospitals, military bases, multifamily residences, single family homes, ocean liners, cargo ships, oil tanker ships, naval vessels as well as other facilities. Additionally, the invention can be implemented as a portable unit to provide electricity for: military camps and mobile combat units, commercial functions like fairs and construction sites, private uses like camping and recreation, as well as providing electricity to other entities and other functions. The system is scalable in size, for example being scaled down to power an artificial heart or pump blood. The operation of the invention in a tank—whether external or self contained—allows it to be utilized in various environments as a source for distributed allocation of electricity, as a single freestanding unit or system, and as a portable unit. It can be used on-site at, for instance, oil and gas well locations as a means for pumping materials to the surface. It can be scaled up or down in size to meet the desired requirements.

The plant's return system can be incorporated into existing hydroelectric power plants to enable them to return water back to the head at considerable energy and economic savings. This will allow these existing hydroelectric power plants to preferably operate 24 hours a day for as long as necessary without severely affecting the water level of the head and at the same time allowing the power plant to become increasingly economically efficient and environmentally friendly. Additionally, parts of the invented system can be added to submarines and other entities to improve their efficacy in evacuating water from their ballast tanks, as well as improve the energy consumption during the transmission of low-pressure fluids into higher-pressure fluids. The aforementioned examples represent only two of many ways in which the invention or components of the invention can be incorporated to enhance current technology.

The system generates electricity that can be used outside the power plant because a natural source of reusable and renewable energy—e.g., water—provides the vast majority of the work needed to generate the power or electricity, and that same water is recycled or reused in the power plant to help evacuate the water that enters the power plant in a synergistic manner, and because hydrostatic pressure maintains the head of water in the connecting pipes between the power chambers and their respective pumping and other subsystems at points of discharge from the power plant. The force of some embodiments' pontoon subsystems are in a state of potential energy when they are at rest either at the top or bottom of their respected pontoon chambers—depending on the particular configuration being employed. When the pontoons move downward or upward in their power stroke, their potential energy transforms into kinetic energy. Since the driving force behind the pontoons is buoyancy, use of the pontoons can provide a free source of natural energy.

The same principles apply to systems placing the connecting rod systems and the coil tube systems at or just below a state of neutral buoyancy. The skilled artisan may employ the state of buoyancy that best accomplishes the goals of the invention in accordance with a particular application. References to neutral or nearly-neutral buoyancy herein thus refer to component buoyancy states that may be static or altered or adjusted during operation of the invention to achieve desired positive, negative or neutral buoyant forces with respect to the weight of a component.

Turning to FIG. 1, the basic principles that serve as a basis for the current invention are described. FIG. 1 depicts the general principles and features of the invention in an embodiment of a proof-of-concept model. The power system 2 is generally depicted secured within a body of water or reservoir 4 having a surface level 6. The fluid in which the power system 2 operates need not be water and can consist of any nearly incompressible fluid with comparable characteristics. Water was merely chosen as the preferred medium due to its natural pervasiveness and ease of use, and is used throughout this disclosure for illustrative, but not limiting, purposes.

A basic feature of the invention is the continuous and cyclical filling of return chambers that occurs as the fluid within the boundaries of the power system 2 reaches equilibrium pressure levels when exposed to the surrounding reservoir 4. For example, FIG. 1 depicts a first holding tank 8 and a second holding tank 10. The first holding tank 8 and the second holding tank 10 are each connected to a first power chamber 12 and a second power chamber 14, respectively. The first holding tank 8 is connected to the first power chamber 12 via a first evacuation tube 16, and the second holding tank 10 is connected to the second power chamber 14 via a second evacuation tube 18. The volumes of both the first power chamber 12 and the second power chamber 14 are connected via a connecting pipe 20 to enable fluid flow between the chambers 12 and 14.

Both the first power chamber 12 and the second power chamber 14 can be put in fluid flow connection with the reservoir 4 external to the power system 2 via a first power chamber external valve 22 and a second power chamber external valve 24, respectively. The first 22 and second 24 power chamber external valves may actually consist of multiple gates or valves positioned across the bottom of the first 12 and second 14 power chambers, or a single gate or valve configuration may be used. Depending on the application demands, multiple, smaller gates as shown in FIG. 1 may be desirable if short cycle times are required and it is determined that such a configuration allows for a smaller transition to full flow capacity than that available with a single, larger gate. Throughout this disclosure, the terms first and second power chamber external valve should be construed as covering both multiple or single valve configurations for convenience.

The first power chamber 12 includes a first elastic boundary 26 comprised of an elastic material and separating a top portion of the first power chamber 12 from the bottom portion of the first power chamber 12 with respect to fluid flow. The first elastic boundary 26 can be expanded and contracted as needed, and transmits pressure changes through the boundary while inhibiting fluid flow between the top and bottom portions of the first power chamber 12. Likewise, the second power chamber 14 includes a second elastic boundary 28 having similar characteristics. In the particular configuration shown in FIG. 1, these elastic boundaries 26 and 28 are included as helpful visualizations and are illustrative of the operation of the proof-of-concept model. They define a constant volumetric flow region 30 that includes the top portion of both the first 12 and second 14 power chambers, as well as the interior of the connecting pipe 20. The movement of the constant volumetric flow region bounded by the elastic boundaries 26 and 28 (which experiences no or a de minimus change in the volume of fluid contained therein) in the following detailed description of FIG. 1 and the figures that follow will illustrate principles of the current invention.

Each holding tank is connected to the distal end of its corresponding evacuation tube. At each connection point exists a holding tank valve, such as the first holding tank valve 32 for the first holding tank 8 and a second holding tank valve 34 for the second holding tank 10. The main purpose of the holding tanks is to receive a volume of fluid as it flows through the system, isolate it from the rest of the system, and return its contents into the fluid body reservoir 4 by pumping the short head of fluid contained within. Note that the valves 32 and 34 may be positioned elsewhere, such as at the proximal end of the evacuation tubes 16 and 18, respectively. Also, each evacuation chamber can optionally include various check valves, such as the first evacuation tube check valve 44 for the first evacuation tube 16 and the second evacuation tube check valve 46 for the second evacuation tube 18.

For example, FIG. 1 shows a first holding tank pump 36 and a second holding tank pump 38, for example velocity pumps such as centrifugal pumps, although any suitable pump type may be chosen by those skilled in the art. Each is to be used to return fluid in its corresponding holding tank to the fluid body reservoir 4 once the filling of the holding tank is complete and it is isolated in fluid flow from the rest of the system by the closing of the corresponding holding tank valve. Here, the first holding tank 8 has been filled and isolated from the first evacuation tube 16, and the first holding tank pump 36 has begun evacuating the fluid from the first holding tank 8 thereby returning it to the fluid body reservoir 4.

Several considerations should be noted with respect to the holding tanks and their configurations. First, each holding tank used in an application should generally and preferably be shaped with a large horizontal area relative to the height of the holding tank. Such a configuration will lower the work that must be done by the holding tank pump to return the fluid to the fluid body by reducing the elevation head across the pumping cycle.

Second, the holding tanks may, but need not necessarily be, open to atmospheric pressure, as such a configuration will allow the system to return to equilibrium with the exterior environment more easily, increases overall plant efficiency, and may avoid complications caused by pumping in a vacuum, such as the avoidance cavitation issues. For example, as shown in FIGS. 1-4, the top surface 40 of the first holding tank 8 can be either closed to create a sealed enclosure, or it can be open to the atmosphere. Alternatively, actuatable air valves can be contained within vents, such as at 42, in order to achieve the characteristics of having the holding tanks open to the atmosphere above the fluid body reservoir 4.

FIG. 1 depicts the power system 2 in a state in which the constant volumetric flow region 30 is shifted largely into the first power chamber 12. That is, the majority of the fluid volume defined by the first 26 and second 28 elastic boundaries is positioned within the first power chamber 12. The first holding tank 8 has just been filled with water. The first holding tank valve 32 has been closed, and the first holding tank pump 36 has commenced evacuation of the water back into the reservoir 4. The second holding tank 10 is empty and the second holding tank valve 34 is closed.

Figure 2:
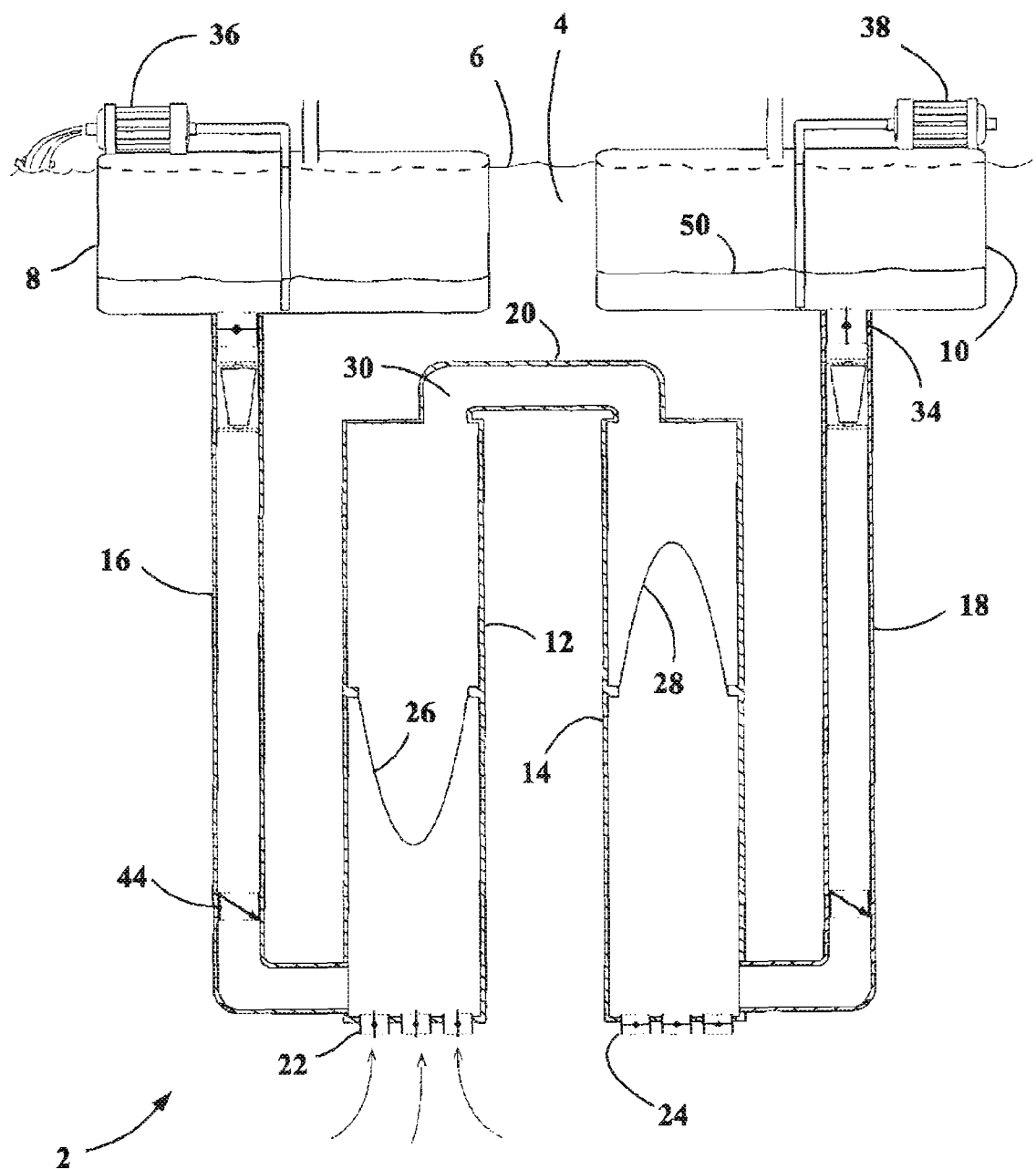
FIG. 2 depicts the embodiment shown in FIG. 1 at a further stage in the stroke.

Turning to FIG. 2, the first power chamber external valve 22 on the first power chamber 12 is opened, allowing higher-pressure water to flow into the first power chamber 12. It should be noted that efficiency might be increased by restricting flow between the first power chamber 12 and the first evacuation tube 16 just prior to and during the opening of the first power chamber external valve 22. Simultaneously or nearly simultaneously to the opening of the first power chamber external valve 22, the second holding tank valve 34 is opened. The empty second holding tank 10, which was recently emptied by the second holding tank pump 38, now experiences a pressure differential at the second holding tank valve 34 boundary. Consequently, the water in the power system 2 tends to flow in the direction of the second holding tank 10 in an attempt to return to equilibrium with the environment. The water level 50 begins to rise as water flows into the second holding tank 10 and will continue to rise until approximately even with the reservoir water level 6.

As the water flows into the first power chamber 12 from the reservoir 4, the volume of water in the lower portion of the first power chamber 12 increases, forcing the constant volumetric flow region 30 to shift towards the second power chamber 12 as the water in the lower portion of the second power chamber 12 flows into the second evacuation tube 18 and further into the second holding tank 10. During the filling process for the second holding tank 10, the first holding tank pump 36 can continue to evacuate the contents of the first holding tank 8 in isolation from the rest of the system 2. The second power chamber external valve 24 remains closed during this stroke of the cycle.

Figure 3:
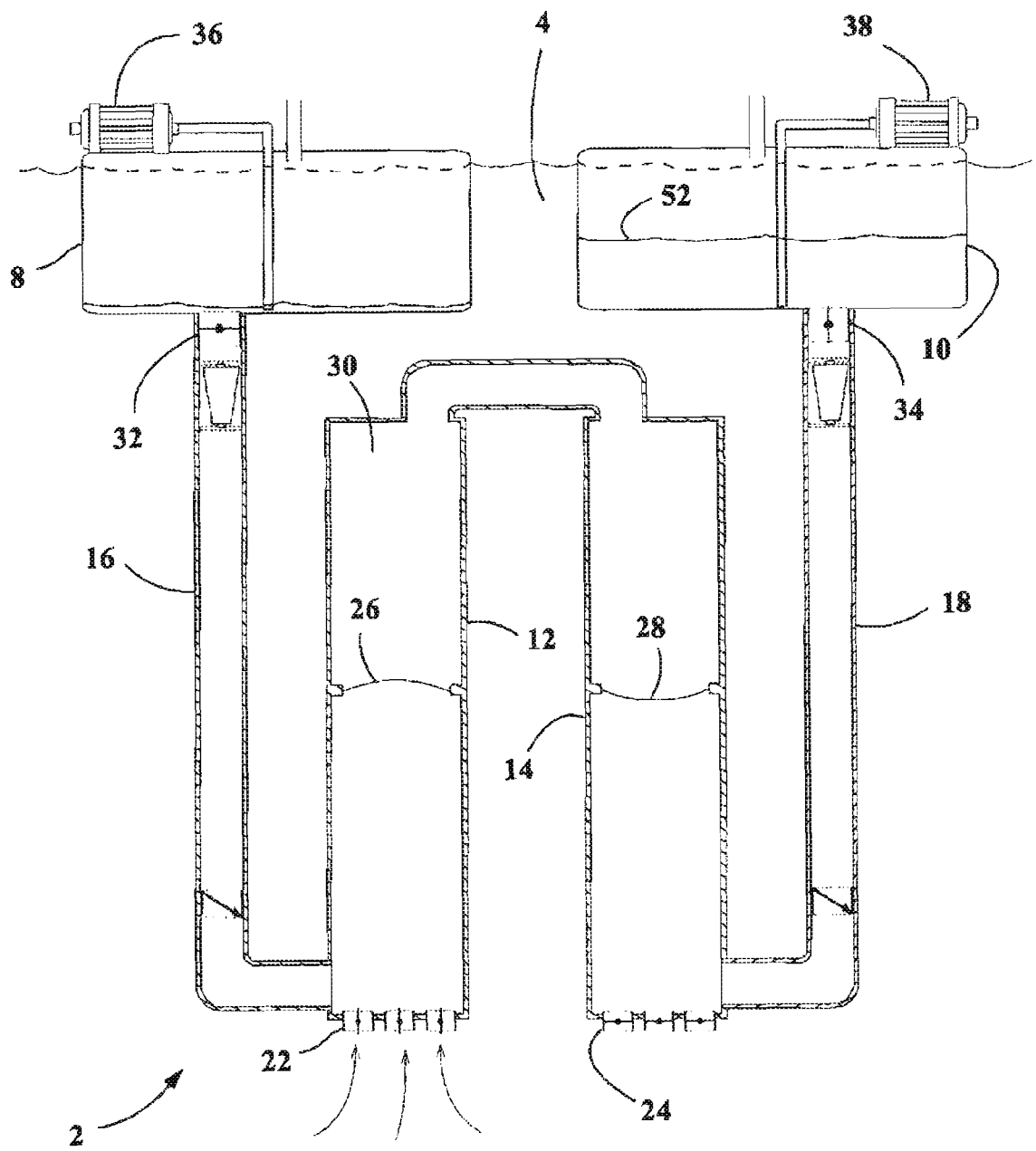
FIG. 3 depicts the embodiment shown in FIG. 1 at a yet further stage in the stroke.

Turning to FIG. 3, when the constant volumetric flow region 30 has shifted so that its contents are distributed roughly evenly between the first power chamber 12 and the second power chamber 14, the second holding tank 10 will be approximately halfway full, as shown by water level 52 in FIG. 3. The first power chamber external valve 22 and the second holding tank valve 34 remain open as water external to the system 2 flows into the first power chamber from the reservoir 4. The second power chamber external valve 24 and first holding tank valve 32 remain closed and do not allow water to flow. Alternatively, an evacuation tube valve (not shown) would be closed leading to the first evacuation tube 16, while a second evacuation tube valve (not shown) would be open leading to the second evacuation tube 18.

Figure 4:
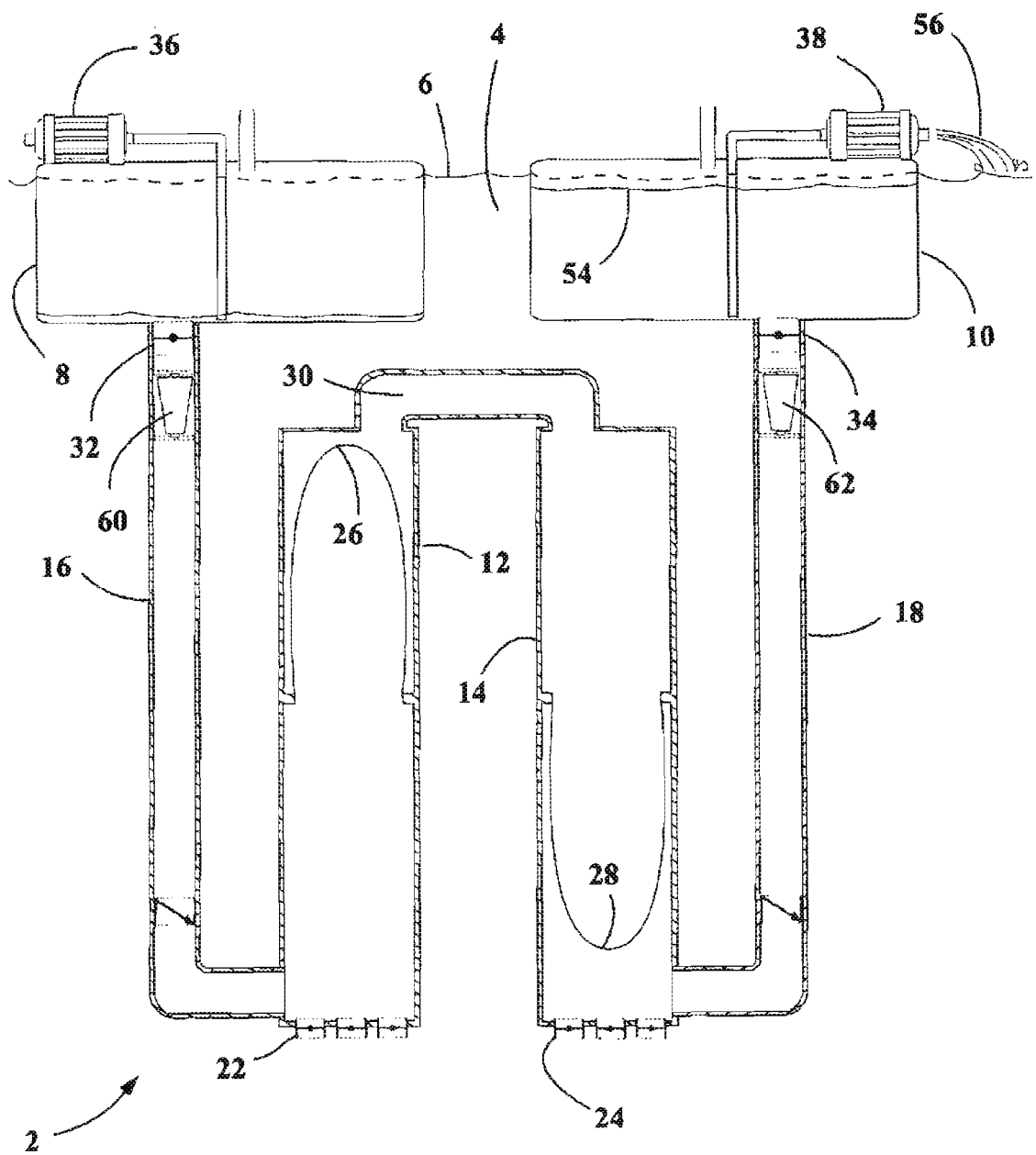
FIG. 4 depicts the embodiment shown in FIG. 1 at the end of the stroke.

Finally, the end of one stroke in the two-stroke cycle system 2 is depicted in FIG. 4. The second holding tank 10 has been filled or nearly filled so that its water level 54 is at or near the reservoir water level 6. The first power chamber external valve 22 and second holding tank valve 34 are closed, and the second holding tank pump 38 begins to evacuate the contents of the second holding tank 10. It should be noted that paddle-wheel type power units (not shown) or other comparable equivalent systems may be placed within the exit stream 56 of the second holding tank pump 38 (and similarly for the first holding tank pump 36 during the second stroke) in order to provide a power source that does not restrict the internal flow of the system 2, thereby increasing the overall efficiency of the system 2.

At the end of the first stroke, the constant volumetric flow region 30 has shifted to reside mostly within the second power chamber 14 upper level, as shown by the expansion of the first 26 and second 28 elastic boundaries. Also at this point in the cycle, the evacuation of the first holding tank 8 should be complete, and the first holding tank pump 36 switched off. Water now rests at equilibrium pressures with respect to the external reservoir 4, filling the first 16 and second 18 evacuation tubes, the first 12 and second 14 power chambers, and the constant volumetric flow region 30. To begin the second stroke—a mirror image of the first—the second power chamber external valve 24 and first holding tank valve 32 are opened, similarly to the first power chamber external valve 22 and second holding tank valve 34 described in connection with FIG. 2. The opening of the first holding tank valve 32 will create a pressure gradient through the system 2 that is translated to the opening created by the actuation of the second power chamber external valve 24, thereby instigating the flow of water out of the first power chamber 12 and into the first holding tank 8.

Beginning with this basic proof-of-concept model, it should be noted that various flow energy converters, such as the first 60 and second 62 flow energy converters depicted in FIG. 4 (not labeled in FIGS. 1-3), may be placed within the system 2 such that the flow of water induced during a stroke is captured and converted into power, whether it be electric current, mechanical work, or the like. Therefore overall net efficiency of the system 2 shown in FIGS. 1-4 can thus be calculated by using the energy captured by flow energy conversion (e.g., with a water flow turbine of applicable type, as at 60 and 62), any additional power generation utilized at the exit stream (as at 56), and the energy input required to operate the first 36 and second 38 holding tank pumps.

Figure 5:
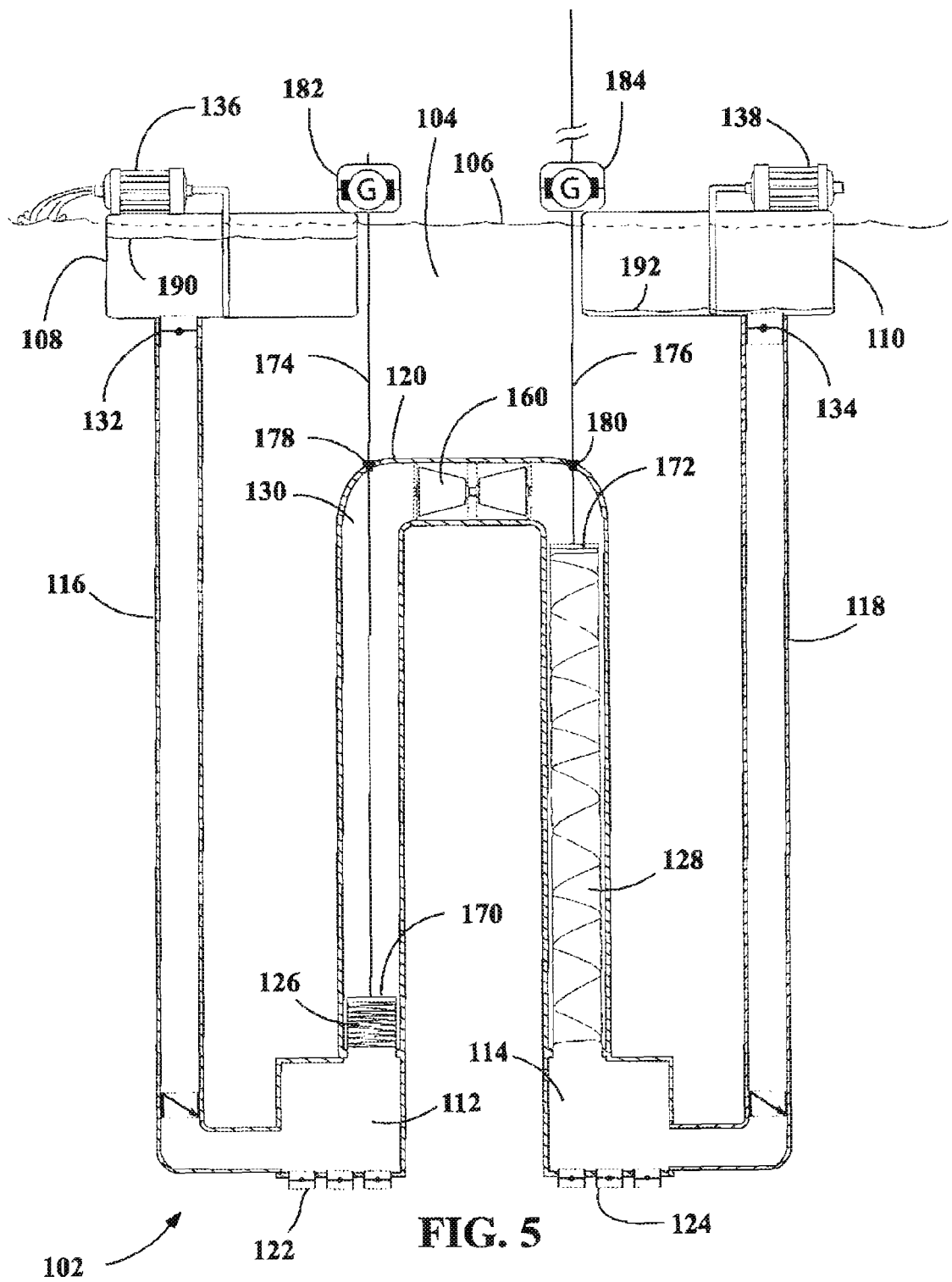
FIG. 5 depicts a second exemplary embodiment of the invention utilizing connecting rods and coil tubes to drive apparatus requiring work input, shown at the beginning of a stroke.
Figure 6:
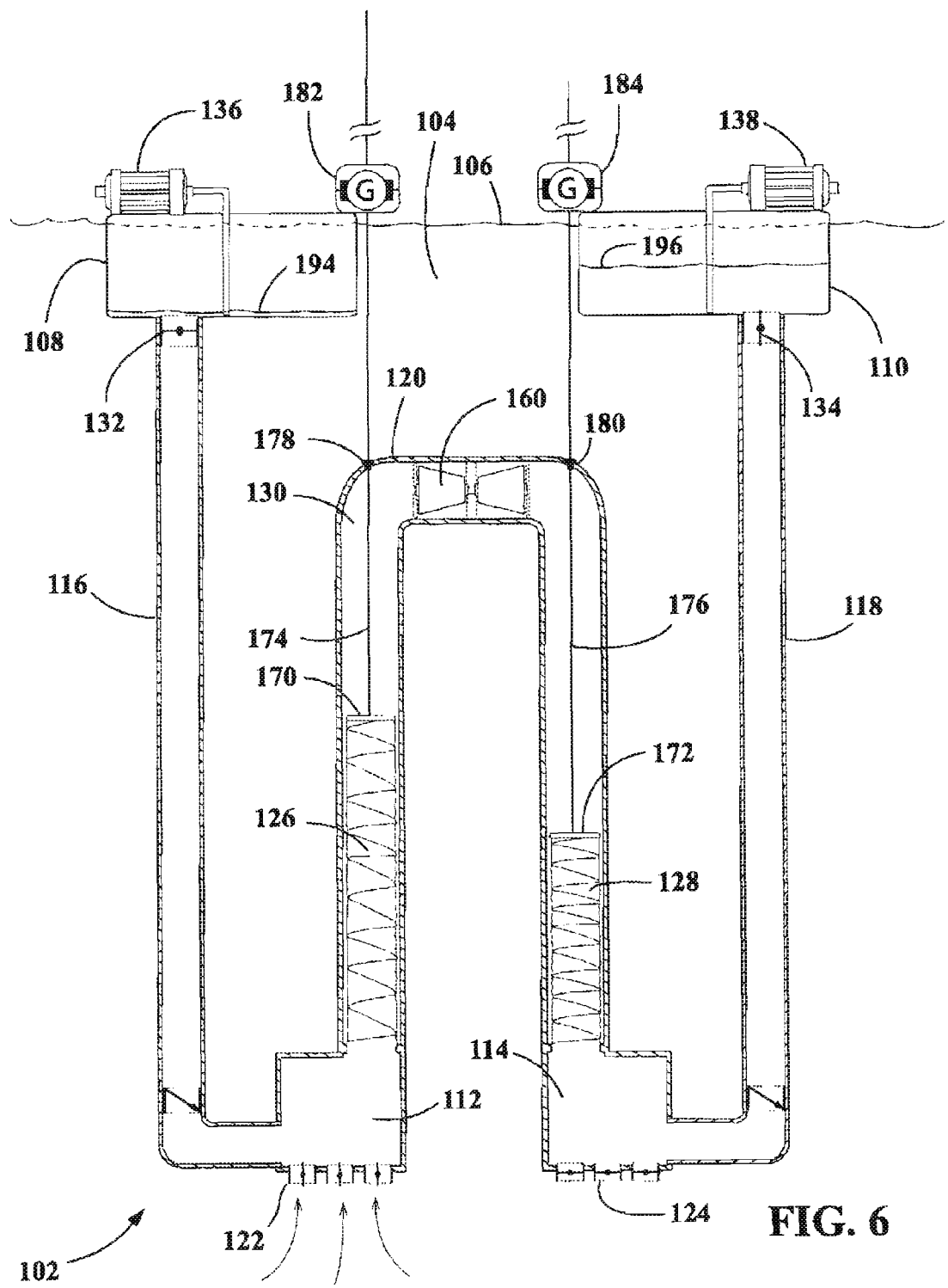
FIG. 6 depicts the embodiment shown in FIG. 5 at a further stage in the stroke.
Figure 7:
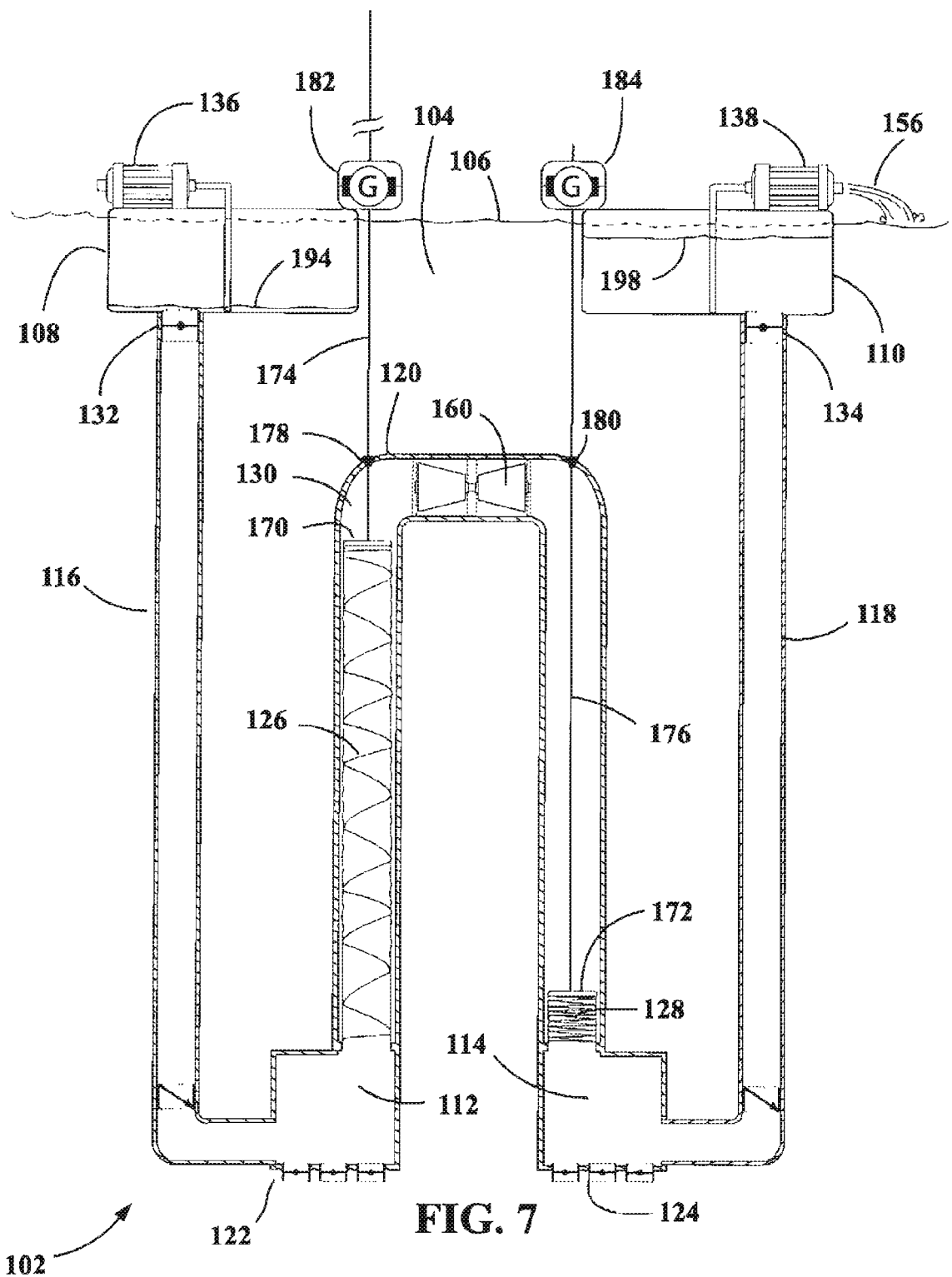
FIG. 7 depicts the embodiment shown in FIG. 5 at the end of the stroke.

Turning to FIGS. 5-7, a variation of the proof-of-concept model described in connection with FIGS. 1-4 is shown. Any optional features described in connection with FIGS. 1-4 and that are applicable to the embodiment shown in FIGS. 5-7 are considered optional features of the latter embodiment as well. Differences in their applications will be pointed out as necessary.

FIGS. 5-7 utilize a vertically elongate constant volumetric flow region to increase the travel distance of first 126 and second 128 coil tubes. Each coil tube is constructed of, for example, elastic or collapsible material engaged to a collapsible, coiled structural frame. The expansion or contraction of the volume of water entering the first power chamber 112 will expand or contract the first coil tube 126, respectively, increasing or decreasing its overall length. The distal end of each coil tube is capped with a rigid plate: the first coil tube 126 is closed off with a first rigid plate 170, and the second coil tube 128 is capped off with a second rigid plate 172. The coils themselves offer negligible resistance, if any, to extension and retraction movement of the coil tubes and are depicted in their use to hold the general shape of the coil tubes.

The first 126 and second 128 coil tubes inversely alternate between expanding and contracting as the constant volumetric flow region 130 is transferred back and forth between the first 112 and second 114 power chambers, in a manner similar to the alternating positioning of the first 26 and second 28 elastic boundaries depicted in FIGS. 1-4. As the coil tubes transition between their fully contracted (first coil tube 126 in FIG. 5) and fully expanded (second coil tube 128 in FIG. 5) states, the first 170 and second 172 rigid plates exhibit sinusoidal-type motion. By securing first 174 and second 176 connecting rods to the first 170 and second 172 rigid plates, respectively, the motion can be mechanically translated through the connecting rod 120 boundary with a gasket, as at 178 and 180.

The connecting rods can be attached to, for example, generators 182 and 184, and a generator axle or cam represented by two attachment points 182 and 184. The connecting rods can be generally be used to drive any apparatus that requires a work input, a crankshaft, mill, pump, or the like.

FIG. 5 depicts the beginning of a stroke in the two-stroke cycle. The first holding tank 108 is generally full of water and has been isolated from the rest of the system 102 as first holding tank valve 132 is closed. The first holding tank pump 136 has begun to evacuate the contents of the first holding tank 108, and will continue to do so during a portion of or up to the entire length of time for the stroke. The second holding tank 110 has been evacuated of its contents during the previous stroke by the second holding tank pump 138 and is ready to receive the water flowing into the system during the next stroke. Before the stroke begins, all valves restricting water flow are in the closed position, including the first 132 and second 134 holding tank valves and the first 122 and second 124 power chamber external valves.

The embodiment shown in FIGS. 5-7 is configured with an optional flow energy converter in the form of a reversible turbine 160, which can extract work from water flowing in both directions. By utilizing a reversible turbine placed in the flow stream in the connecting pipe 120, a single energy converter can be used to generator power.

Turning to FIG. 6, some time has passed since the first power chamber external valve 122 and the second holding tank valve 134 were opened. Water has begun to flow into the first power chamber 112 through the open first power chamber external valve 122 due to the empty second holding tank 110. The water in the system 102, again exposed to the ambient pressure gradient in the reservoir 104, begins to fill the second holding tank 110, as seen with water level 196 increased from the water level at the beginning of the stroke at 192 in FIG. 5. Water is in turn drawn up the evacuation tube 118 from the second power chamber 114, and consequently, the second coil tube 128 contracts as water is drawn from within. The contracting coil tube 128 carries the second rigid plate 172, which is attached to the second connecting rod 176. The movement of the connecting rod 176 can be used to perform work at the surface or below the apparatus if the connecting rods are inverted. The second connecting rod 176 can run, for example, a generator 184.

The contraction of the second coil tube 128 causes the constant volumetric flow region 130 to shift towards the second power chamber 114, causing water to flow through the optional reversible turbine 160. It should be noted that flow energy converters may be placed at various locations throughout the system in order to convert some of the flow energy into work external to the system. The size and amount of the flow energy converters may reduce the speed of a particular stroke, however, depending on the particular application.

The shifting constant volumetric flow region 130 draws the first coil tube 126 and the first rigid plate 170 upwards, driving the first connecting rod in the opposite direction of the second connecting rod 176. Similarly, the movement of the first connecting rod 174 can be used to perform work external to the system, in conjunction with, or independently of, the second connecting rod 176.

Finally, the expanding first coil tube 126 draws water into the first power chamber 112 through the first power chamber external valve 122, which can be configured as an array of valves, or as a single valve. As in FIGS. 1-4, it is referred to as a valve in the singular sense without limitation as to the amount of actual valves involved in a particular application. Many smaller, quick moving valves may be preferable over one or two large area valves, or vise versa.

FIG. 7 depicts the end of the stroke, wherein the second holding tank 110 has been completely or nearly completely filled with water, as shown by the water level 198 in FIG. 7. The first power chamber external valve 122 and second holding tank valve 134 are closed upon the filling of the second holding tank 110, and the second holding tank pump 138 is activated in order to drain the holding tank's contents. Note that the first holding tank pump 136 has completed draining the water from the first holding tank 108 as shown by water level 194. The second coil tube 128 has expelled its volume of water in the direction of the second holding tank 110 and is fully compressed. The first coil tube 126 is likewise fully expanded. To begin the next stroke, the second power chamber external valve 124 and the first holding tank valve 132 will be opened and the stroke will mirror the previously described stroke, completing a cycle.

At the transition between strokes there is no water flow through the connecting pipe 120, and any optional flow energy converters such as the reversible turbine 160 housed in the connecting pipe 120 cease producing power. Also, the first rigid plate 170 has reached its vertical apex, while the second rigid plate 172 has reached its vertical floor.

A third embodiment of the apparatus depicted in FIGS. 8-11 utilizes pontoons contained within pontoon chambers to enhance and augment the power derived from the water flowing through the system 202. For relatively little power investment, the pontoons enable the system 102 to greatly augment the work performed by the connecting rods external to the 102.

Figure 8:
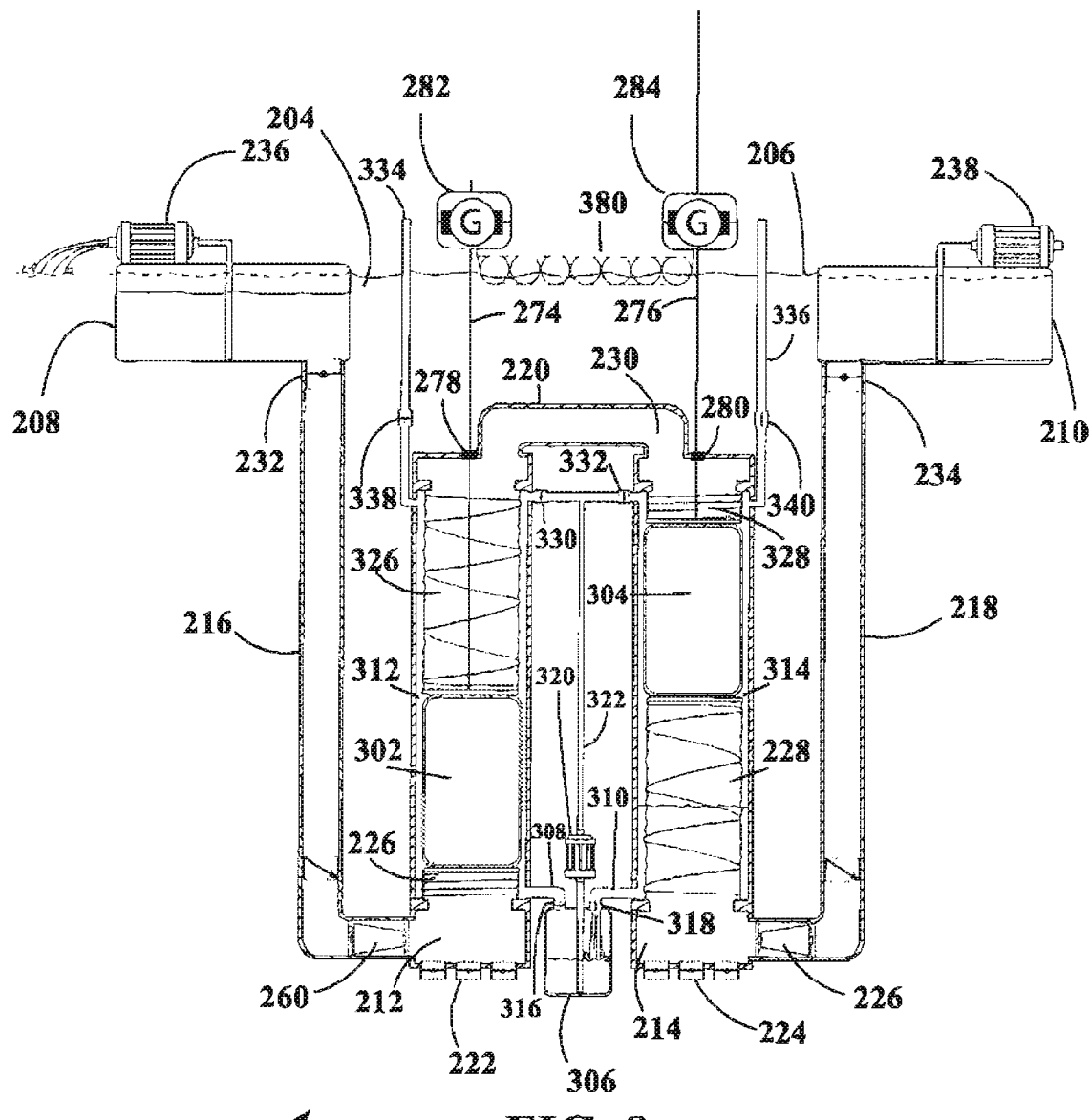
FIG. 8 depicts a third exemplary embodiment of the invention utilizing pontoons to enhance the power generated by the system, shown at the beginning of a stroke.

FIG. 8 depicts an arrangement similar to that shown in FIGS. 5-7, but with modifications to the regions between the first 216 and second 218 evacuation tubes. The movable extremes of the constant volumetric flow region 230 are rigid plates affixed to and capping the end of a first 326 and second 328 upper pontoon chamber coil tube. As the constant volumetric flow region shifts from one pontoon chamber to the other, the first 326 and second 328 upper pontoon chamber coil tubes alternate in their expansion and contraction, maintaining a constant volume of water within the coil tubes and connecting pipe 220. As in FIGS. 5-7, the first 212 and second 214 power chambers can also volumetrically expand via a first 226 and second 228 lower pontoon chamber coil tube as water enters through their respective first 222 and second 224 power chamber external valves.

First 274 and second 276 connecting rods pass through gaskets 278 and 280 and are connected to an external device requiring power input. The external device can be, for example, generators 282 and 284 positioned on platform 380 as shown in FIGS. 8-11, a large pump, or the like. The movement of the rigid plates that are connected to the first 326 and second 328 upper pontoon chamber coil tubes drives the connecting rods.

A first pontoon 302 is positioned between the first upper 326 and lower 226 pontoon chamber coil tubes. A second pontoon 304 is positioned between the second upper 328 and lower 228 pontoon chamber coil tubes. Each of the first 302 and second 304 pontoons is contained within a first 312 and second 314 pontoon chamber, respectively. The first pontoon chamber 312 is vented to atmospheric pressure via a first pontoon chamber air vent 334 and is actuatable through a first pontoon chamber air vent valve 338. The second pontoon chamber 314 is vented to atmospheric pressure via a second pontoon chamber air vent 336 that is likewise actuatable through a second pontoon chamber air vent valve 340.

When the pontoons are configured to be filled with air, the air vents allow the pontoon chambers to be filled with air at atmospheric pressure, which surrounds the pontoons. On a down stroke, in which a pontoon moves from its vertical apex in the cycle to its vertical floor, the encapsulation of the pontoon with air reduces or negates the buoyant forces acting upon the pontoon. This effect makes the energy required to return the pontoon to its position at the bottom of the pontoon chamber relatively small compared to the energy increase achieved through the use of pontoons on the upstroke.

Alternatively, the pontoons can be filled with the liquid that fills the fluid reservoir 204, or other solution, fluid or gas. In the case of water, filling the pontoons with water will allow for the effect of neutral buoyancy to greatly assist in returning the pontoons to their vertical apex during a cycle. In this configuration, the pontoons will augment the power generated by the system during the down stroke, when the pontoon's individual weight will contribute additive force to the connecting rod.

In the examples and illustrations that follow, the pontoon systems are filled with air unless otherwise specified. The use of air need not be limiting, however, as will be evident with further explanation. Air- and water-filled pontoons are used for illustrative simplicity, but any material can be used to create the structure of the pontoons. The pontoons can be hollow, solid, or semi-permeable, because it is the buoyant relationship between the pontoon body (whether filled, empty, or solid) and the liquid, gas, or combination of both, that provides the system with its ability to do work at low energy input levels. For example, in addition to a hollow pontoon filled with air, water, or nothing, the pontoon could be made out of (or filled with) wood (e.g., balsa wood), cork, metal, plastic, Styrofoam or any other material that is suitable for a particular application. Once the principles of the current invention are understood, those skilled in the art employing these teachings will be able to select such appropriate materials without undue experimentation or further invention.

In the embodiment shown in FIGS. 8-11, the pontoons are assumed to be filled with air. Other configurations are of course possible, and their method of operation will become evident after reading this disclosure. While the pontoon chamber air vents enable the pontoon chambers to be filled with air, the pontoon chamber filling pipe 322 connects to a pontoon chamber filling pump 320. The pump 320 is connected to both a first 330 and second 332 pontoon chamber filling pipe valve, which are used to control into which pontoon chamber the pump 322 pumps. A first 308 and second 310 pontoon chamber drain pipe and a first 316 and second 318 drain pipe valve allow water to be drained from the first 312 and second 314 pontoon chambers, respectively, when neutral buoyancy with an air pontoon is desired. A pontoon chamber reservoir 306 is used to store the pontoon chamber water when not in use. The pontoon chamber water is relatively and preferably quite small when compared to the volumes present in other elements of the apparatus, and is generally located circumferentially or perimetrically about the outer wall of each pontoon chamber. The pontoon chamber filling pump 320 draws water from the pontoon chamber reservoir 306 as needed to return water to a pontoon chamber.

FIG. 8 depicts the beginning of a stroke for the two-stroke cycle. The holding tank valves 232 and 234 are closed, as well as the power chamber external valves 222 and 224. The first holding tank 208 is full or nearly full, and the first holding tank pump 236 has begun to evacuate the contents of the tank. The first pontoon 302 rests at its lowest point, with the first lower pontoon chamber coil tube 226 fully contracted and the first upper pontoon chamber coil tube 326 fully extended. Likewise, the second lower pontoon chamber coil tube 228 is fully extended and the second upper pontoon chamber coil tube 328 is fully contracted. The constant volumetric flow region 230 is shifted towards the first power chamber 212 relative to the second power chamber 214.

The first pontoon chamber 312 is filled with water, and the first pontoon chamber air vent valve 338, filling pipe valve 330, and drain pipe valve 316 are all closed. The second pontoon chamber drain pipe valve 318 is open, and the water has begun to drain out of the second pontoon chamber 314 and into the pontoon chamber reservoir 306.

Figure 9:
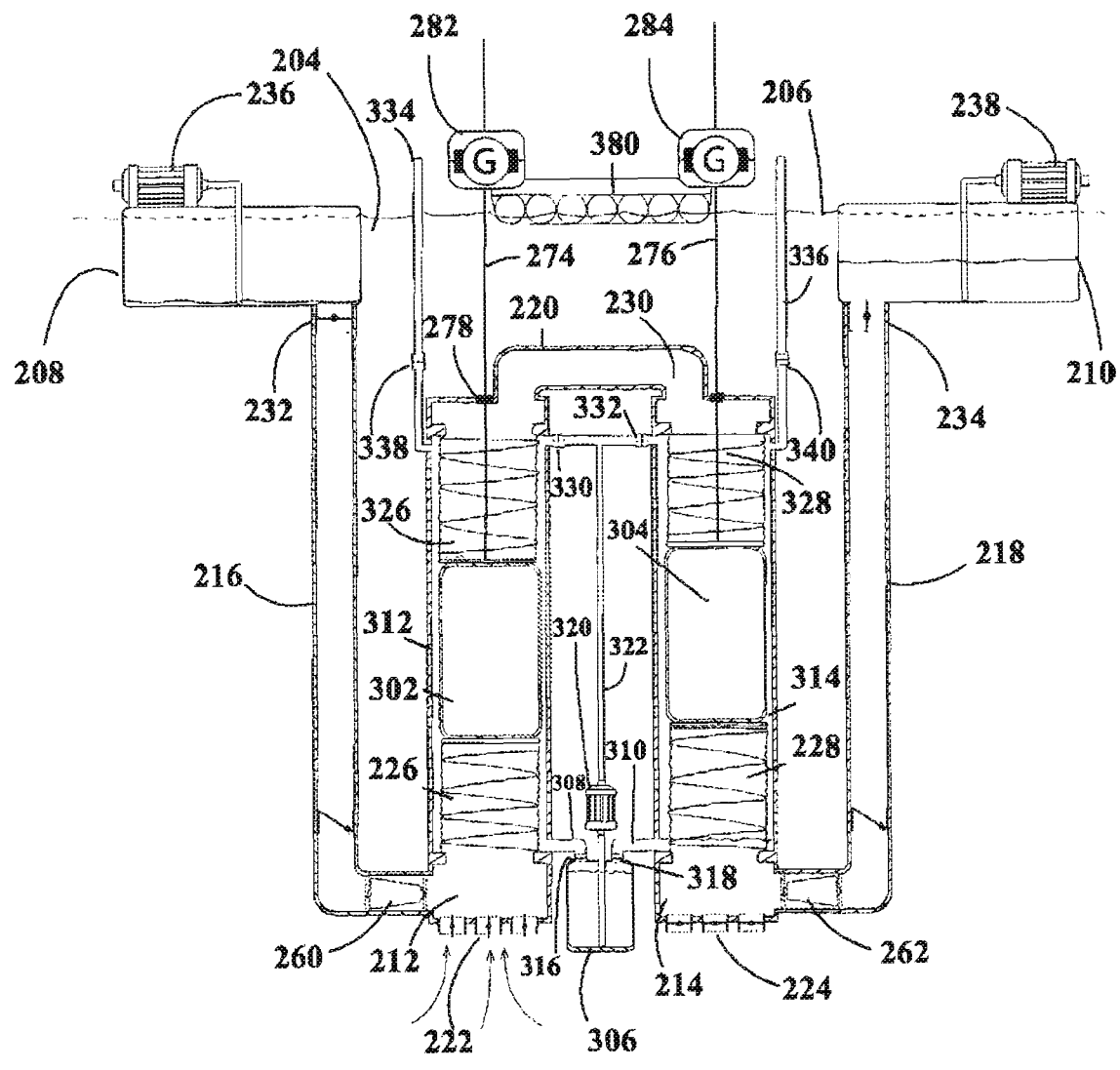
FIG. 9 depicts the embodiment shown in FIG. 8 at a further stage in the stroke.

Turning to FIG. 9, a state of the system 202 is shown at a time during the stroke beginning in FIG. 8. The first power chamber external valve 222 and the second holding tank valve 234 are open and water from the fluid reservoir 204 has begun to flow into the first power chamber 212. The first lower pontoon chamber coil tube 226 has expanded from its fully retracted state (shown in FIG. 8), and the first upper pontoon chamber coil tube 326 has retracted from its fully extended state (also shown in FIG. 8) as the constant volumetric flow region 230 has shifted toward the second power chamber 214. Likewise, the second upper pontoon chamber coil tube 328 has expanded and the second lower pontoon chamber coil tube 228 has retracted from the state shown in FIG. 8. Seeking equilibrium with the fluid reservoir 204 fluid level 206, fluid with the system 202 has begun to fill the second holding tank 210 via the second evacuation tube 218.

The water surrounding the second pontoon 304 has been fully drained from the second pontoon chamber 314 into the pontoon chamber reservoir 306, thereby negating buoyant forces that would resist the downward movement of the second pontoon 304. The first 316 and second 318 drain pipe valves and the first 330 and second 332 pontoon chamber filling pipe valves are all closed in this state. The first pontoon 302 is in upwards motion and the second pontoon 304 is in downwards motion. The upward motion of the first pontoon 302 is used to operate a device requiring work input. The device could be, for instance, one or more power generators such as 282 and 284, or other mechanical devices such as crankshafts, pumps, mills and the like. The connecting rod system enables the motion of the pontoons and constant volumetric region to mechanically perform work as desired using, for instance, first 274 and second 276 connecting rods.

Figure 10:
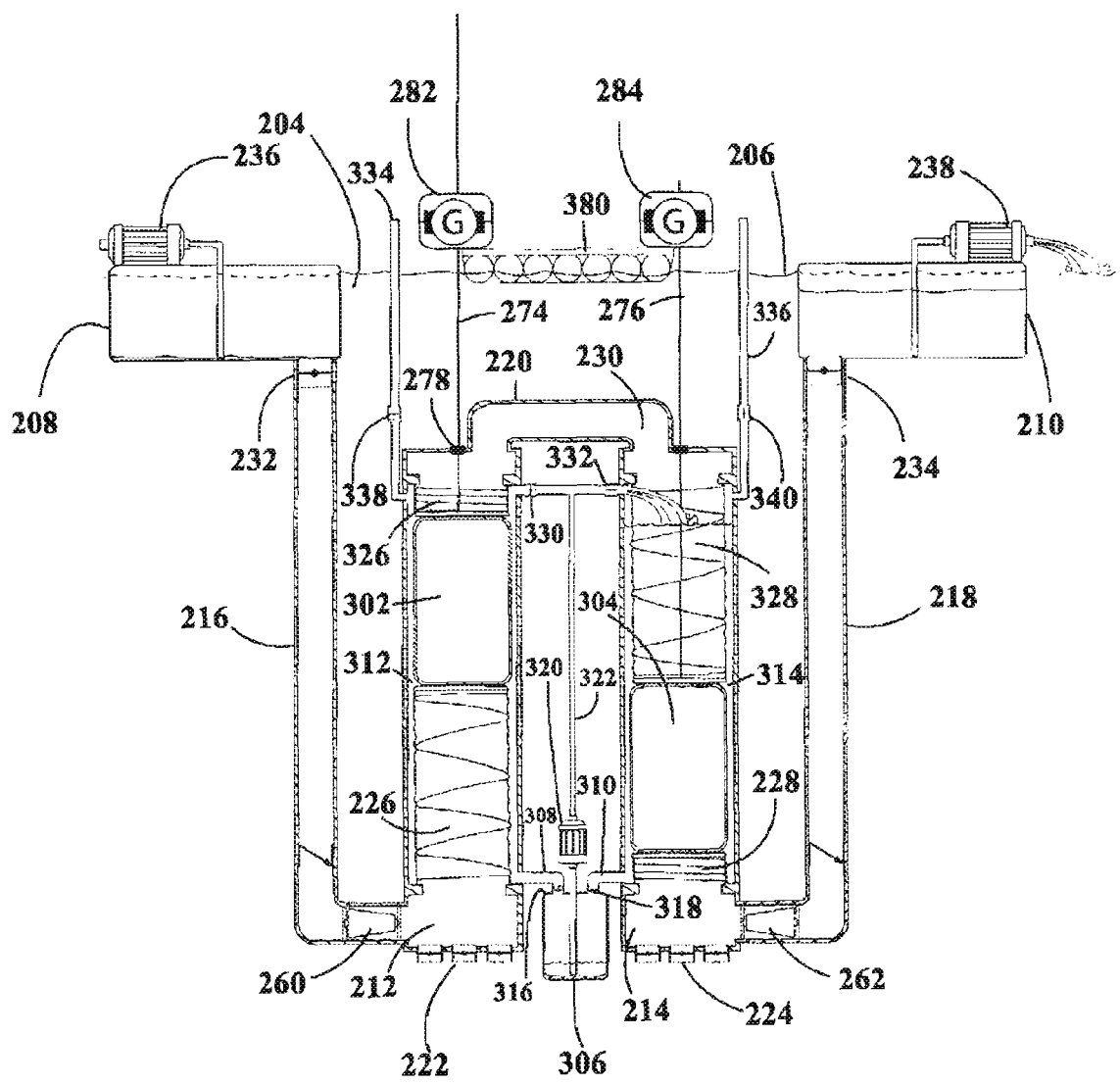
FIG. 10 depicts the embodiment shown in FIG. 8 at the end of the stroke.

FIG. 10 depicts the end state of the stroke begun in FIG. 8. In this state, the first pontoon 302 has traveled to its vertical apex and the second pontoon 304 to its vertical floor. The first upper pontoon chamber coil tube 326 and the second lower pontoon chamber coil tube 228 are fully retracted, and the first lower pontoon chamber coil tube 226 and the second upper pontoon chamber coil tube 328 are fully extended. The first power chamber external valve 222 and second holding tank valve 234 have been closed. The second holding tank 210 is now full, or nearly full, and is isolated from the rest of the system 202. The second holding tank pump 238 has begun to return the fluid in the second holding tank 210 to the fluid reservoir 204.

At or near the end of the stroke, the pontoon chamber filling pump 320 begins to refill the second pontoon chamber 314 to prepare for the next stroke, wherein the second pontoon 304 will move upwards in its power stroke. The second pontoon chamber filling pipe valve 332 has been opened to allow the fluid in the pontoon chamber reservoir 306 to be pumped into the second pontoon chamber 314.

Figure 11:
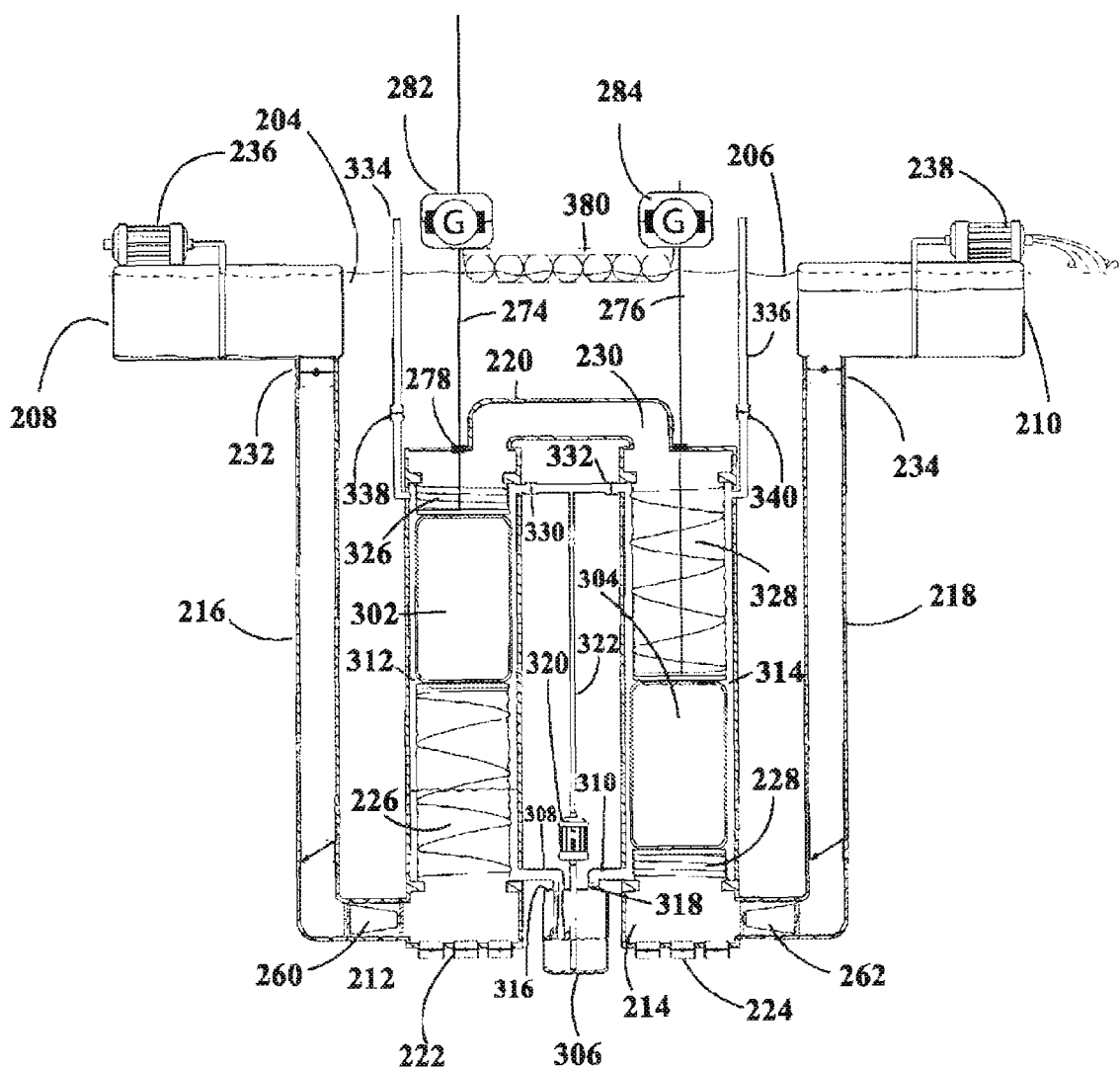
FIG. 11 depicts the embodiment shown in FIG. 8 at a transition state between the stroke transitioned as shown in FIGS. 8-10 and the beginning of a reciprocating stroke.

FIG. 11 depicts a state just before the beginning of the next stroke. The second pontoon chamber 314 has been refilled by the pontoon chamber filling pump 320 and the second pontoon chamber filling pipe valve 332 closed. The first drain pipe valve 316 has been opened and the fluid in the first pontoon chamber 312 is nearly fully drained in preparation of the first pontoon 302 returning back to its vertical floor as shown in FIG. 8. At the start of the next stroke, the second power chamber external valve 224 and the first holding tank valve 323 will be opened, and the first drain pipe valve 316 will be closed. These reciprocating strokes described herein will continue cycling as described, generating work for power generation or the like.

For the aforementioned embodiments, as well as the further exemplary embodiments described herein, it should be understood that valves or other access points that would be used for maintenance access, or to initially fill a given volume with working fluids, solutions or gases may be included where needed for a particular application. For example, see the description of valves and pump 590 and 592 in FIG. 13 below. Those skilled in the art will appreciate that elements of similar function may be included in the various embodiments as will be readily apparent, and that those elements are not shown in all drawing views for purposes of understanding and clarity.

The movement of the pontoons can be used to operate a generator system that produces electricity. The water entering the power plant and the water being evacuated by the plant's pumping systems cause the pontoons to move. The water entering the power plant also is used to pressurize the water in the power plant to equal or nearly equal the adjacent outside water pressure at the point of discharge. Since the water being evacuated is equal or nearly equal to the water it is being evacuated into, the pumping system's required work expenditure becomes diminished. Therefore, if the head of the water entering the power plant is 100 feet and the water being evacuated has had its pressure equalized or nearly equalized with the outside ocean water at the point of discharge, then it will only take a few psi to evacuate the water from the power plant, compared with having to discharge water at atmospheric pressure into water pressure that is much higher at the point of discharge.

The term "return station" refers to a portion of the return system that evacuates the material from its respective power or pontoon chamber, generally beginning at the distal end of an evacuation tube (i.e., furthest from its connection point with the power chamber). A "return system" generally carries out the task of evacuating the material exiting its respective power chamber (either during or after the emptying process of the pontoon chamber, or some combination of both). Any given return system can be made up of multiple return stations, which are individual pumping systems (e.g., holding tank and holding tank pump) contained within a return system. It should be evident to the skilled artisan that the variations shown in connection with these figures may be applied in conjunction with the multitude of applications and examples disclosed previously herein. While employing the variations that follow offer alternative to the operative sequences of the systems and allow for power generation at greater rates, the basic principles remain the same—natural pressure differentials are being used to reduce the workload needed to evacuate the system of material, while simultaneously using the material flow to generate power. If there are multiple return stations connected to each power chamber, and they alternate evacuating the appropriate amount of water from their respective power chambers, then each return station will have more time to evacuate its water contents after being isolated from the pontoon chamber assembly. The time savings result because as one return station evacuates its water content from its holding chamber, the others are receiving the working fluid of subsequent strokes that is expelled from the corresponding power chamber in alternating sequence. This also allows the power plant to run continuously, and at an added energy savings due to the reduced flow rate requirements.

Figure 12A:
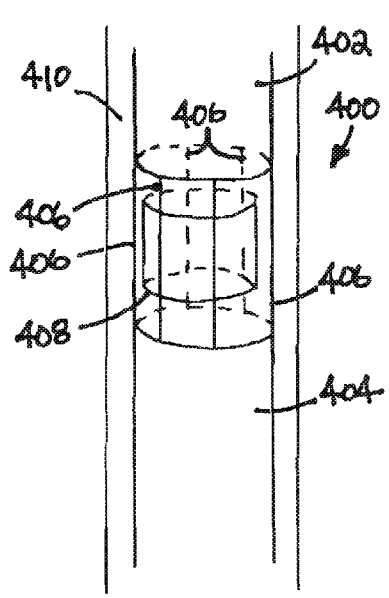
FIGS. 12A-C depict perspective views of three exemplary embodiments of a pontoon cradle.
Figure 12B:
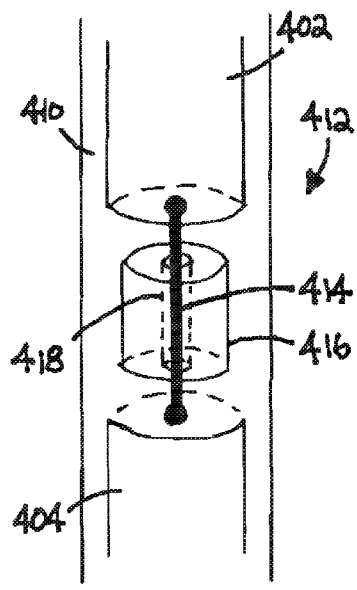
Figure 12C:
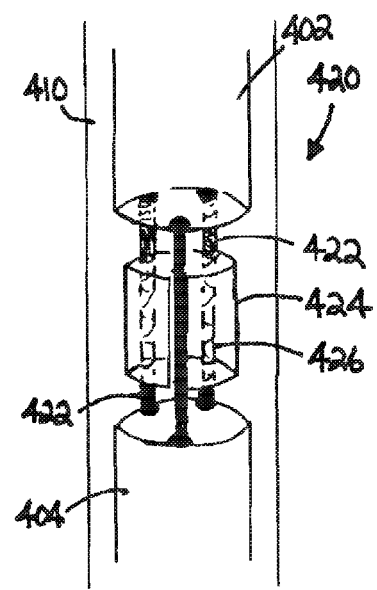

Note that, in applications utilizing the buoyancy effects of a pontoon, it is helpful to permit the working fluid to contact the horizontal surfaces of the pontoon for maximum efficacy, but also that it is desirable to also allow the pressure gradients experienced throughout the system to be translated from the power chambers to the constant volumetric region. Turning to FIGS. 12A-C, several exemplary embodiments of cradle systems are illustrated that can optionally be used to operatively connect the power chambers and constant volumetric flow region, while maximizing potential buoyant forces acting on the pontoons. FIG. 12A is perspective view of a cage-type cradle system 400, wherein a cradle frame binds the upper 402 and lower 404 pontoon chamber coil tubes with a plurality of supports 406 spaced generally circumferentially around the periphery of and extending between the ends of the coil tubes 402 and 404. The cradle system 400 encapsulates a pontoon 408 in the space between the coil tubes 402 and 404 thereby creating space for the pontoon to experience buoyant forces acting on its horizontal surface(s) due to the working fluid from the pontoon chamber 410.

Alternatively, FIG. 12B depicts a perspective view of a second exemplary embodiment of a cradle system of a through-hole type 412. In this embodiment, the upper 402 and lower 404 coil tubes may be connected via one or more supports 414 that pass through the interior of the pontoon 416 that includes one or more through-holes 418 or alternatively gasket/linear bearing configurations. The through-hole type of cradle system 412 also permits the pontoon 416 to float between the ends of the coil tubes 402 and 404 to maximize the availability of buoyant forces from the working fluid in the pontoon chamber 410.

A third exemplary embodiment of a cradle system is shown in perspective view in FIG. 12C. This cradle system demonstrates an exterior groove or guide-type configuration 420 that utilizes a plurality of supports 422 spaced generally circumferentially around the periphery of and extending between the ends of the upper 402 and lower 404 coil tubes in a similar manner to that shown in connection with FIG. 12A, except that the exterior of the pontoon 424 contains a series of longitudinally extending grooves or guides 426 oriented to receive the supports 422. The pontoon 424 is generally provided with a vertical range of motion, differing from FIG. 12A which may be employed with lateral clearance around the pontoon or with similar restrictions on lateral movement. Note that multiple through-hole supports 414 of the type shown in FIG. 12B will operate to restrict rotational and lateral motion in a similar manner. The vertical range of motion afforded by the guide-type configuration 420 similarly permits buoyant forces resulting from the working fluid in the pontoon chamber 410 to act on the pontoon 424. It will be clear to those skilled in the art that the use of a particular cradle system, or of a cradle system in general, will depend upon the specific use of the various subsystems described in further detail below.

In the descriptions that follow, many of the exemplary embodiments have elements of identical operability or system components, or may be similar to those of other embodiments such that those skilled in the art will recognize their function. For brevity and readability, differences between the embodiments and novel features thereof will be discussed with particularity, but operations or system elements for which description would be duplicative or repetitive will be avoided where possible, and reference should be made to other figures in which a particular component or subsystem is described.

Furthermore, unless otherwise noted in the description relating to a specific figure, for any system component described below in which a space is emptied or filled with working fluid during the operation of the plant, it will be assumed that those skilled in the art will appreciate that vents to atmospheric pressure may be utilized for safe and efficient operation of the plant. Air vents and their connections will be collectively referenced using the numeral 430 hereinafter for all figures. Additionally, both separate and combined (e.g., switched/actuatable) air vents with respect to discrete system components are shown (e.g., a first and second pontoon chamber), but any physical configuration that is suitable for a given application will be selected by those skilled in the art according to known methods and specific design considerations and parameters, and therefore should not be seen as limiting. For example, the use of always open vents for certain components may reduce construction costs in some circumstances, while the use of actuatable vents may be desirable in others. Note also that in some of the embodiments that follow, it should be clear to those skilled in the art that air vent connections are occasionally not shown to increase the clarity of a figure, and in those circumstances are implied.

Figure 13:
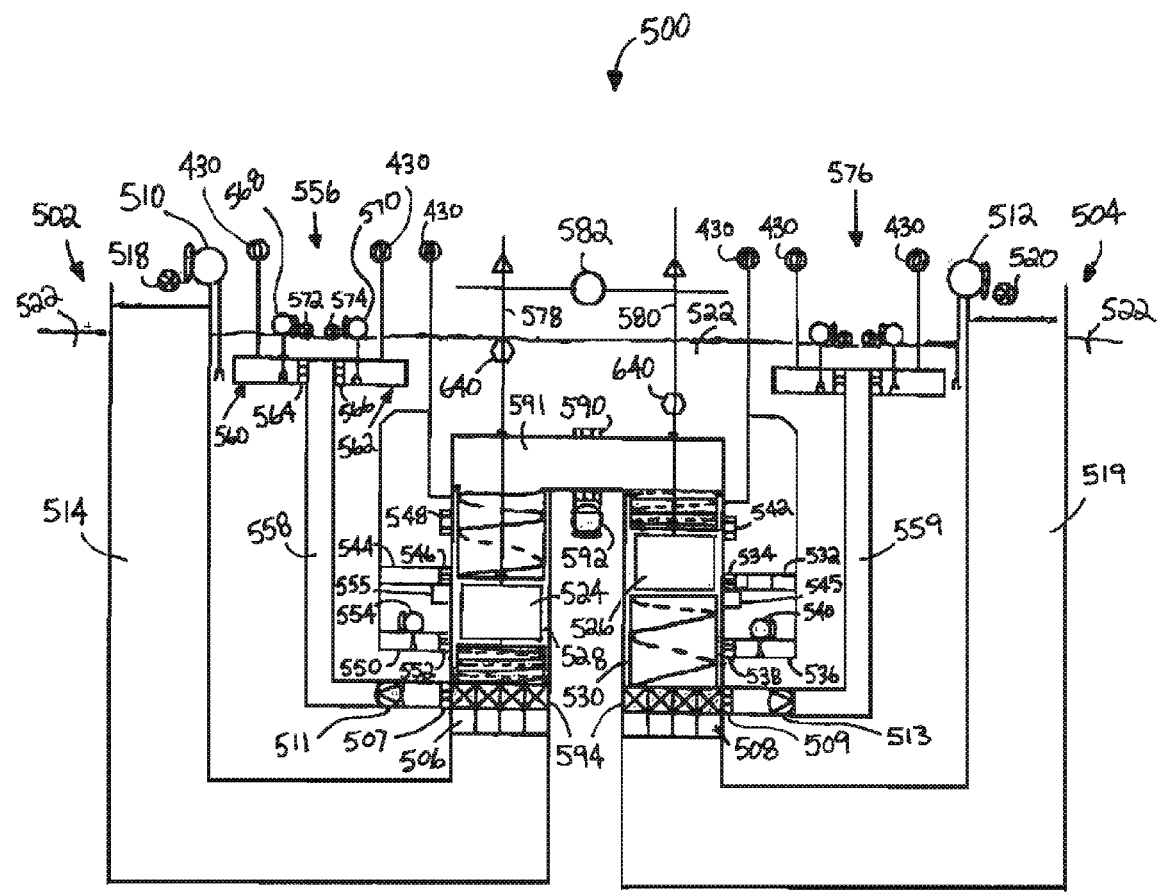
FIG. 13 depicts a fourth exemplary embodiment employing an artificial head system and a further exemplary embodiment of a means for reciprocally draining and filling a pontoon chamber.

FIG. 13 depicts an exemplary embodiment utilizing pontoons as the primary force-producing means (e.g., similar to the embodiment described in connection with FIGS. 8-11) and also employing an artificial head system and a further alternative exemplary embodiment of a means for reciprocally draining and filling a pontoon chamber. The use of an optional artificial head system is suitable for many plant designs, such as those previously described herein, and the plant 500 shown in FIG. 13 illustrates the use of a first 502 and second 504 artificial head system corresponding to the first 506 and second 508 power chamber external valves, respectively. The first 502 and second 504 artificial head systems include first 510 and second 512 artificial head system pumps, and first 514 and second 516 artificial head chambers, respectively. Optional first 518 and second 520 auxiliary turbine generators may be placed in the outlet stream of the first 510 and second 512 artificial head system pumps, respectively, in order to recapture some of the energy cost of the pumping done by the pumps 510 and 512. Those auxiliary systems 518 and 520 may take any comparable form of power generation device capable of converting the discharge stream from the pumps 510 and 512 into usable energy, as discussed above in connection with FIG. 4, for example.

The artificial head systems 502 and 504 pump working fluid from the reservoir 522 to a higher head in the respective first 514 and second 516 artificial head chambers, thereby achieving a higher pressure experienced at the first 506 and second 508 power chamber external valves with respect to their actual depth in the reservoir 522. An artificial head system may be employed on any application wherein a greater pressure differential between the main power chamber inlets and outlets (e.g., 506 and 507 respectively) is desired. Note that in the embodiment shown in FIG. 13, optional first 507 and second 509 evacuation tube valves are employed to control the flow of working fluid from the first and second power chambers to the first 558 and second 559 evacuation tubes, respectively, as discussed above in connection with FIG. 3. Furthermore, optional first 511 and second 513 check valves are employed as an alternative.

The plant 500 shown in FIG. 13 also illustrates a further embodiment of the means for reciprocally draining and filling a pontoon chamber—an operation that is desired when pontoons (e.g., first 524 and second 526 pontoons) are used to exert buoyant forces and perform work. In this depiction, the first pontoon 524 is at the bottom of the first pontoon chamber 528, and the second pontoon 526 is at the top of the second pontoon chamber 530. The first pontoon chamber 528 is in condition to be refilled with the working fluid to restore or increase the buoyant forces acting on the first pontoon 524, and the second pontoon chamber 530 to be drained of the working fluid to reduce or remove the buoyancy of the second pontoon 526, for reasons similar to those described above in connection with FIGS. 8-11.

The buoyancy nullification and restoration process can be accomplished in the following exemplary manner. Working fluid is drained from the upper portion of the second pontoon chamber 530 into the second middle pontoon chamber compartment 532 by opening valve 534 and allowing gravity to partially drain the second pontoon chamber 530. The second middle pontoon chamber compartment valve 534 is closed, and the process is repeated at the second lower pontoon chamber compartment 536 and corresponding valve 538, after which valve 538 is also closed and the pontoon chamber 530 has been sufficiently drained to negate the buoyancy of the second pontoon 526. The working fluid contained within the second lower pontoon chamber compartment 536 may then, for instance, be pumped into the outside head of the reservoir 522 via pump 540, or later returned through a connection (not shown) with the second upper pontoon chamber compartment valve 542.

To restore the operation of buoyant forces on the first pontoon 524, the working fluid must be returned to the first pontoon chamber 528. From a previous stroke, the first middle pontoon chamber compartment 544 is filled. Valve 546 is opened and the water in the first middle pontoon chamber compartment 544 is returned to the first pontoon chamber 528 via gravity. The first middle pontoon chamber compartment valve 546 is then closed, and the first upper pontoon chamber compartment valve 548 is opened to allow working fluid from the reservoir 522 to flow from a higher head into the first pontoon chamber 528 until it is filled, at which point the valve 548 is closed. Alternatively, if the working fluid previously drained into the first lower pontoon chamber compartment 550 via valve 552 has not been returned to the reservoir by pump 554, is can be pumped up from the lower compartment 550 to the upper valve 548 to fill the chamber 528. Other similar variations will be evident to those skilled in art in light of this disclosure, and the arrangement and manner of performing the draining and refilling should not be considered limiting.

Furthermore, FIG. 13 illustrates the use of multiple return stations per return system, as described generally above. The first return system 556 includes a first evacuation tube 558 and a first 560 and second 562 return station. The first 560 and second 562 return stations are selected for filling, respectively, via first 564 and second 566 return station valves, allowing them to alternate filling and emptying processes during plant operation. Pumps 568 and 570 and corresponding auxiliary turbines 572 and 574 are shown for the return stations as well. The plant 500 exhibits a mirror image return station 576 with corresponding components for the second power chamber as well. Other notable features of the plant 500 include connecting rods 578 and 580 coupled to a generator, machine or the like 582, gate turbines 594 used to convert flow energy of the working fluid entering the power chambers to usable power, an initialization valve 590 used to fill the constant volumetric region 591 during initialization for system 500 startup, and a draining pump 592 for the constant volumetric region 591 used to drain the same for maintenance, access or other such purposes. Optional first 555 and second 545 lock systems are also provided to lock the vertical positioning of the first 524 and second 526 pontoons, respectively, if desired between or at the beginning of strokes, cycles, for maintenance purposes, or the like.

Figure 14:
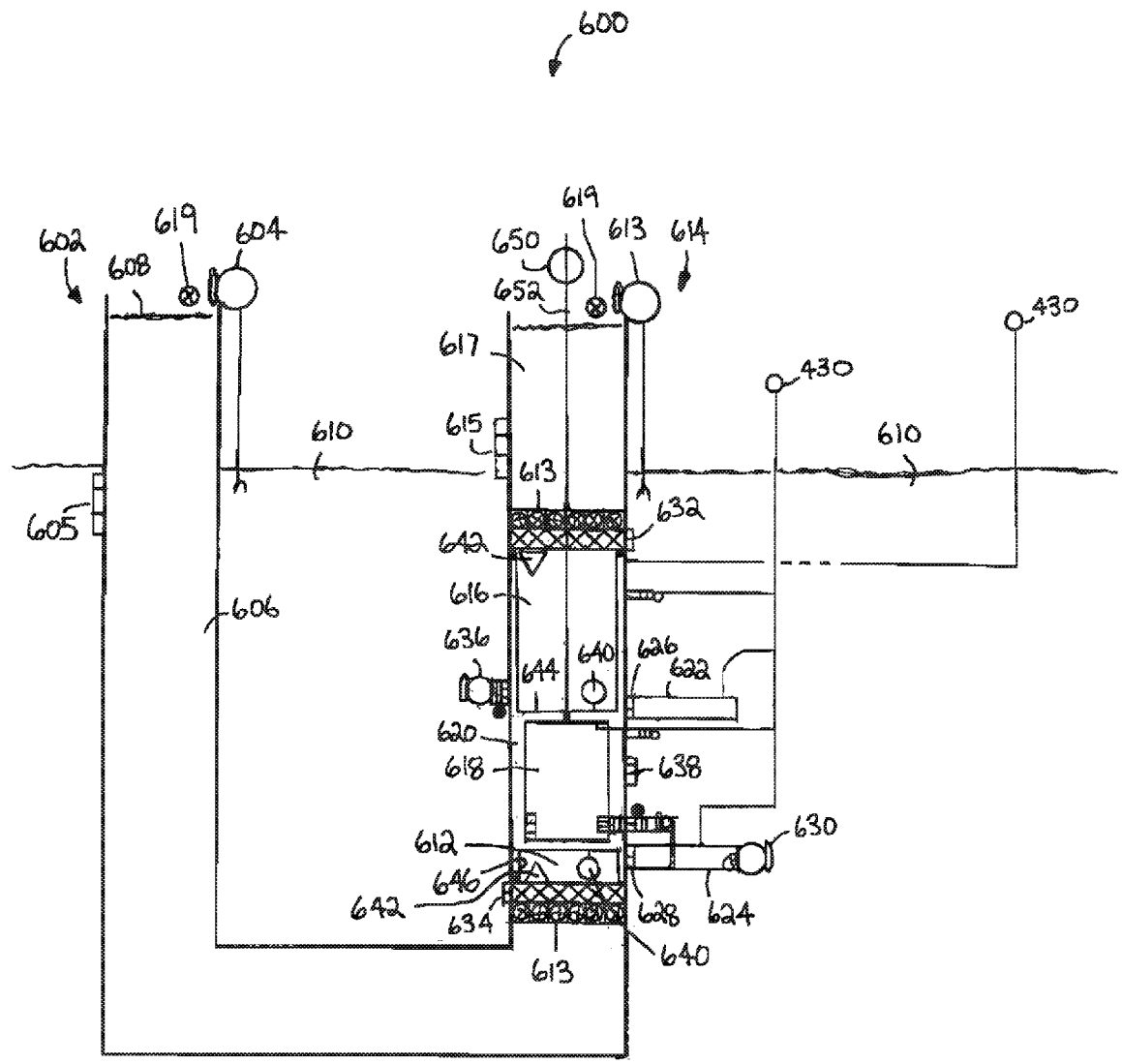
FIG. 14 depicts a fifth exemplary embodiment employing a single pontoon chamber system.

The use of an artificial head system as described above can be utilized to generate sufficient pressure at the power chamber valves so that the working fluid can be evacuated from the plant without a connecting pipe/constant volumetric region and thus using only a single pontoon. An exemplary embodiment is depicted in FIG. 14, and also shows the option of foregoing the use of return stations to remove working fluid from the system. The plant 600 employs a first artificial head system 602 that includes an artificial head system pump 604, a first maintenance valve 605 used for filling and draining the first artificial head system 602 for maintenance or access purposes, and an artificial head chamber 606 wherein an artificial head working fluid level 608 is maintained above the head of the reservoir 610 for the lower power chamber 612. Gate turbines 613 are placed at the connection between the first artificial head system 602 and the first power chamber 612 to convert flow energy as previously described herein. Similarly, a second artificial head system 614 is provided for the upper power chamber 616 with a second artificial head system pump 613, a second maintenance valve 615 and a second artificial head chamber 617. Auxiliary turbines 619 are optionally provided in this embodiment for the purposes previously described herein.

A single pontoon 618 is found within the pontoon chamber 620. The plant 600 is provided with upper 622 and lower 624 pontoon chamber compartments with associated valves 626 and 628, respectively, for draining the working fluid from the pontoon chamber 620. The lower pontoon chamber compartment pump 630 returns the working fluid from the lower pontoon chamber compartment 624 to the reservoir 610 head. The outlet of the upper 616 and lower 612 power chambers are simply valves 632 and 634, respectively, if the artificial head systems 602 and 614 elevate the operating head high enough so that the working fluid will naturally exit the power chambers due to the increase in pressure when compared to the reservoir 610 head. Variations of auxiliary pump 636 and valve 638 systems may also be used to assist in emptying or filling the pontoon chamber 620 throughout its cycle, during which the pontoon 618 motion may be used to operate a generator 650 via a connecting rod 652, for instance.

Further, optional neutral buoyancy systems 640 are shown in FIG. 14 as a representation of the optional placement of system elements, such as the upper 644 and lower 646 coil tubes, in states at or near neutral buoyancy to increase efficiencies. Optional auxiliary positioning mechanisms 642 are also shown for generally assisting in mechanical assistance in starting a plant into operation or to correct hang ups, etc. Similar symbols are used throughout the exemplary embodiments illustrated herein, should be taken to cover similar optional components, and are labeled as 640.

Figure 15:
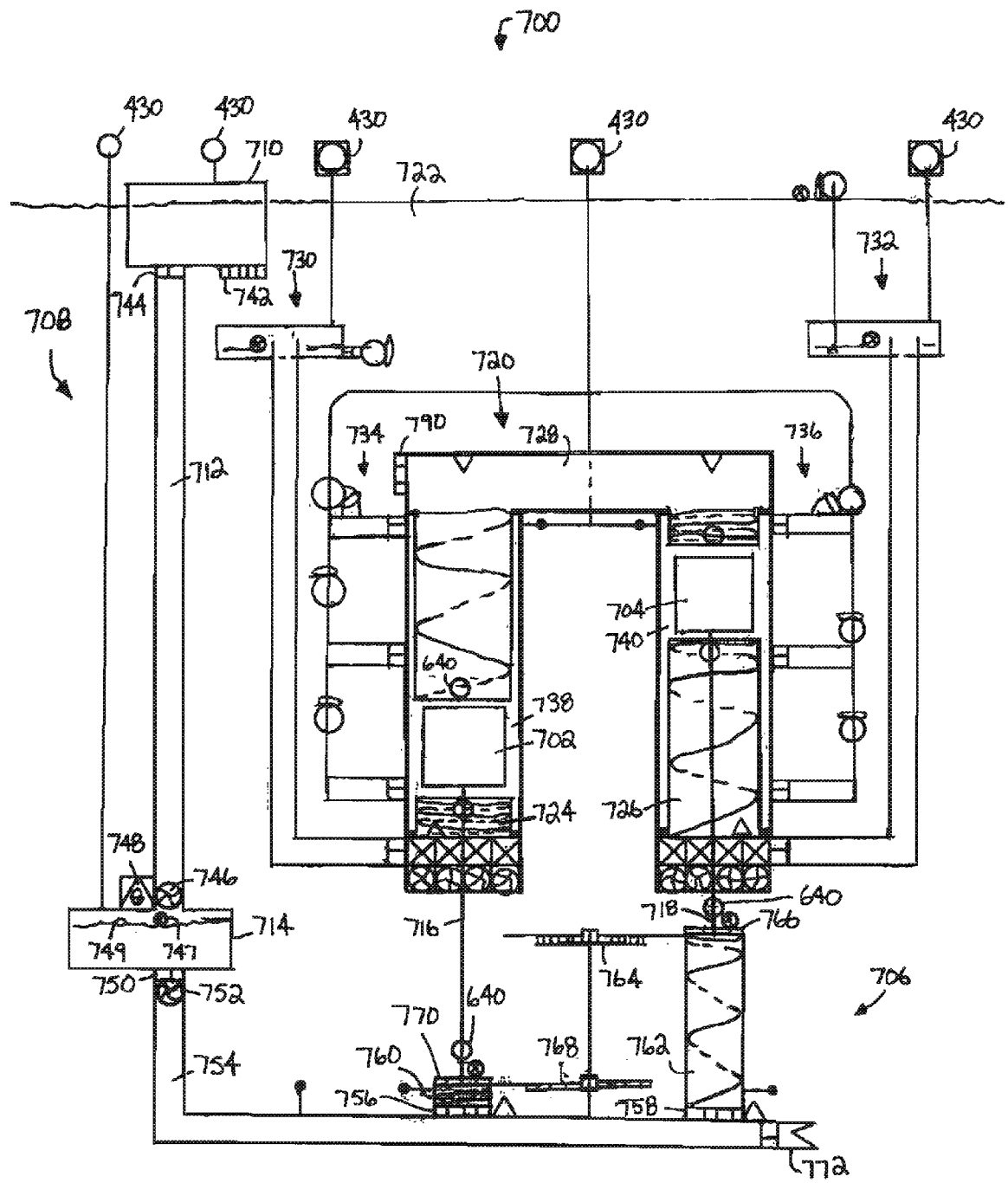
FIG. 15 depicts an embodiment including an artificial dam replenishment system.

Turning to FIG. 15, an exemplary embodiment of a plant 700 is depicted in which the buoyant forces acting upon the first 702 and second 704 pontoons are directed to use as a driving means for an artificial dam replenishment system 706. The artificial dam 708 includes components that work to replicate the functionality of a hydroelectric dam, such as an optional inlet chamber 710, a penstock 712 and a turbine chamber 714. The plant 700 in this case is configured similarly to the embodiment described in connection with FIG. 13, but with the artificial dam 708 and replenishment systems 706, and does not contain an artificial head system (although such a system may optionally be incorporated). The first 716 and second 718 connecting rods in FIG. 15 are coupled to the artificial dam replenishment system 706 instead of a generator or other such device, as in FIG. 13.

The purpose of the artificial dam replenishment system 706 is to use the power output by the power generating element (720 generally) to return the working fluid exiting the turbine chamber 714 to the head of the reservoir 722. The power generating element 720 of the plant 700 includes, for example, first 724 and second 726 power chambers, a constant volumetric region 728, first 730 and second 732 return systems and first 734 and second 736 means for reciprocally draining and filling the first 738 and second 740 pontoon chambers, respectively. This exemplary embodiment is meant to illustrate the optional use of an artificial dam replenishment system 706, and those skilled in the art should appreciate that other configurations for the power generating element 720 may be employed as desired, the output being used to drive the artificial dam replenishment system 706.

Working fluid from the reservoir 722 is received into the inlet chamber 710 via valve 742 as needed during plant 700 operation. The inlet chamber 710 is optional but preferred in that it may be used to protect the penstock 712 from the weather and any navigation hazards if the plant 700 is placed in a large body of water, or may serve as an access, housing or storage platform above the reservoir 722 working fluid level. Furthermore, penstock valve 744 may control the flow of working fluid from the inlet chamber 710 into the penstock 712, the operation of which being generally analogous to the operation of a traditional hydroelectric dam, in that the working fluid freefalls down the penstock 712 and through one or more turbine generators 746, thereby generating power at generation apparatus 748. The turbine chamber 714 collects the working fluid exiting the turbine generators 746 or optional auxiliary turbines 747 at a head 749 much lower than that of the surrounding working fluid in the reservoir 722.

Egress of working fluid from the turbine chamber 714 into the artificial dam replenishment system 706 occurs through a turbine chamber valve 750 and optional auxiliary turbine generators 752 into a replenishment system inlet 754.

Once working fluid enters and begins to fill the inlet 754, one of the first 756 or second 758 inlet valves will open. The valve that opens will be the valve corresponding to the pontoon at the bottom of its pontoon chamber—in this example the first 756 inlet valve corresponding to the first pontoon 702. The first 756 and second 758 inlet valves each respectively connect to a first 760 and second 762 expansion tube. The first expansion tube 760 in FIG. 15 will begin to expand as the first pontoon 702 is drawn upward in the power generating element 720, such that the opening of the first inlet valve 756 will cause the working fluid to flow from the replenishment system inlet 754 and into the volume of space within the expanding first expansion tube 756. This portion of the process allows the artificial dam replenishment system 706 to remove working fluid from the turbine chamber 714, thereby allowing for continuous power generation by the artificial dam system 708.

At or before the first valve 756 opens, the second inlet valve 758 closes as the second expansion tube 762 has been filled. An upper actuation mechanism 764 or other comparable controller then opens the upper second expansion tube valve 766. As the second pontoon 704 descends during the stroke subsequent to the view in FIG. 15, the expansion tube 762 collapses, effectively evacuating the working fluid into the higher head of the reservoir 722. Similarly, as the first pontoon 702 begins to rise, a lower actuation mechanism 768 closes the previously open upper first expansion tube valve 770 prior to the opening of the first inlet valve 756. Continuous operation of the power generating element 720 in this manner permits for constant or near-constant power generation by the artificial dam 708. Note also that a secondary connection 772 shown at a broken end signifies that either: one or more power generating elements 720 may be interconnected to cooperatively return the working fluids in the artificial dam system 708 to the head of the reservoir 722; or 2) to permit multiple artificial dam systems to be connected to the power generating element 720 for return to the head of the reservoir 722.

The boxed shape outlining the air vents 430 in this embodiment represent exemplary, optional wind turbines that may be placed at or near the air vents 430 in order to capture the flow of air moving into and out of the air vents 430 during the operation of the plant 700. Maintenance valve 790 is shown in an alternative position to the valve 590 depicted in FIG. 13, for illustrative purposes, and is used for initialization, access, or maintenance of the system 700. These optional components may be incorporated into other embodiments where desired.

Figure 16:
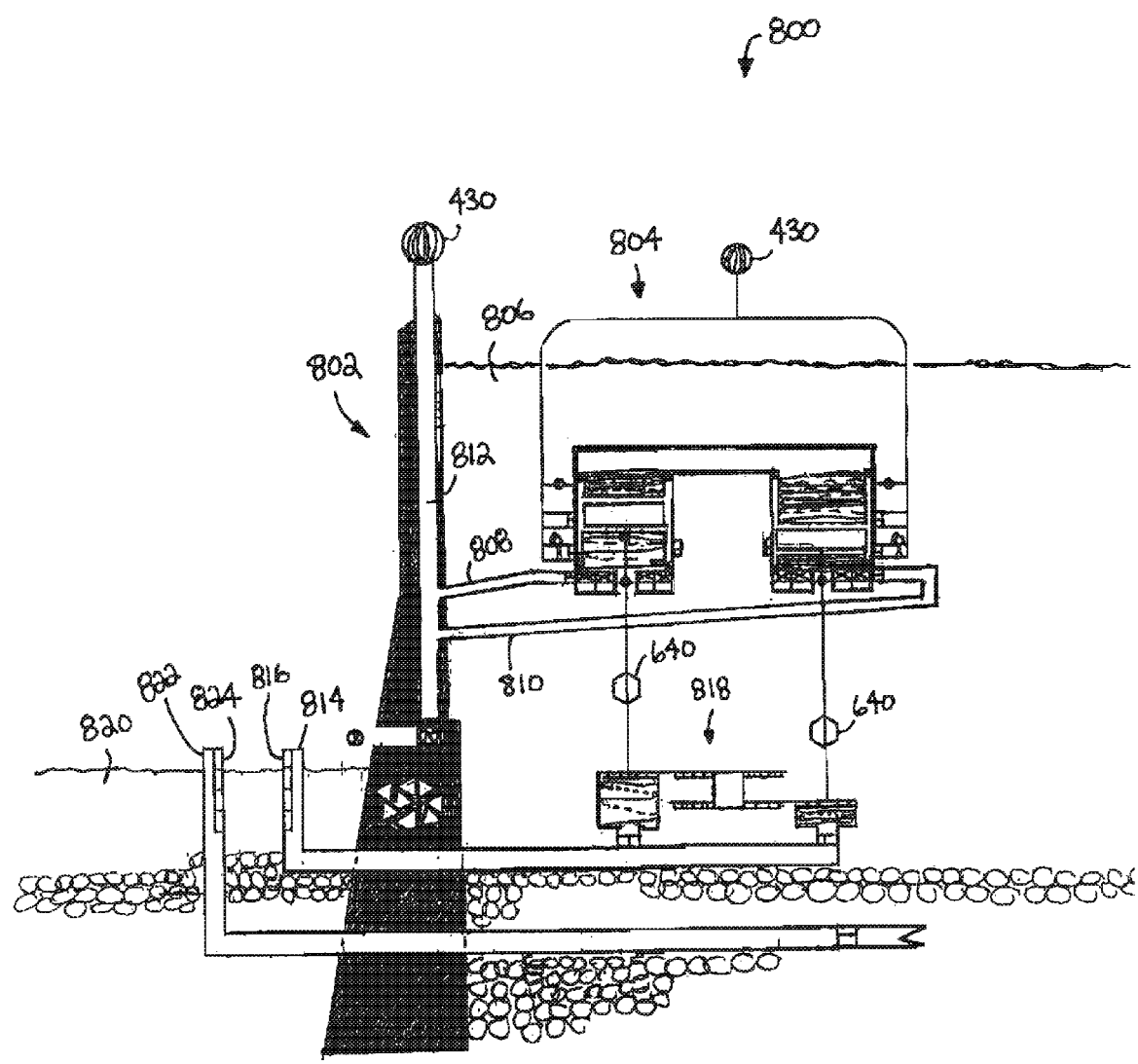
FIG. 16 depicts an embodiment including a means for replenishing a dam.

FIG. 16 is a plant 800 that is a variation of the exemplary embodiment depicted in connection with FIG. 15 with the inclusion of an actual hydroelectric dam 802 in the place of the artificial dam system (e.g., 708 in FIG. 15). The power generating element 804 in this example is illustrated with less detail than in FIG. 15, however it should be taken to include generally the features depicted therein. The power generating element 804 operates within the upstream reservoir 806 of the dam 802, and further includes an optional feature wherein the return systems 808 and 810 are incorporated to feed directly into the penstock 812 of the hydroelectric dam 802. In this case, return stations are not needed to return the working fluids evacuated from the power chambers to the head of the reservoir 806; however it should be noted that such pump-type return systems may be included if so desired.

The replenishment system inlet 814 may include an inlet valve 816 and returns working fluid from the downstream reservoir 820 (analogous to the turbine chamber 714 of FIG. 15) to the dam replenishment system 818, which in turn operates generally as described in connection with the artificial dam replenishment system 706 of FIG. 15. Note also the presence of one or more secondary replenishment system inlets 822 and inlet valves 824 that may optionally lead to additional power generating elements similar to 804 in order to increase the flow rate capability from the downstream reservoir 820 to the upstream reservoir 806. In general, this embodiment is used to reduce the flow rate from the upstream reservoir 806 to the downstream reservoir 820, or to maintain the net flow rate at zero while allowing the hydroelectric dam 802 to continue to generate power. This can be especially useful during dry seasons, or during times of high power demand, for instance.

Figure 17:
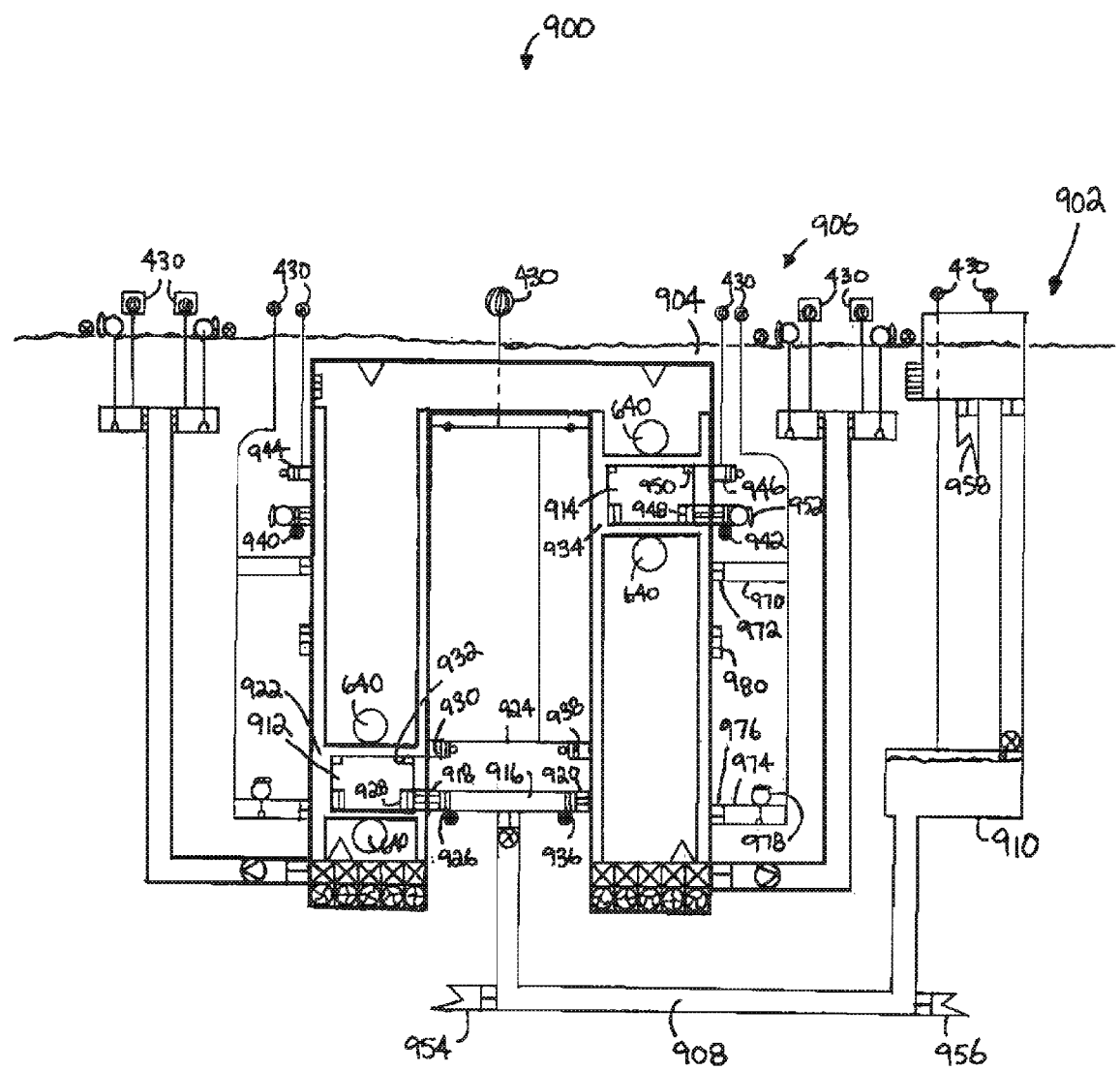
FIG. 17 depicts a further embodiment of a means for replenishing a dam.

A further exemplary embodiment of a plant 900 is depicted in FIG. 17 that is also configured to return working fluid from the low head side of an artificial dam system 902 (or alternatively an existing or new traditional hydroelectric dam as described in connection with FIG. 16) to the higher head of the reservoir 904. As an alternative to using the work output by the power generating element 906 to drive a separate artificial dam replenishment system (see 706 in FIG. 15 or 818 in FIG. 16), the power generating element 906 is itself used as the artificial dam replenishment system. In each case, the apparatus is generally configured with a means for replenishing a dam, whether by driving a replenishment system for an artificial or existing hydroelectric dam, or by incorporating the means for replenishment into the power generating system directly, as described in further detail below.

The replenishment system inlet 908 can be configured to channel the working fluid exiting the turbine chamber 910 of the artificial dam system 902 into the volumetric space within the first 912 and second 914 pontoons in an alternative fashion where they are in turn raised and emptied, thereby converting the use of the pontoons into components of a working fluid evacuation system. A common pontoon feed pipe 916 utilizes first 918 and second 920 feed pipe valves to direct the working fluid exiting the turbine chamber 910 into either the first 912 or second 914 pontoons, respectively. Note that each pontoon may be operatively connected to the turbine chamber 910 by a discrete and separate replenishment system inlet 908, making the use of the feed pipe 916 optional but preferred in order to reduce materials costs, and as will be further described below, if preferred in order to also operate an element of an additional exemplary means for draining and refilling the pontoon chambers. The working fluid will flow by hydrostatic pressure from the turbine chamber 910 through the replenishment system inlet 908 and feed pipe 916 to fill the pontoons 912 or 914 without the need for pumps if positioned above the lowest pontoon positions occupied during filling.

When a pontoon—such as the first pontoon 912 shown in FIG. 17—is empty and at the bottom of its pontoon chamber 922, it is operatively aligned (if needed) and connected with the pontoon feed pipe 916 by a lower fluid connection system 926 that joins the first feed pipe valve 918 with the first pontoon fluid valve 928, enabling working fluid to flow from the turbine chamber 910 into the first pontoon 912 while preventing working fluid in the pontoon chamber 922 from entering the pontoon 912. A lower vent connection system 930 likewise may be used to join an atmospheric air vent, such as 924, with a first pontoon air valve 932. The connection systems 926 and 930 need not necessarily be separate mechanisms, but may optionally be combined if desired, and are shown separately to aid in understanding. Note that the turbine chamber 910 is positioned horizontally inline or above the low position of the pontoons 912 and 914 such that the working fluid will flow naturally from the turbine chamber into a pontoon.

The connection systems 926 and 930 correspond to the first pontoon 912, and the second pontoon chamber 934 is equipped with similar lower connections systems 936 and 938 for use when the second pontoon 914 reaches the bottom of the second pontoon chamber 934. In a similar fashion, both the first 922 and second 934 pontoon chambers each have, respectively, a first 940 and second 942 upper fluid connection system, as well as a first 944 and second 946 upper vent connection system. The second upper fluid connection system 942 and the second upper vent connection system 946 are shown coupled to the second pontoon 914 at the top of the second pontoon chamber 934 at its second pontoon fluid valve 948 and second pontoon air valve 950. The second pontoon 914 has lifted the working fluid previously collected from the turbine chamber 910, and a second pontoon pump 952 empties the working fluid from the pontoon into the head of the surrounding reservoir 904.

Note that it may be advantageous to employ multiple artificial dam replenishment systems to an artificial dam system 902, as discussed previously herein. Broken connections 954 and 956 represent cycling turbine chamber 910 evacuation duties between multiple artificial dam replenishment systems. Similarly, for a large capacity replenishment system, it may be desirous to utilize multiple artificial dam systems, represented by connection 958. Those skilled in the art will appreciate that further depictions of such connections represent the use of additional systems to obtain smoother power generation through cycling, or to increase the capacity of a particular embodiment.

Figure 18:
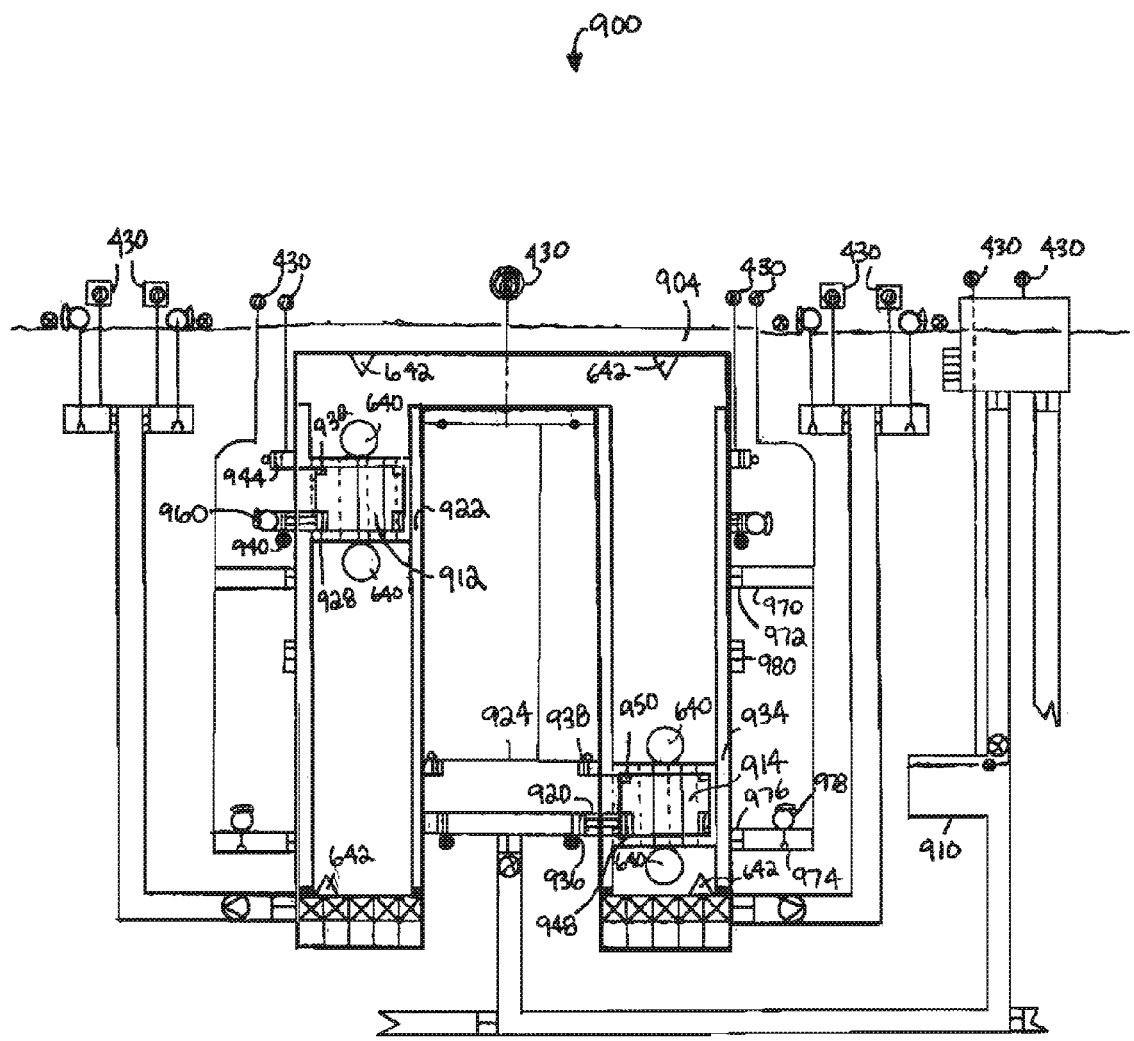
FIG. 18 depicts the embodiment shown in FIG. 17 at a later position in a power cycle.

FIG. 18 depicts the exemplary embodiment of the plant 900 described in FIG. 17, but at the end of the stroke beginning in that figure. Thus, the first pontoon 912 has reached the apex of the first pontoon chamber 922, and the first upper fluid connection system 940 and first upper vent connection system 944 have coupled with the first pontoon fluid valve 928 and the first pontoon air valve 932, respectively. The first pontoon pump 960 commences emptying of the first pontoon 912 of the working fluid received from the turbine chamber 910 as shown in FIG. 17. The pontoon pump 960 experiences a lower head differential between the working fluid in the pontoon 912 and the outside head of the reservoir 904 due to the pontoon having lifted its contents during the previous stroke.

The second pontoon 914 has simultaneously reached the lower bound of its movement in the second pontoon chamber 934, and the second lower fluid connection system 936 and second lower vent connection system 938 have coupled with the second pontoon fluid valve 948 and the second pontoon air valve 950, respectively. The second feed pipe valve 920 now opens and the empty second pontoon 914 begins to fill with working fluid received from the turbine chamber 910.

It is preferable that these embodiments also be provided with a means for draining and refilling the pontoon chambers, or put another way a means for nullifying the buoyancy of a pontoon, in order to reduce or eliminate any power needed to return the empty pontoon to the bottom of its respective pontoon chamber. In this particular embodiment, upper and lower pontoon chamber compartments are provided, along with a pontoon chamber valve and lower pontoon chamber compartment pump as one means for negating the buoyancy of a pontoon. Here, the buoyancy of the second pontoon 914 was negated prior to its return to the bottom of the second pontoon chamber 934 between FIGS. 17 and 18. First, a portion of the working fluid in the pontoon chamber 934 was emptied into the second upper pontoon chamber compartment 970 by opening its corresponding valve 972. When the upper compartment 970 is filled, the valve 972 is closed, and the second lower pontoon chamber compartment 974 proceeds to drain the remaining portion of working fluid from the second pontoon chamber 934 by the opening of its corresponding valve 976. Once full, the valve 976 is closed and the second lower compartment pump 978 evacuates the working fluid into the reservoir 904. While the second pontoon 914 receives working fluid from the turbine chamber 910, the second pontoon chamber 934 is refilled to re-establish the second pontoon's buoyancy whereby valve 972 is opened and the second upper compartment's 970 contents are emptied to partially fill the second pontoon chamber 934. Valve 972 is then closed, and pontoon chamber filling valve 980 is opened, thereby allowing working fluid to fill the remainder of the pontoon chamber 934 from the reservoir 904, at which point the filling valve 980 is closed and buoyancy has been re-established. The first pontoon chamber 922 has corresponding mirrored components that operate in the same manner in a reciprocating fashion.

Note that the pontoon valves (928, 932, 948 and 950) shown in FIGS. 17-18 are depicted in several locations for each pontoon. It may be preferable to include several valves about the circumference of each pontoon for convenience. Alternatively, for cradle systems that do not permit pontoon rotation about a vertical axis, single fluid and air valves are preferred. FIG. 18 depicts the use of a cage-type cradle system (see FIG. 12A), and thus multiple valve locations are preferred in order for the easiest alignment of the valves with the connection system mechanisms (e.g., 940 and 944).

Furthermore, optional auxiliary positioning mechanisms 642 are also shown for generally assisting in mechanical assistance in starting a plant into operation, for assisting with element positioning or alignment such as coil tubes, or to correct hang ups, etc. Optional neutral buoyancy systems 640 are called out as a representation of the optional placement of system elements, such as the upper and lower coil tubes, in states at or near neutral buoyancy to increase efficiencies, as previously described herein.

Figure 19:
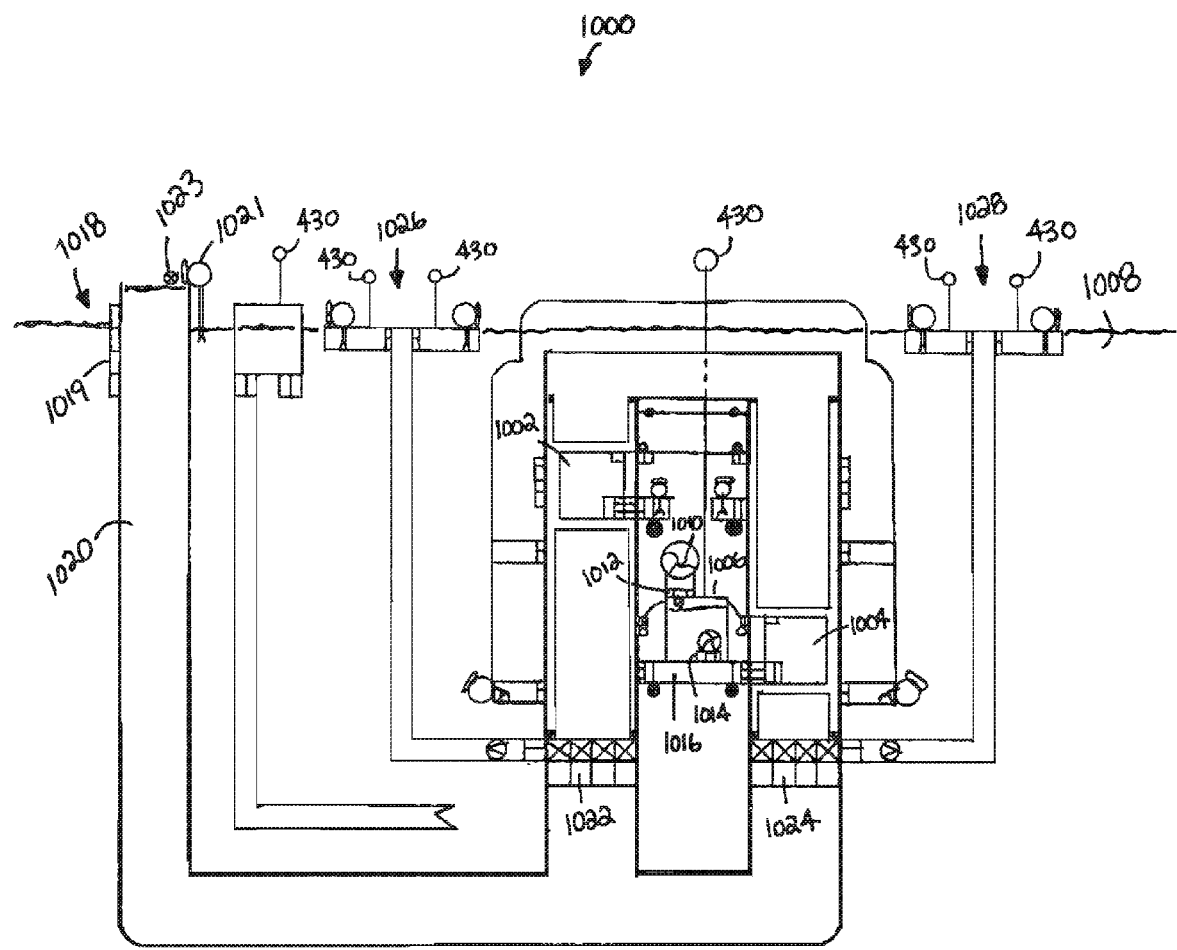
FIG. 19 depicts a further embodiment of a means for replenishing a dam.

Another exemplary embodiment of a plant 1000 is shown in FIG. 19. The plant 1000 incorporates the use of its first 1002 and second 1004 pontoons to replenish a turbine chamber 1006 similarly to the exemplary embodiment discussed in FIGS. 17-18. One variation between the embodiments is that the turbine chamber 1006 is filled with working fluid received from the reservoir 1008 directly through a submerged inlet with turbine generators 1010 situated therein. Upper 1012 and lower 1014 turbine chamber valves control the flow of working fluid into the turbine chamber 1006 and a common pontoon feed pipe 1016, respectively. Working fluid entering the common pontoon feed pipe 1016 is then received by the pontoons 1002 and 1004 reciprocally and carried to the top of their respective pontoon chambers as previously described.

Another important variation to note is that the plant 1000 in FIG. 19 includes an artificial head system 1018 to increase the pressure differential experienced between the first 1026 and second 1028 return systems at their corresponding first 1025 second and 1027 evacuation tube inlet valves, and the first 1022 and second 1024 power chamber valves. The artificial head system 1018 is further configured with a single artificial head chamber 1020 leading to both power chamber valves 1022 and 1024, a single artificial head chamber valve 1019 used for draining part of the water therein, if desired, and a single artificial head pump 1021 and optional auxiliary turbine 1023. The use of a single artificial head chamber 1020 permits the use of a single artificial head pump 1021, generally preferable from a cost standpoint over the use of two (see, e.g., FIG. 13).

Figure 20:
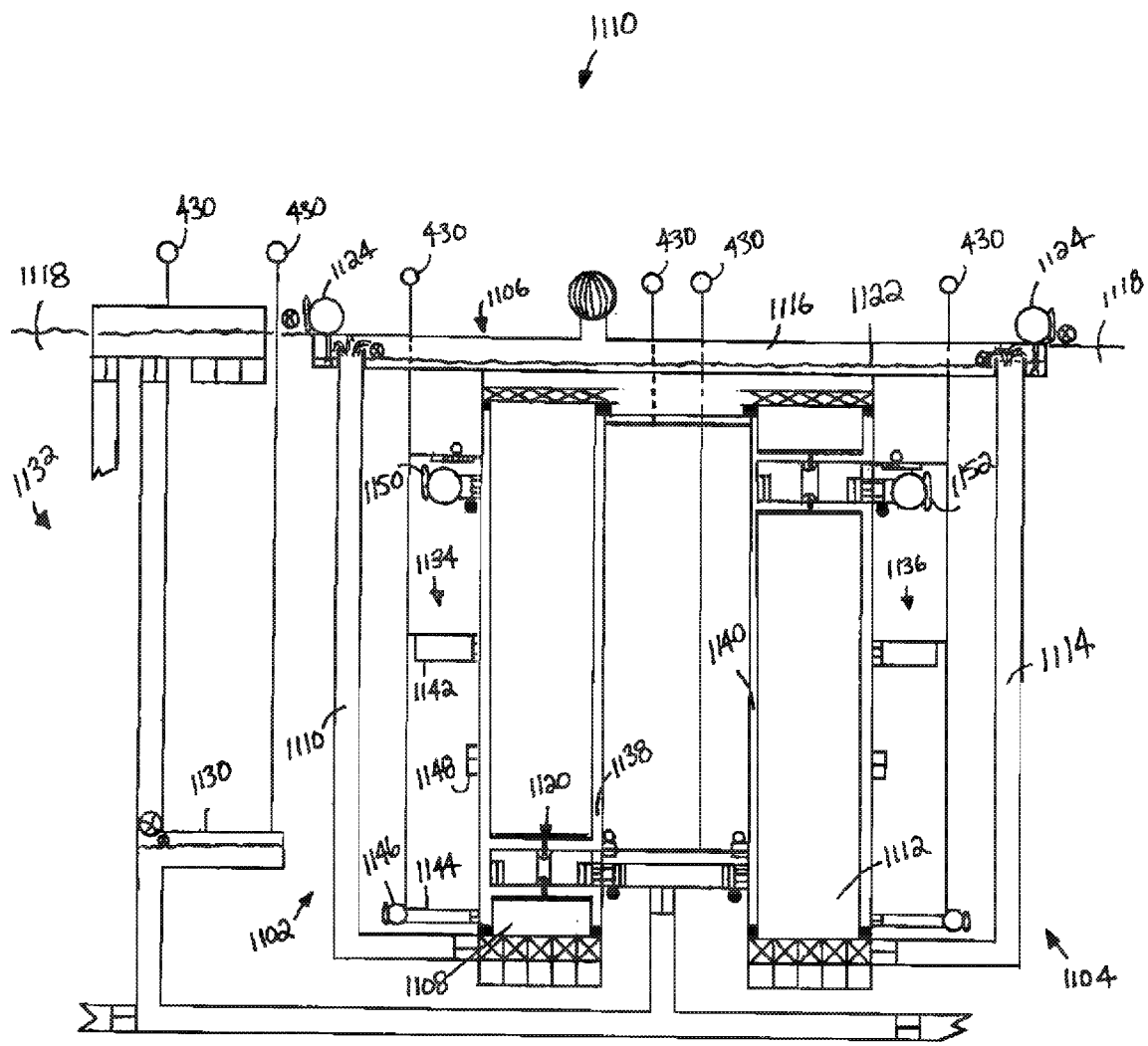
FIG. 20 depicts a further embodiment with an integral return station and a dam replenishment system.

As previously discussed herein, the main purpose of a return station is to receive a volume of working fluid as it flows from the power chamber due to pressure differentials, isolate it therefrom, and return the working fluid to the reservoir by pumping the short head of working fluid contained within. FIG. 20 illustrates an exemplary embodiment of a plant 1100 in which the first 1102 and second 1104 return systems share a single, integral return station 1106. The return station 1106 receives working fluid expelled from the first power chamber 1108 through the first evacuation tube 1110 of the first return system 1102, and from the second power chamber 1112 through the second evacuation tube 1114 of the second return system 1104. Both the first 1110 and second 1114 evacuation tubes empty at their distal end into the integral holding chamber 1116 of the return station 1106, the distal end being positioned below the fluid level of the reservoir 1118. One or more holding tank pumps 1124 are used to pump the working fluid in the holding chamber 1116 into the reservoir 1118, and should be selected to maintain the level 1122 of the working fluid in the holding chamber 1116 below the distal ends of the first 1110 and second 1114 evacuation tubes, thereby employing a fountain-type return station.

This exemplary embodiment of a return system and return station can be used to permit continual evacuation of the holding chamber 1116 during plant 1100 operation without the need to use multiple return stations per return system. Cycling between multiple return stations and isolating each from the power chamber with a valve as described previously can in some circumstances create excess cost, and therefore the fountain-type return station configuration is preferred. Note that the return stations need not be integral between, for instance, the first and second return systems, as shown in FIG. 20, and could be implemented as separate return stations depending upon the application (see, e.g., FIG. 15). Furthermore, the embodiments of the various return systems described herein may be used interchangeably to suit the user's circumstances wherever practical. Note also that the plant 1100 embodiment is shown with an exemplary use of the through-hole type cradle system 1120 as described previously in connection with FIG. 12B.

Additionally, the embodiment shown in FIG. 20 receives working fluid from a turbine chamber 1130 in an artificial dam system 1132, similar to the system 708 described in connection with FIG. 15. It also uses a first 1134 and second 1136 means for draining and refilling the first 1138 and second 1140 pontoon chambers, respectively, as previously described in FIG. 13, wherein for example the middle pontoon chamber compartment 1142, lower pontoon chamber compartment 1144 and pump 1146, and valve 1148 in FIG. 20 correspond to compartments 544 and 550, pump 554 and valve 548 for the first pontoon chamber. Furthermore, the working fluid carried by the pontoons are evacuated therefrom as described in connection with FIGS. 17 and 18, by first 1150 and second 1152 pontoon pumps. Those skilled in the art should appreciate the extent to which the various embodiments of the subcomponents may thus be used in varying combinations for further advantage.

Figure 21:
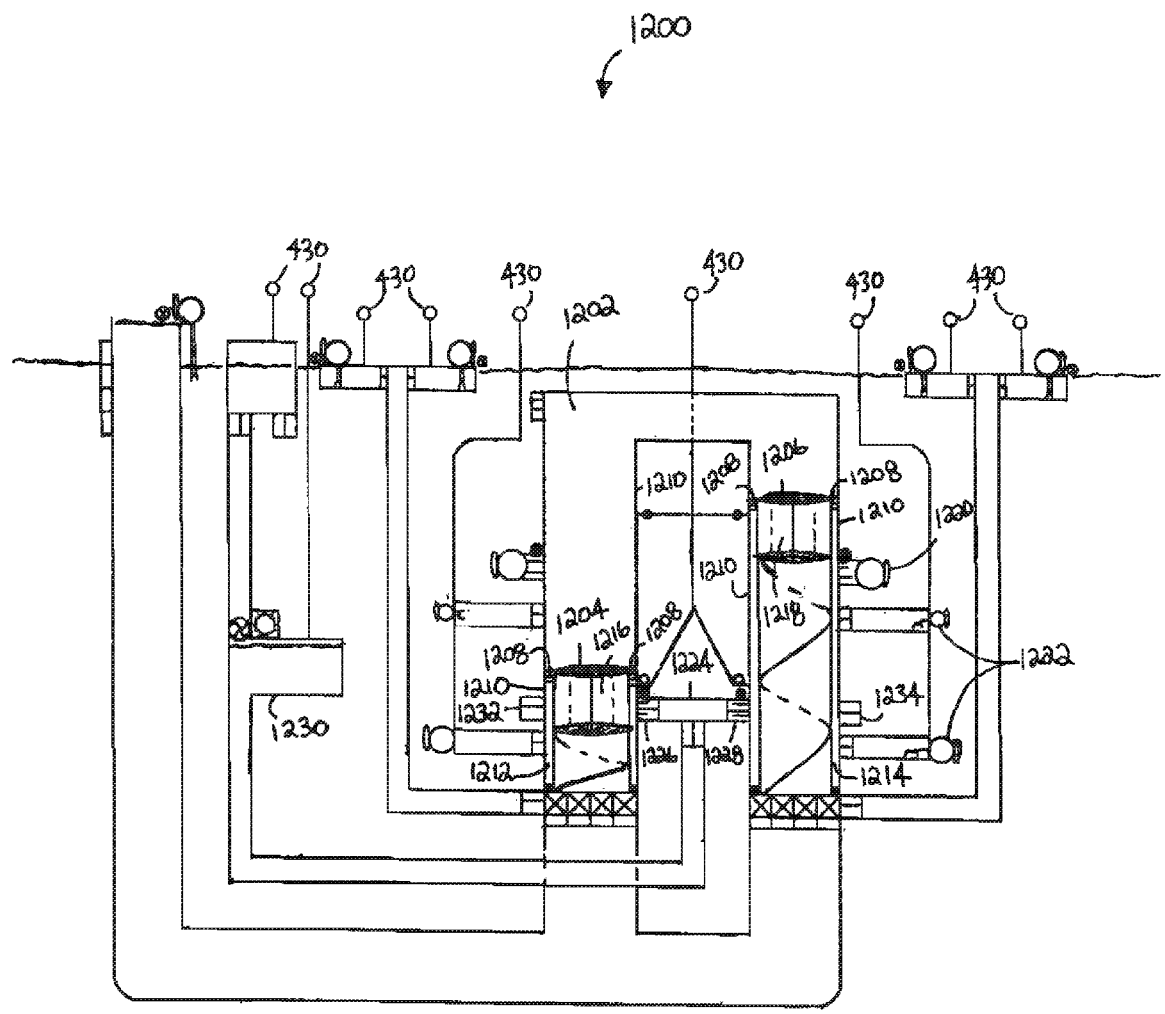
FIG. 21 depicts a further embodiment of the invention.

Turning to FIG. 21, a further exemplary embodiment of a plant 1200 is depicted wherein the constant volumetric region 1202 is defined at its movable ends by a first 1204 and second 1206 boundary that is sealed with movable (e.g., sliding or rolling) gaskets connections 1208 to the chamber walls 1210. The gaskets 1208 seal the boundary between the constant volumetric region 1202 and the first 1212 and second 1214 pontoon chambers.

The operation of the plant 1200 may be modified from the similar embodiment shown in connection with FIG. 20, for instance, in that the nullification or reduction of the buoyancy of the first 1216 and second 1218 containers may optionally be accomplished in the following manner. FIG. 21 depicts the second container 1218 as it is being evacuated of its contents by the second pontoon pump 1220. The working fluid in the second pontoon chamber 1214 must be drained, but instead of utilizing pontoon chamber compartments and pumps 1222, the working fluid therein is transferred, via common pontoon feed pipe 1224 and valves 1226 and 1228, into the first container 1216. Alternatively, a portion of such working fluid may be so drained, after some of it has been drained into the middle pontoon chamber compartment 1222. In either case, the remaining majority of the first pontoon volume is filled thereafter with working fluid from the turbine chamber 1230.

Working fluid is received to refill the first pontoon chamber 1212 via valve 1232 to re-establish buoyant forces (and later via valve 1234 for the second pontoon chamber 1214). In this method, therefore, the lower chamber compartments and pumps 1222 are preferably not used, except perhaps for maintenance purposes, or to drain the very last portion of working fluid from a pontoon chamber, and may be optionally excluded from the plant 1200 if so desired.

It will be clear to those skilled in the art that such a method of draining and refilling the pontoon chambers may be included in many other combinations and embodiments if so desired. For example, the exemplary embodiment of a plant 1300 depicted in FIG. 22 may utilize the previously described method to drain the first 1302 and second 1304 pontoon chambers, wherein the first pontoon 1306 receives, lifts and disposes of the working fluid drained from the second pontoon chamber 1304, and the second pontoon 1308 receives, lifts and disposes of the working fluid from the first pontoon chamber 1302. Alternatively, a system such as the means for reciprocally draining and filling the pontoon chambers described previously (e.g., see FIG. 13) utilizing optional first upper 1310 and lower 1311 and second upper 1312 and lower 1313 pontoon chamber compartments and first 1314 and second 1316 pontoon chamber pumps, for instance.

The plant 1300 additionally illustrates an embodiment wherein the working fluid evacuated from the first 1306 and second 1308 pontoons is pumped into an artificial dam inlet chamber 1318, as opposed to directly into the reservoir 1320. The first 1322 and second 1324 pontoon pumps reciprocally evacuate the working fluid carried by the pontoons directly into the inlet chamber 1318 via first 1326 and second 1328 connections. For this method of operation, an inlet chamber valve 1330 and inlet chamber pump 1332 may be provided for regulation of the working fluid level therein.

Figure 22:
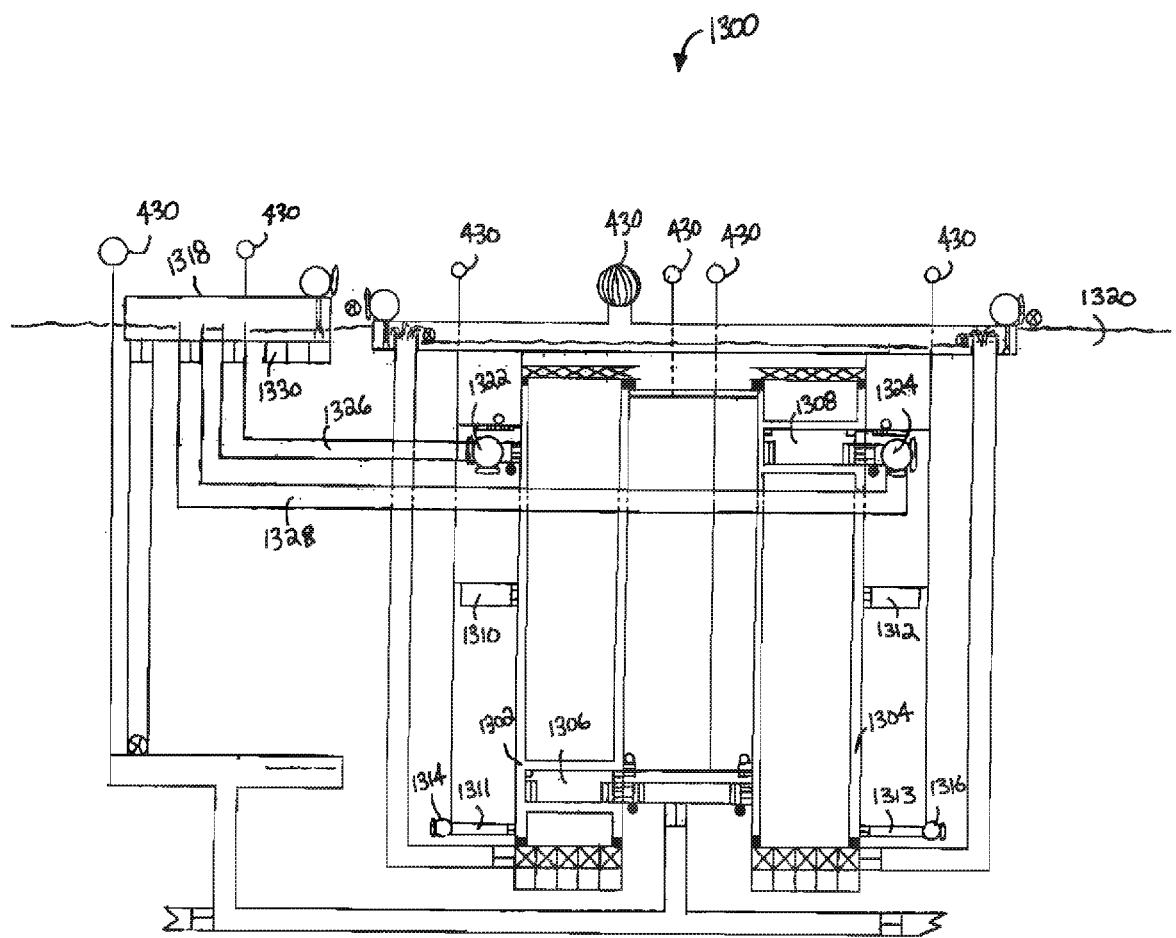
FIG. 22 depicts a further embodiment of the invention.
Figure 23A:
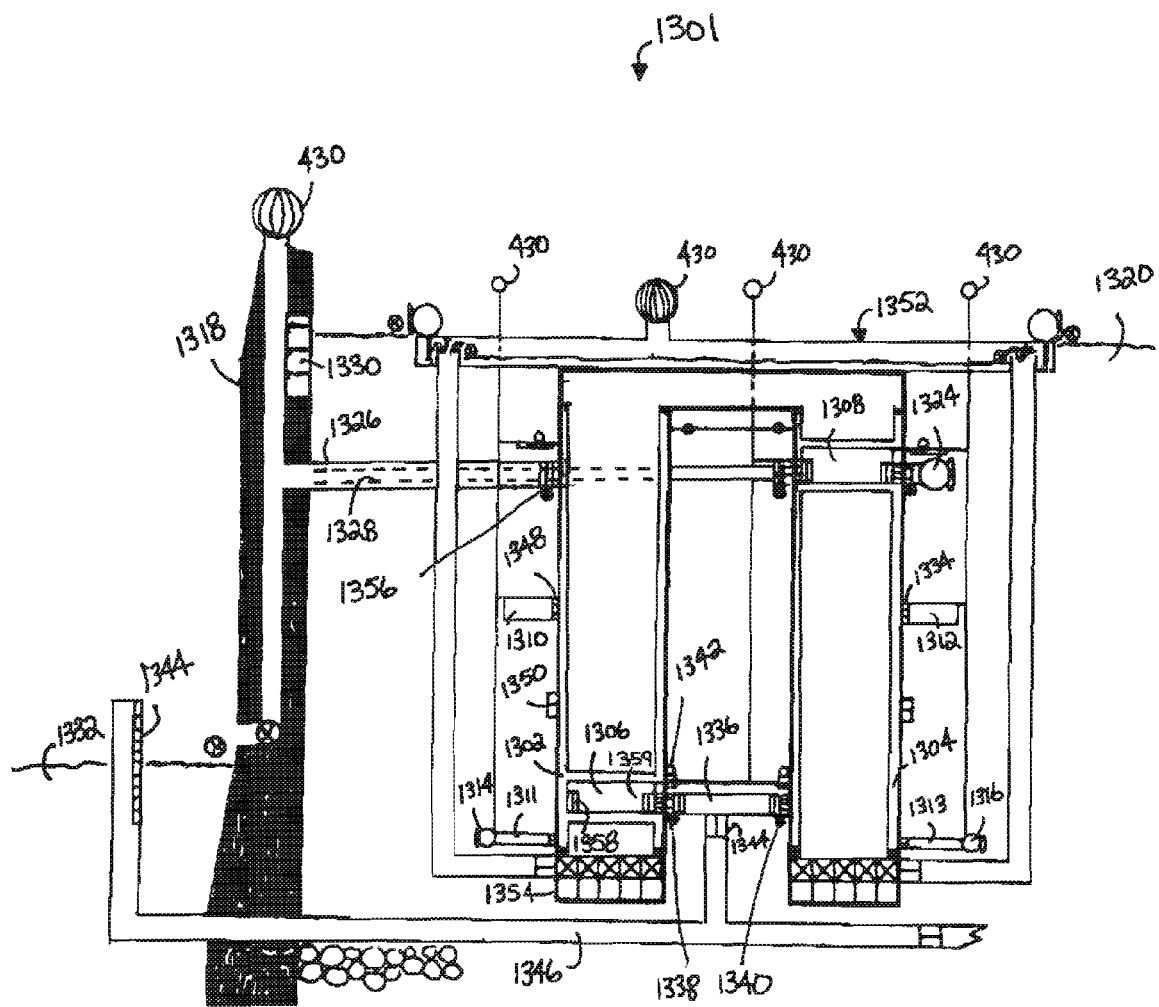
FIGS. 23A-C depict several embodiments of a means for replenishing a dam.
Figure 23B:
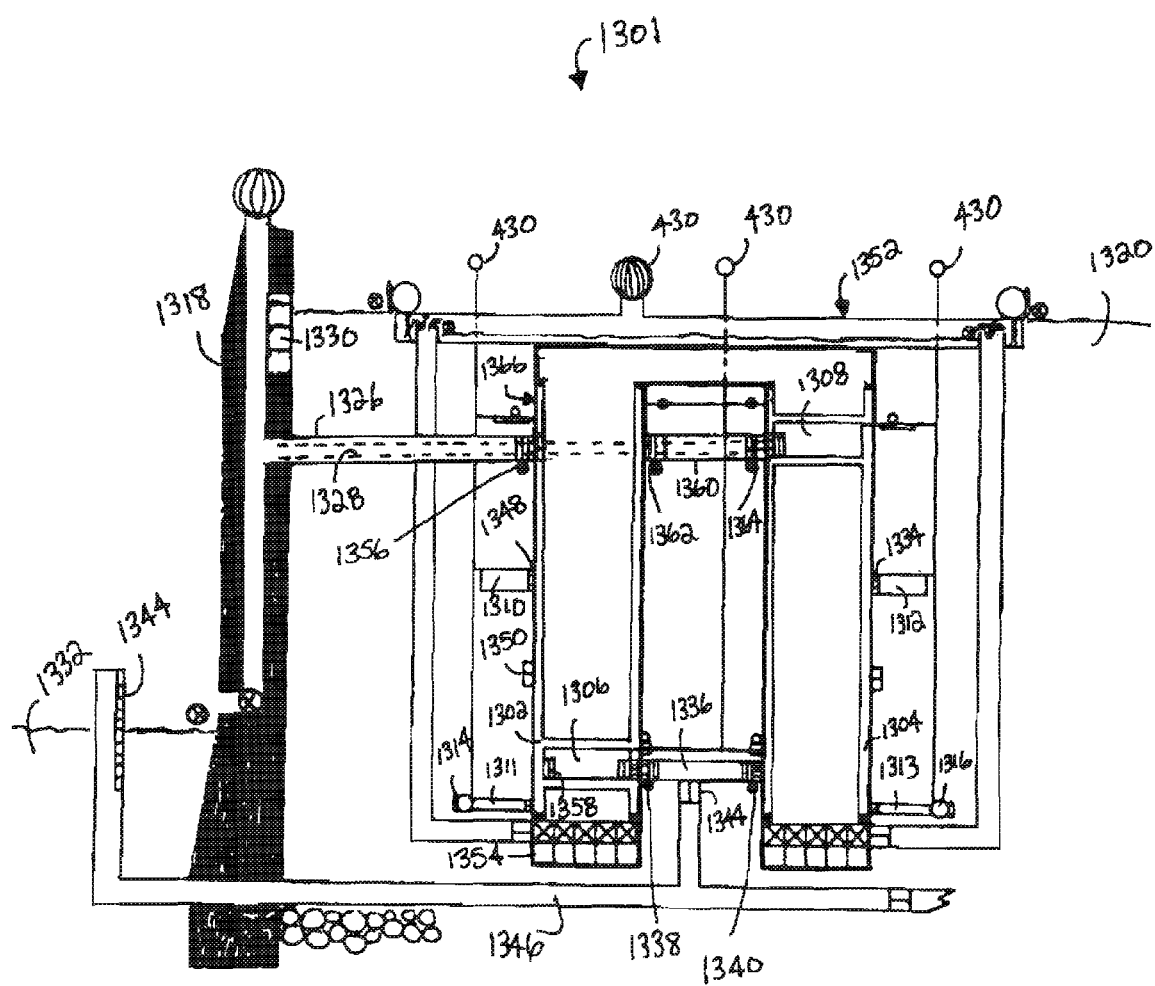
Figure 23C:
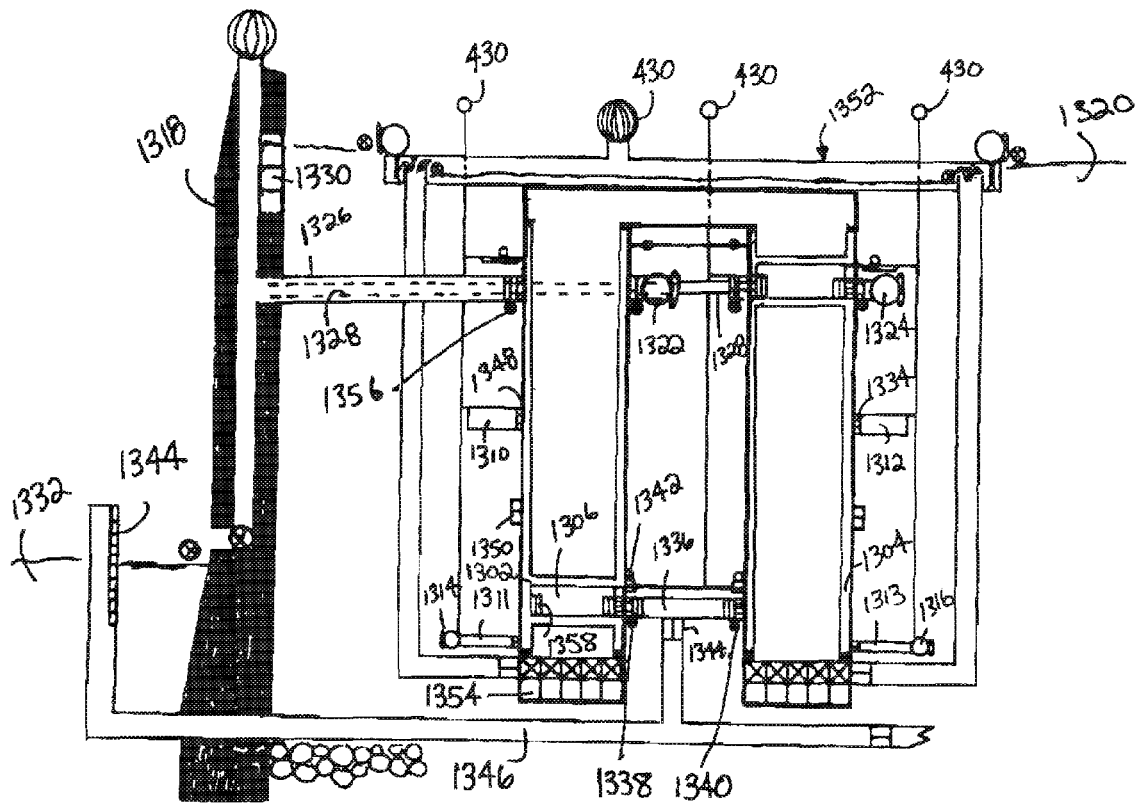

FIG. 23A-23C are further depictions of the embodiment shown in FIG. 22 wherein the plant 1301 is in use with a traditional hydroelectric dam, and corresponding components are labeled with like numbers. These figures also illustrate several exemplary embodiments of the various configurations that may be employed as a means for draining and refilling the pontoon chambers, without limiting the inclusion of other comparable equivalents. For example, FIG. 23A represents the evacuation of the working fluid received from both pontoon chambers 1302 and 1304 by the opposing pontoon (i.e., 1308 and 1306, respectively) by a single pontoon chamber pump 1324 actuated once during a complete cycle.

The embodiment shown in FIG. 23A operates in the following manner. At the position shown, the first pontoon chamber 1302 is empty and the second pontoon chamber 1304 is filled. The first pontoon 1306 is empty and ready to receive a portion of the working fluid that needs to be drained from the second pontoon chamber 1304 in order to negate the buoyancy of the second pontoon 1308. The remainder of the first pontoon volumetric space will be filled with working fluid by hydrostatic pressure before it ascends upward. The second pontoon 1308 is full of working fluid and ready to be emptied prior to descending. In some embodiments, such as described in connection with FIGS. 17 and 18, the pontoons are drained by pumping their contents back into the high head reservoir (i.e., 1320 in FIG. 23A). In this embodiment, the contents of the pontoons are drained back through the dam 1318 to the low head reservoir 1332.

Furthermore, this plant 1301 would nullify the buoyancy of the second pontoon 1308 by first draining a first portion of the working fluid in the second pontoon chamber 1304 into the second upper pontoon chamber compartment 1312 when the corresponding valve 1334 is opened. The valve 1334 is then shut when the compartment 1312 is full. The remaining working fluid in the second pontoon chamber 1304 is then drained via the common pontoon feed pipe 1336 by opening the valves of the first 1338 and second 1340 multipurpose systems, respectively, thereby allowing the working fluid to flow into the first pontoon 1306. The first pontoon lower air vent 1342 opens to vent the first pontoon 1306 during filling. Once equilibrium between the working fluid in the pontoon 1306 and the chamber 1304 is reached, the remaining fraction of working fluid can be pumped into the pontoon 1306 by utilizing the multipurpose systems integrated with the valves 1338 and 1340 in cooperation, the second lower pontoon chamber compartment 1313 may receive the remainder of the working fluid to be pumped into the high head reservoir 1320 by second pontoon chamber pump 1316, or a combination thereof. Note that the multipurpose systems 1338 and 1340 may be provided with pumps, multi-directional valves, and pontoon positioning elements, for example, if desired for the particular configuration. After the second pontoon chamber 1304 has been drained, filling preferably only a fraction of the total interior volume of the first pontoon 1306, the replenishment system inlet valve(s) 1344 is opened, along with the valve associated with the first lower multipurpose system 1338, and the rest of the first pontoon 1306 fills with working fluid received from the replenishment system inlet 1346 by operation of a hydrostatic pressure differential. Note that, upon the filling of the first pontoon 1306, the corresponding multipurpose system 1338 and lower air vent 1342 close their associated valves thereby disengaging from the first pontoon fluid and air vent valves at 1359, respectively.

While the second pontoon chamber 1304 is emptied, the first pontoon chamber 1302 must be refilled to re-establish the buoyancy of the first pontoon 1306. The first upper pontoon chamber compartment 1310 is emptied of its contents by opening its corresponding valve 1348. The valve 1348 is then closed after the compartment 1310 is drained, and then the pontoon chamber filling valve 1350 is opened, filling the rest of the first pontoon chamber 1302 with working fluid from the reservoir 1320. That valve 1350 is then shut, and buoyancy has been re-established. The integrated fountain-type return system 1352 is continuously pumping working fluid into the reservoir 1320, and the first power chamber valve 1354 opens. The first pontoon 1306 rises while the second pontoon 1308 descends, until the stroke is complete. The first upper multipurpose system 1356 then aligns the first pontoon 1306 and opens the working fluid connection with first pontoon fluid valve 1358 to allow all of the working fluid in the first pontoon 1306 to drain, via the first connection 1326, into the dam 1318.

The process is then reversed and the pontoons return to their positions seen in FIG. 23A. Note, however, that the second pontoon pump 1324 may then be used to evacuate a volume of working fluid equal to two times the volume of working fluid received by a single pontoon from a single pontoon chamber into the reservoir 1320, in order to maintain a neutral effect on the net flow of working fluid from the high reservoir 1320 to the lower reservoir 1332 if desired (i.e., the total volume of working fluid received by each pontoon from the opposing pontoon chamber). This evacuation may be carried out once per complete power station cycle, and has the advantage of only requiring one pump. Alternatively, the second pontoon 1308 could also drain completely into the dam 1318 via a second connection 1326, if a reduction in flow rate from the upstream 1320 to downstream 1332 reservoirs is not desired. Note also that the first 1326 and second 1328 connections may be physically separate channels that return to the dam 1318, or they may be combined at a junction valve, if desired.

In a further embodiment, each pontoon may return the volume of working fluid that it received from the opposing pontoon chamber back to the opposing pontoon chamber before draining the rest of the working fluid received via the replenishment system inlet back to the dam. One such exemplary embodiment is depicted in FIG. 23B. That version of the plant 1301 replaces the second pontoon pump 1324 (FIG. 23A) with an upper common feed pipe 1360. The upper common feed pipe 1360 provides a connection between the first 1306 and second 1308 pontoons, whereat the refilling process of the first pontoon chamber 1302, as shown in FIG. 23B, would proceed as follows. First, the first upper pontoon chamber compartment 1310 is emptied into the first pontoon chamber 1302 by opening its corresponding valve 1348, partially filling it, after which valve 1348 is closed. Next, the first 1362 and second 1364 upper feed pipe multipurpose systems open a connection between the first pontoon chamber 1302 and the second pontoon 1308, and a portion of the working fluid in the second pontoon 1308 is drained to fill the first pontoon chamber 1302. Note that the multipurpose systems 1362 and 1364 may be configured to pump the final portion into the upper area of the pontoon chamber 1366, and also that the second upper multipurpose system 1364 is also used to open a connection with the second connection 1328, allowing the rest of the contents of the second pontoon 1308 to empty into the dam 1318.

Yet other exemplary embodiments could contain a pontoon pump for each pontoon, such as first 1322 and second 1324 pumps depicted in FIG. 23C. For those embodiments, each pontoon pumps the volume of working fluid that it received from the opposing pontoon chamber into the high reservoir 1320 before evacuating the rest of its contents into the dam 1318.

Figure 24:
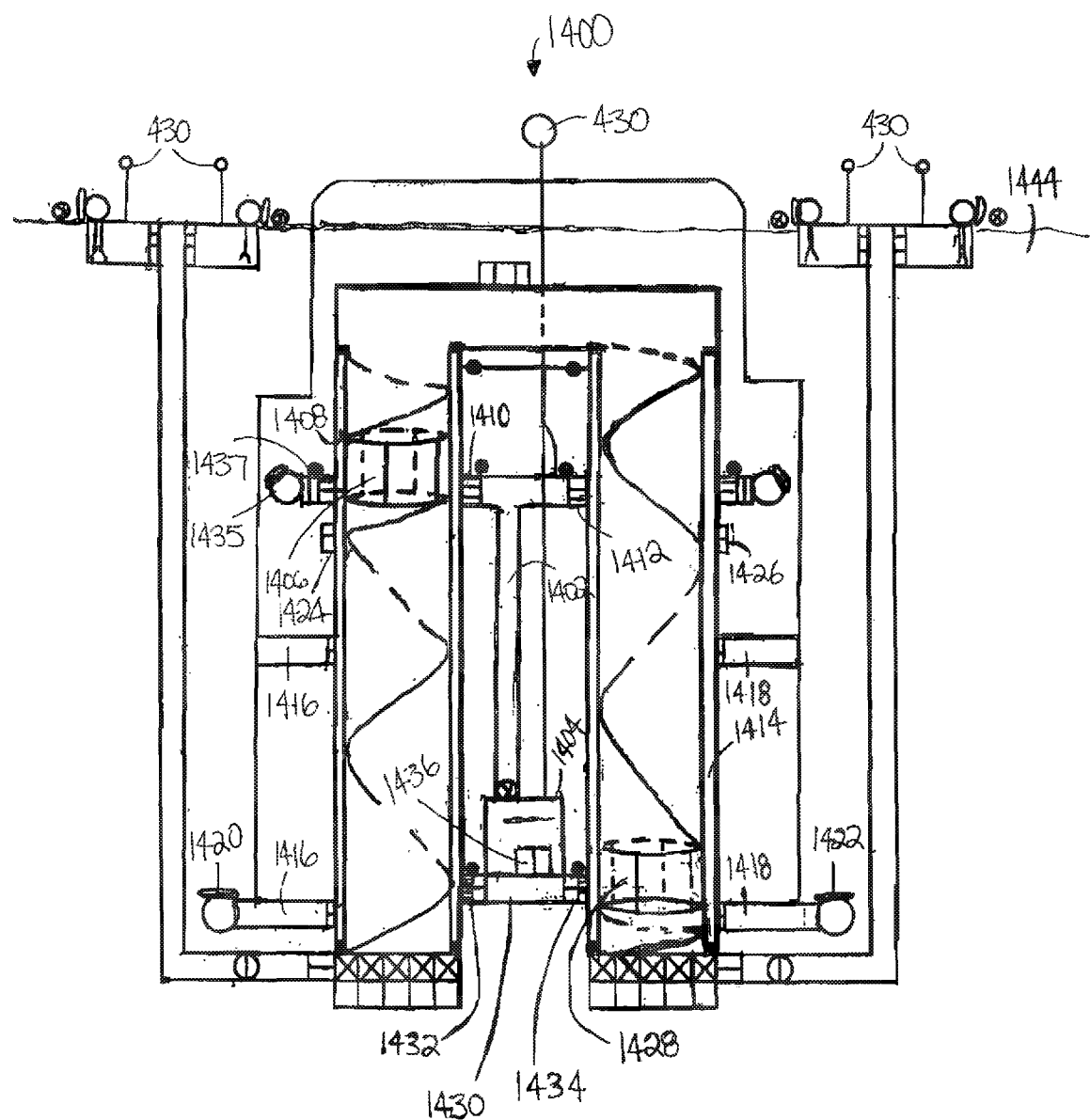
FIG. 24 depicts a further embodiment of the invention.

Some exemplary embodiments of the invention have been described wherein the pontoons are used to return a working fluid from the low head side of a penstock and turbine generator dam configuration near the high head side and evacuate the working fluid by pumping it from the pontoon into the high head reservoir. Additional embodiments, such as those shown in FIGS. 22-23C, have demonstrated that the working fluid received by the pontoons can be returned directly to the higher-head of the inlet chamber or penstock in the dam configuration. Another exemplary embodiment of a plant 1400 is depicted in FIG. 24, which illustrates that the penstock 1402 leading into the turbine chamber 1404 may be reciprocally fed from the pontoons at the top of their respective pontoon chambers, shown here as the first container 1406 at the top of the first pontoon chamber 1408. As in the embodiment shown in connection with FIG. 18, the plant 1400 utilizes first 1410 and second 1412 upper fluid connection and vent systems to evacuate the pontoons into the penstock 1402 to generate power.

FIG. 24 additionally illustrates two optional systems that may be used in combination or separately as the means of reciprocally draining and refilling the first 1408 and second 1414 pontoon chambers. As described in connection with FIGS. 13 and 23, for instance, optional first 1416 and second 1418 pontoon chamber compartments, first 1420 and second 1422 pontoon chamber pumps, and first 1424 and second 1426 pontoon chamber valves may be used to drain and refill the pontoon chambers to nullify or reduce the buoyancy of the pontoons for preparation of their descent when empty.

Alternatively, or in combination with the first upper compartment 1416 as previously described herein, the fluid in the first pontoon chamber 1408 can be drained into the second container 1428 through a common pontoon feed pipe 1430 by opening the valves in multipurpose systems 1432 and 1434. After the first pontoon chamber 1408 has been emptied and the buoyancy of the first pontoon 1406 negated, the valve 1432 is closed and turbine chamber valve 1436 is opened, thereby filling the second pontoon 1428 with working fluid from the turbine chamber 1404. Pumps may also be employed by the multipurpose systems 1432 and 1434 once equilibrium is reached prior to all of the working fluid being transferred into the second pontoon 1428. The remaining majority of the working fluid in the first pontoon 1406 may then be passed via multipurpose system 1410 to the penstock 1402 to pass back into the turbine chamber 1404 and into the second pontoon 1428. Alternatively, the means for reciprocally draining and filling the first and second pontoon chambers operates similarly to that described in connection with FIG. 21 and that portion of the working fluid in the pontoon is pumped into the reservoir 1444, for instance via draining pump 1435 and multitask fluid and vent system 1437. Those skilled in the art will appreciate that any of these methods described herein may be used to drain and refill the pontoon chambers, and that the depiction of multiple subsystems suited for the task in a given embodiment are intended for illustrative purposes if not utilized.

Figure 25:
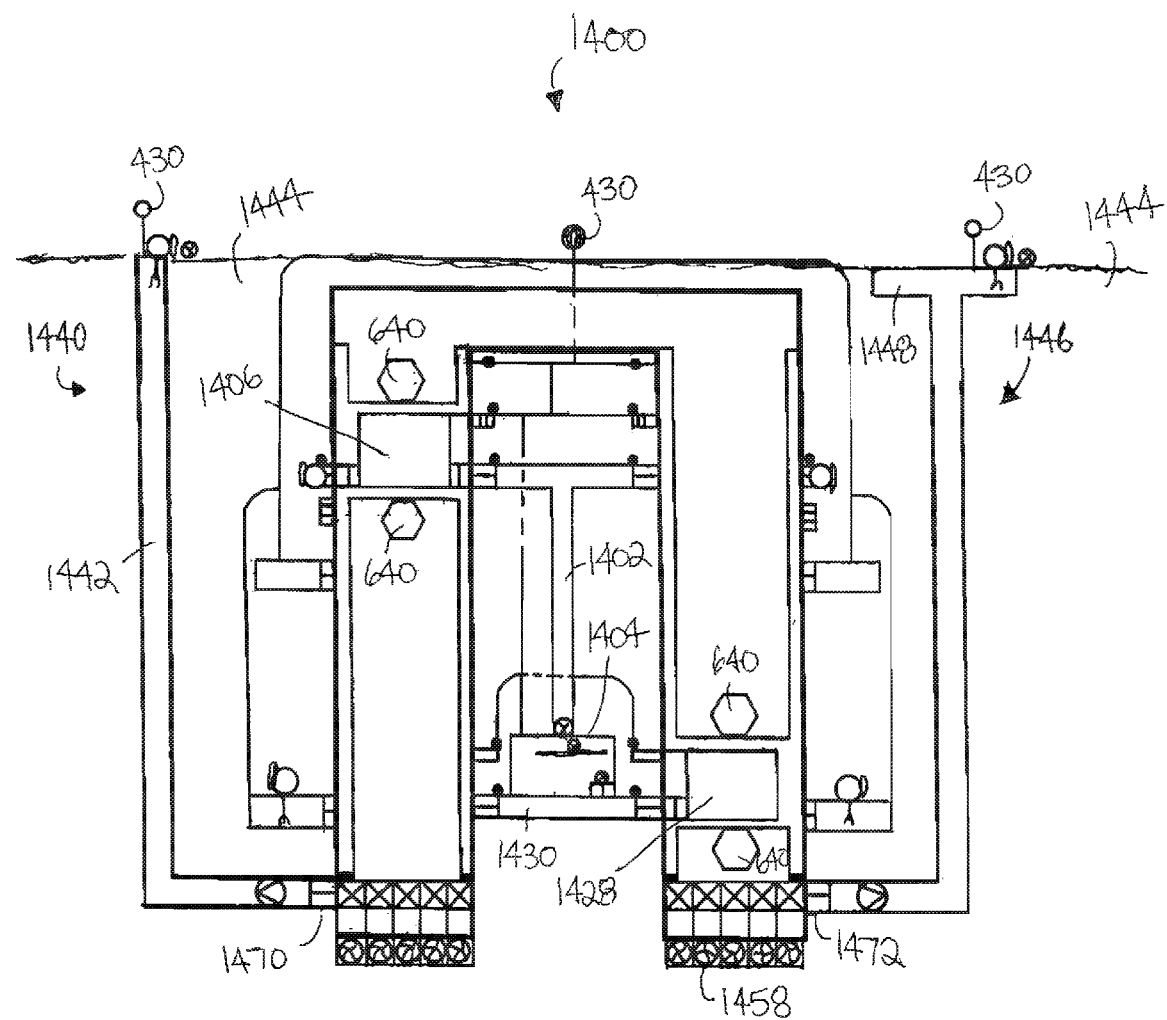
FIG. 25 depicts the embodiment of the invention as shown in FIG. 24 with further return station and container variations.
Figure 26:
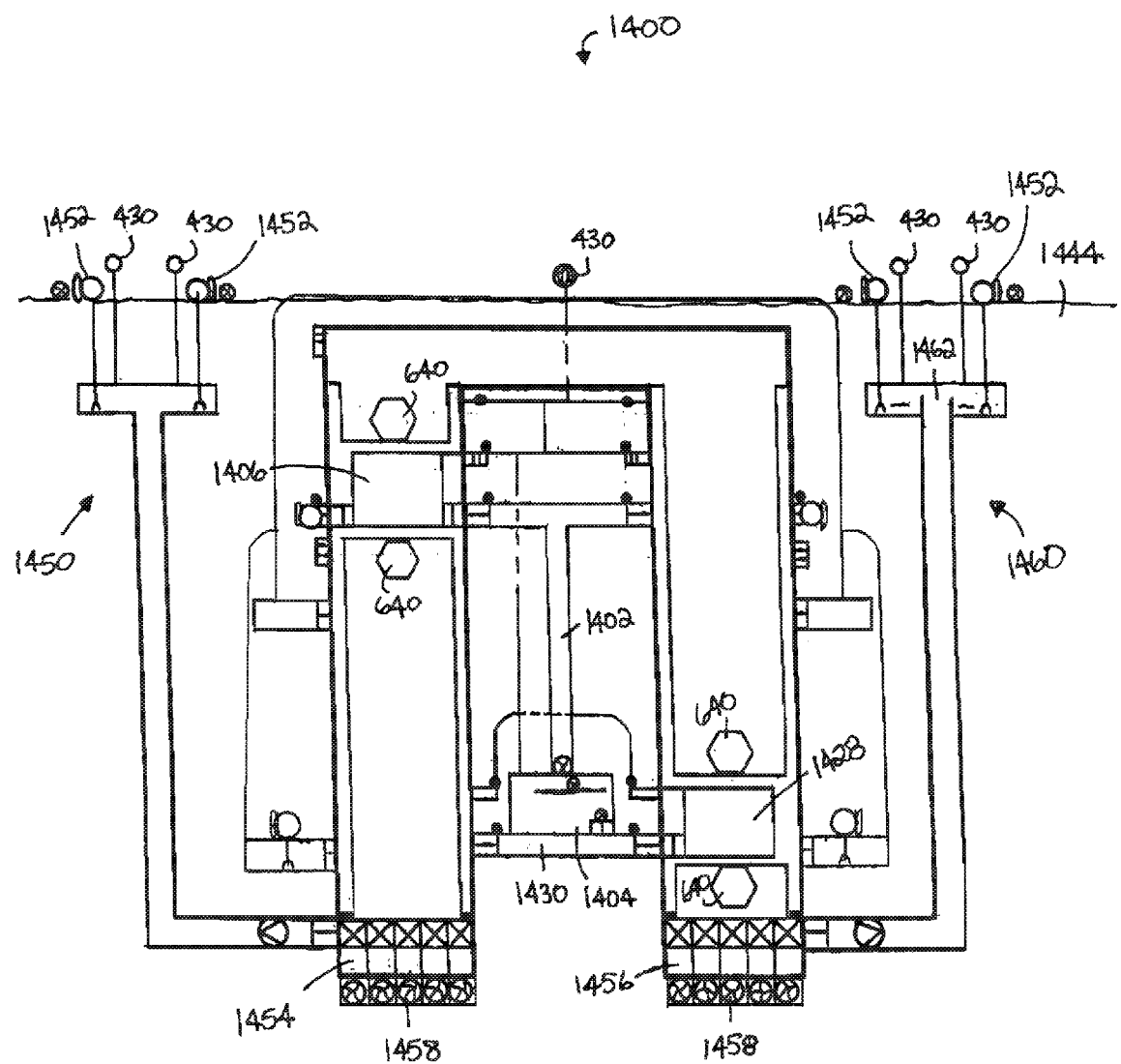
FIG. 26 depicts the embodiment of the invention as shown in FIG. 24 with further return station and container variations.

FIGS. 25-26 depict variations of the exemplary embodiment described in connection with FIG. 24, with the difference being the use of further embodiments of various return system configurations. For example, the first 1440 and second 1446 return systems in FIG. 25 do not include return stations, in that they do not contain holding tanks that are isolated from the power chamber for any portion of the evacuation process except at evacuation tube inlet valves 1470 and 1472, pumping directly from the evacuation tube 1442 into the reservoir 1444 in the case of the first return system 1440 and from the non-isolated holding tank 1448 in the second return system 1446. The first return system 1450 shown in FIG. 26 is similar to the second return system 1446 with the exception that the distal end of the system is deeper in the reservoir, requiring the return system pumps 1452 to pump a greater head of working fluid, but also allowing for a higher pressure differential experienced at the first 1454 and second 1456 power chamber external valves. The second return system 1460 is similarly at a greater depth, and utilizes a fountain-type return station 1462 as previously described herein. Note also the presence of optional neutral buoyancy systems 640 as described in connection with FIG. 13, and the optional inclusion of gate turbine generators 1458 at the power chamber inlets used to generate additional power from the flow of working fluid entering the power chambers.

Figure 27:
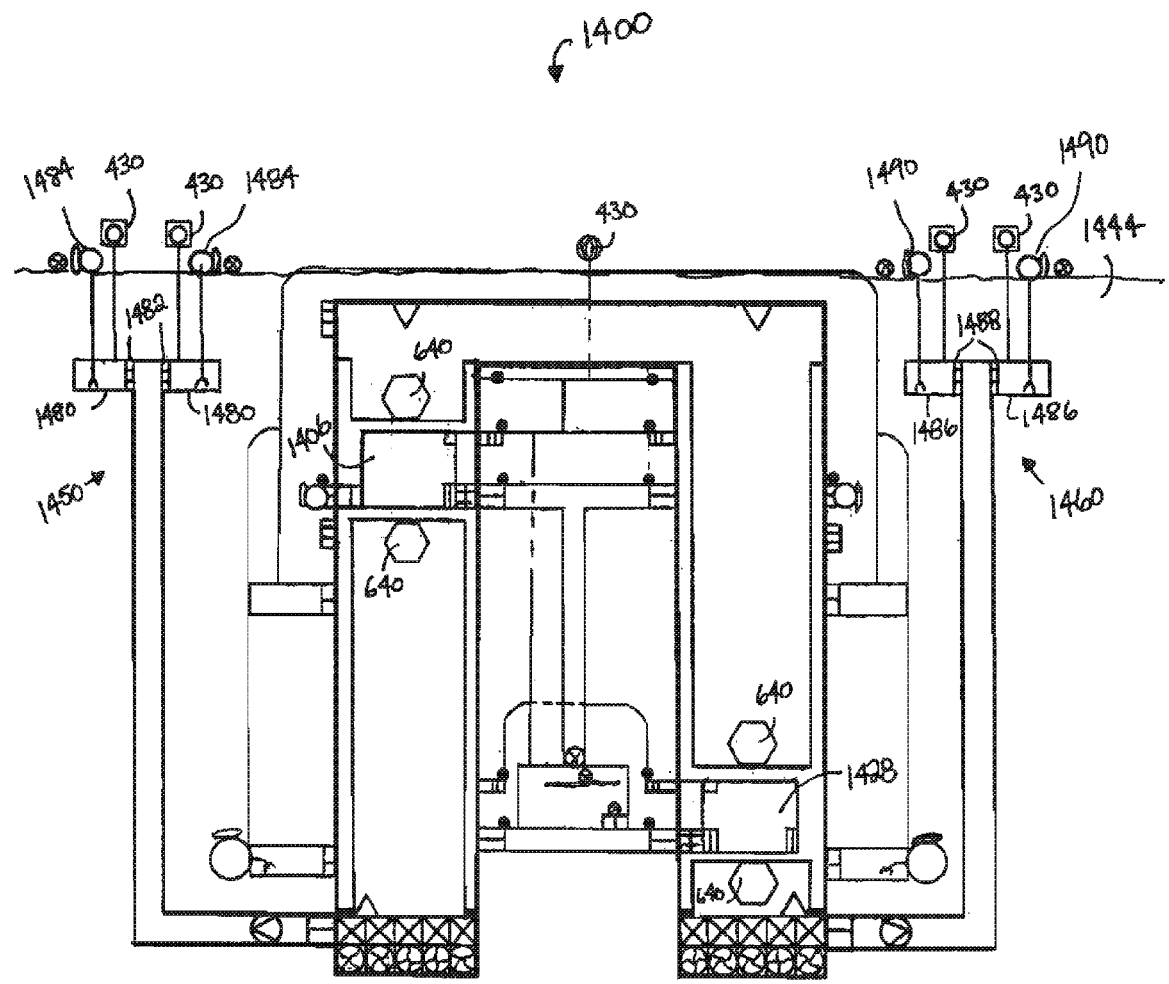
FIG. 27 depicts the embodiment of the invention as shown in FIG. 24 with further return station and container variations.

FIG. 27 illustrates that, while many of the exemplary embodiments herein are depicted with pontoons, such as first and second pontoon 1406 and 1428 shown therein, the system is identical to that shown in FIG. 24 because containers and pontoons function in a similar manner as sealed airspaces (or fluid spaces, solution spaces, etc.) when buoyant forces are not being used to drive other devices (e.g., generators as in FIG. 13. See FIG. 21 above and the related disclosure for an additional example of the use of a general container. Containers are fixed between the power chamber and constant volumetric region and do not experience significant buoyant forces from the pontoon chamber working fluid, but may still be used to lift working fluids from higher to lower heads as previously described herein. Pontoons can be containers where they are fixed to the power chamber and constant volumetric region boundaries, unlike the pontoons 1406 and 1428 shown in FIG. 27. The first 1450 and second 1460 return systems in this embodiment also are configured to each bear two return stations that are each in turn provided with a holding chamber 1480, a holding chamber valve 1482 and a holding chamber pump 1484. The alternating filling and draining of two separate holding chambers per return system permits for lower volumetric flow rates to be used—i.e., the return station has a longer period of time over which to evacuate its contents.

Figure 28A:
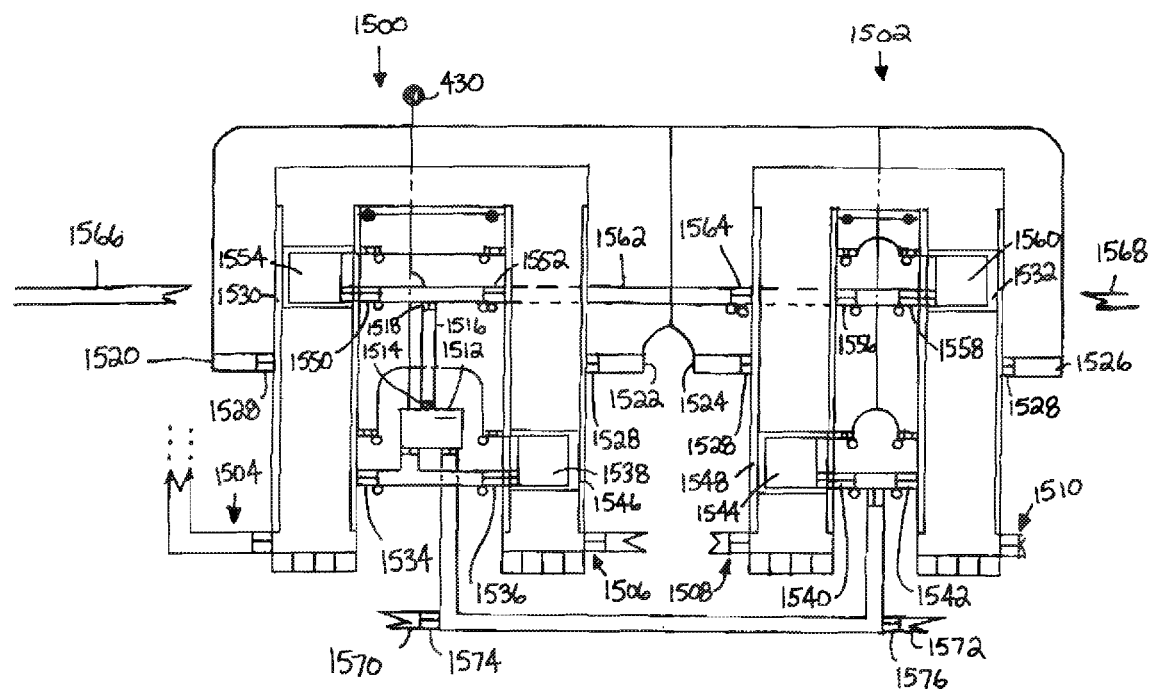
FIGS. 28A-B depict the use of multiple power generating systems interconnected to increase flow rate or to smooth the flow rate curve.
Figure 28B:
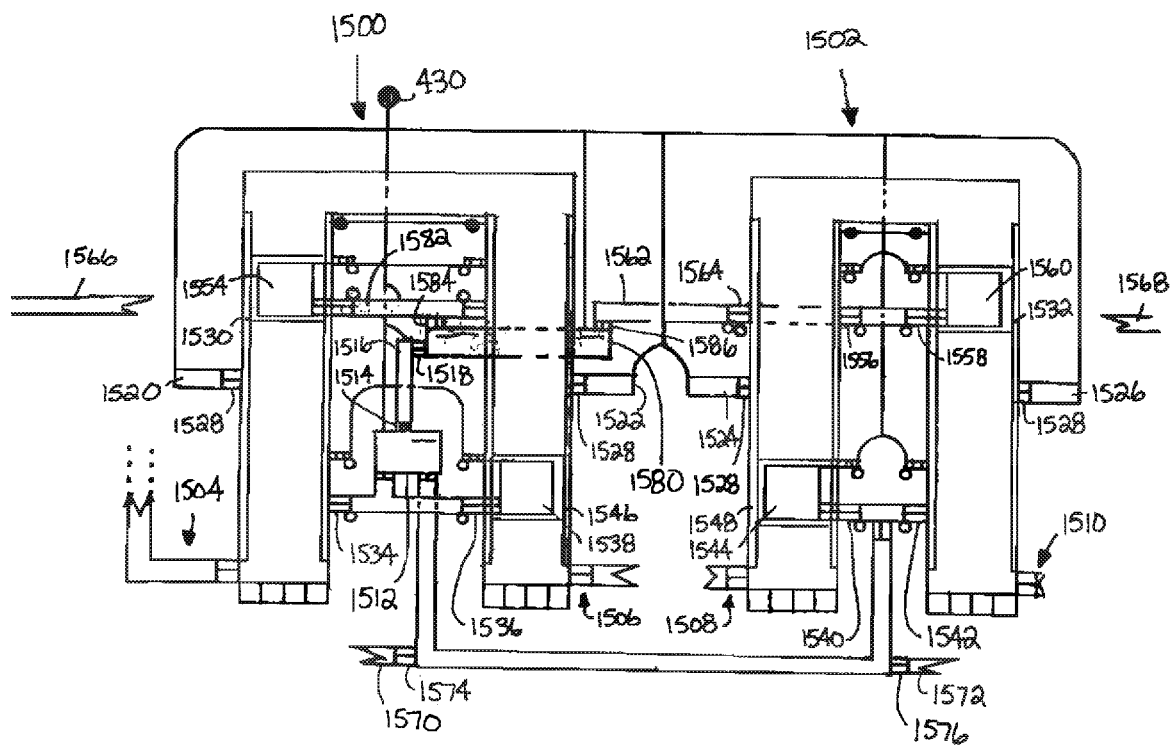

Turning to FIGS. 28A and 28B, the use and exemplary interconnection of multiple power generating elements such as 1500 and 1502 are illustrated to demonstrate that modular components of the invention can be utilized together to increase throughput and power generating capacity if desired, as discussed previously in connection with FIG. 17. The interconnection of power generating elements will also smooth the flow rate curve of working fluid entering the penstock over time, which is of course desirable when generating power for distribution by power grid. Details such as the configuration of the return systems 1504, 1506, 1508 and 1510 are excluded to highlight exemplary connections between an artificial dam system with a turbine chamber 1512 and multiple power generating elements such as 1500 and 1502. Vent systems 430 can be interconnected and centralized as well.

Pontoon chamber compartments 1520 and 1522 are shown in use with the first power generating element 1500, and 1524 and 1526 are shown in use with the second power generating element 1502. Each of these compartments are connected via a valve 1528 to a corresponding pontoon chamber which it partially drains to negate the buoyancy of the pontoon in its corresponding chamber. For example, assuming in FIG. 28 that the first pontoon chamber 1530 of the first power generating system 1500 and the second pontoon chamber 1532 of the second power generating system 1502 are both ready for draining, the valves 1528 for the corresponding compartments 1520 and 1526 open and a portion of the pontoon chambers' 1530 and 1532 working fluid is drained therein, after which the valves 1528 are closed.

Next, the first 1534 and second 1536 lower multipurpose systems in the first power generating system 1500 open a connection between the first pontoon chamber 1530 and the second pontoon 1538, and the first 1540 and second 1542 lower multipurpose systems in the second power generating system 1502 open a connection between the second pontoon chamber 1532 and the first pontoon 1544. In both cases, the remaining working fluid in the pontoon chambers drains into the opposing pontoon until equilibrium is reached, at which point the multipurpose systems 1534 and 1536, and 1540 and 1542 operate together to pump the remaining fraction of working fluid into the pontoon, thereby substantially draining the pontoon chamber.

During the draining of a pontoon chamber to negate the buoyancy of its pontoon, the opposing pontoon chamber must be refilled. In this case, the compartments 1522 and 1524 would first empty their contents via valves 1528 into, respectively, the second pontoon chamber 1546 of the first power generating system 1500 and the first pontoon chamber 1548 of the second power generating system 1502. Valves 1528 then close. The first 1550 and second 1552 upper multipurpose systems open a connection between the first pontoon 1554 and the second pontoon chamber 1546 of the first power generating system 1500, and the first 1556 and second 1558 upper multipurpose systems open a connection between the second pontoon 1560 and the first pontoon chamber 1548 of the second power generating system 1502, and working fluid is transferred from each pontoon to its opposing pontoon chamber until equilibrium is reached, at which point the upper multipurpose systems cooperate to pump the remaining fractional volume of working fluid, thereby filling the pontoon chambers.

After the pontoon chambers 1546 and 1548 have been filled, each of the pontoons 1554 and 1560 are connected to the penstock 1516 of the artificial dam and the inlet valve 1518 is opened to receive the remaining working fluid contents of the pontoons. This may occur simultaneously, or in a reciprocal fashion to create a more constant flow rate, if desired. For example, upper multipurpose system 1552 closes the connection to the second pontoon chamber 1546, allowing the remaining working fluid to enter the penstock 1516. Likewise, upper multipurpose system 1556 closes and the contents of the second pontoon 1560 are directed, via joining return pipe 1562 to the inlet 1518. Any desired connection scheme may be employed by those skilled in art to fit the needs of a particular application, such as by using individual return pipes for each pontoon chamber to return working fluid to the penstock, by shared pipes (e.g., 1562, which alternatively control ingress from first 1544 and second 1560 via a directional valve 1564, as preferred but optional), or other comparable equivalents. For example, multipurpose system 1552 may also control the ingress of working fluid from the second power generating system 1502 pontoons, or they may be directed into the penstock inlet 1518, as desired.

Also illustrated in FIG. 28A are additional connections represented by joining return pipes 1566 and 1568, which may lead from third and fourth power generating systems (not shown), or more. Likewise, additional replenishment inlet connections 1570 and 1572 are shown, accessible via valves 1574 and 1576 respectively, wherein the pontoons in the additional third and fourth power generating systems would receive working fluid from the turbine chamber 1512, thereby increasing the capacity of the artificial dam, and therefore the power generating capacity of the system on the whole. As additional power generating elements are connected to the artificial dam system, the flow rate of the working fluid increases, generating additional power at the turbine generator(s) 1514 at the end of the penstock 1516. The use of multiple power generating elements also may be utilized to smooth the volumetric flow rate curve of working fluid entering the penstock, the ingress of working fluid into which is controlled by a penstock valve 1518.

A variation upon the embodiment shown in FIG. 28A is depicted in FIG. 28B wherein a collection chamber 1580 is coupled to the penstock inlet valve 1518. Each of the power generating systems output to the collection chamber 1580 via returns. For example, the first power generating system 1500 in FIG. 28B is shown coupled to the collection chamber 1580 via a first return connecting pipe 1582 and valve 1584. The second power generating system 1502 is shown coupled to the collection chamber 1580 via a second return connecting pipe 1562 and valve 1586. Additional power generating systems may be coupled to the collection chamber 1580, such as third 1566 and fourth 1568 returns, and more if desired, each being coupled to the chamber 1580 at a valve (not shown). The use of a collection chamber 1580 allows for the power generating systems employed to transfer working fluid lifted by the pontoons to the chamber at a variable flow rate. The penstock inlet valve 1518 may then be used to control the flow rate of working fluid entering the penstock 1516. This embodiment is preferred over direct transfer from a power generating system to the penstock because a more consistent power generation output may be achieved, and as desired in power distribution situations wherein fluctuating demand requires also the ability to control the flow rate, for example by increasing or decreasing as necessary to meet demand.

Note that many other elements may be incorporated into the power generating elements shown in FIGS. 28A and 28B to suit the needs of a particular application. For instance, gate turbines, as described in connection with FIG. 25, may optionally be utilized to capture flow energy at the power chamber inlets. The use of other variations and comparable equivalents described herein are considered disclosed in any practicable combination, such as return system and return station embodiments, means for draining and refilling the pontoon chambers to nullify and re-establish pontoon buoyancy, the use of cradles systems, and the like.

Figure 29:
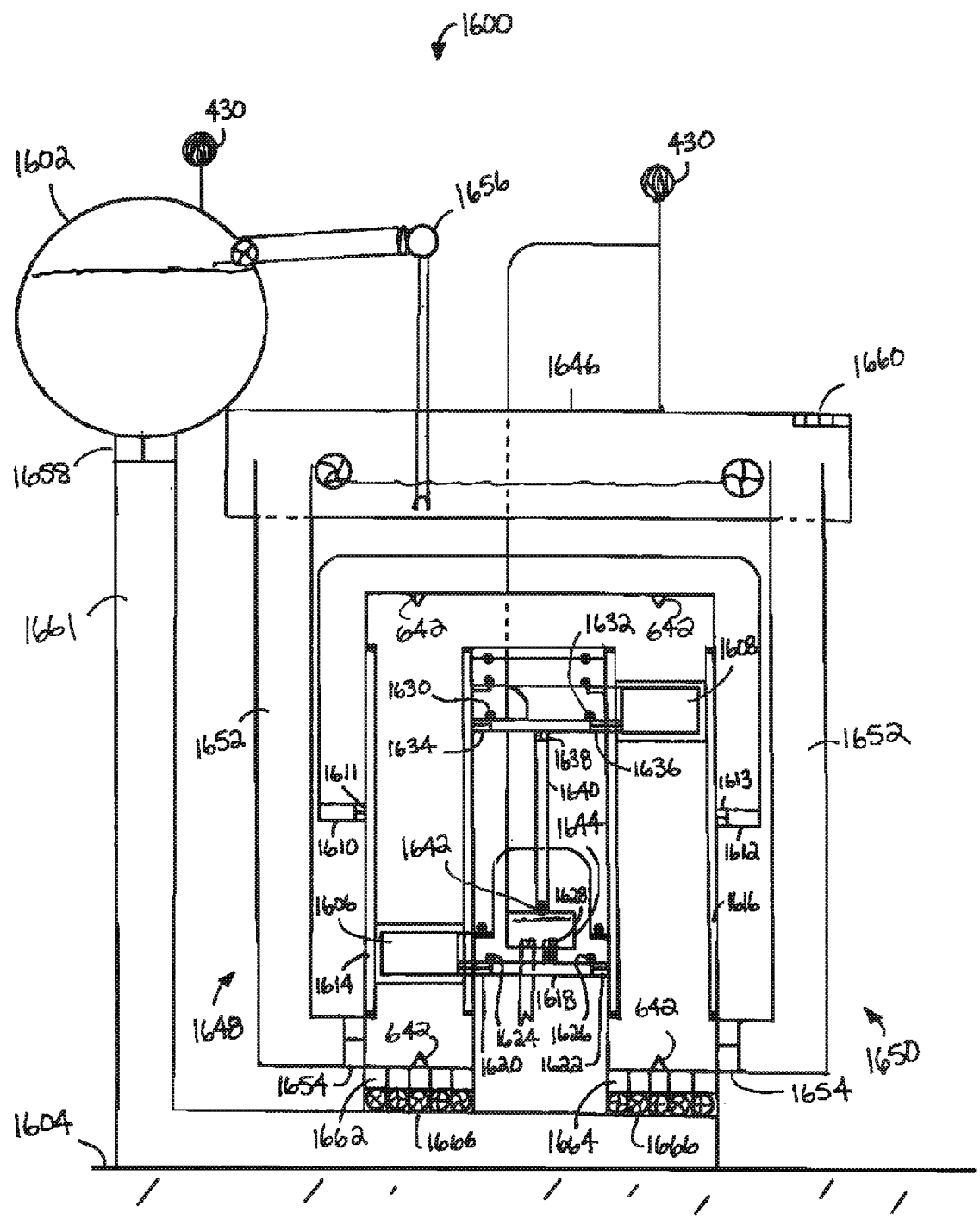
FIG. 29 depicts a further embodiment of the invention wherein the reservoir is contained within a tank.
Figure 30:
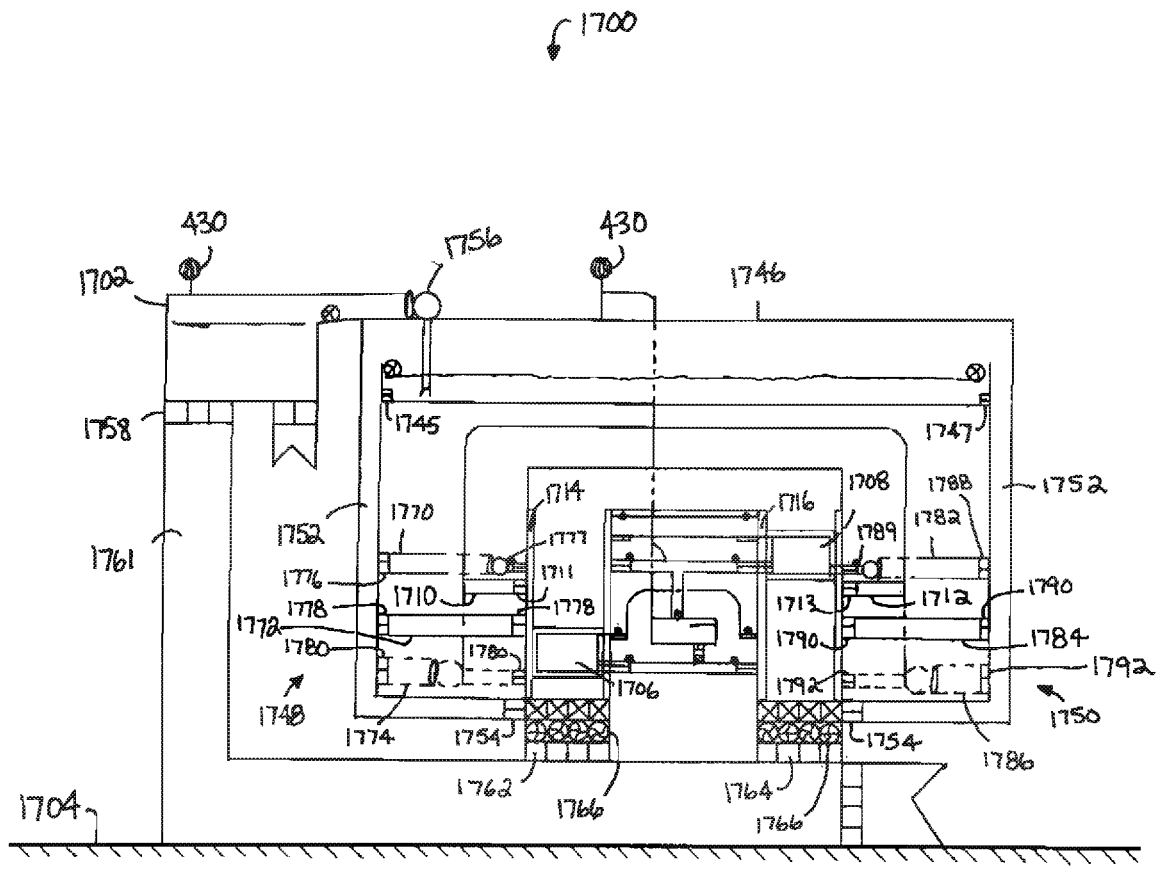
FIG. 30 depicts a further embodiment of the invention wherein the reservoir is contained within a tank.

Many references throughout have been made to reservoirs in general, whether the plants operate in man-made bodies of water, natural bodies of water, inside of containers or tanks, or other such reservoirs as previously described herein. FIGS. 29-30 illustrate that the term reservoir applies generally to the reference head of working fluid in which the system operates, and thus can be embodied as a reservoir in a tank, wherein the return systems are connected directly to the input for the power chambers. For example, plants 1600 in FIGS. 29 and 1700 in FIG. 30 are respectively equipped with reservoir tanks 1602 and 1702, allowing operation of the invention surrounded by air—e.g., resting upon the ground or other such surface or platform 1604 and 1704. The power generation in both plants 1600 and 1700 occur as described in connection with FIGS. 24-27 generally, and the main difference between the two embodiments exists in the means for reciprocally draining and refilling their first and second pontoon chambers.

In FIG. 29, the working fluid is reciprocally exchanged between the first 1606 and second 1608 pontoons, as previously described herein. The first 1610 and second 1612 pontoon chamber compartments are positioned to receive approximately half of the volumetric contents of their respective first 1614 and second 1616 pontoon chambers, via valves 1611 and 1613 respectively, which in turn close after draining a portion of the working fluid in the corresponding pontoon chamber. The remaining portion of the working fluid from either pontoon chamber flows into the common pontoon feed pipe 1618 and via a connection made between a pontoon an its opposing pontoon chamber by first 1620 and second 1622 multipurpose systems first 1624 and second 1626 valves, respectively. A small portion of the working fluid from the pontoon chamber being drained may need to be pumped via the multipurpose system (i.e., 1620 or 1622) due to equilibrium being reached near the end of the pontoon chamber draining process. In the case of the system state shown specifically in FIG. 29, wherein the second pontoon chamber 1616 is being drained to negate the buoyancy of the second pontoon 1608, valve 1613 is opened, the second pontoon chamber compartment 1612 is filled with a portion of the working fluid that needs drained, valve 1613 is closed, valves 1620 and 1622 are opened until the working fluid in the first pontoon 1606 and second pontoon chamber 1616 have reach equilibrium, at which point valve 1622 is closed and the multipurpose systems 1624 and 1626 cooperate to pump the remaining working fluid in the pontoon chamber into the feed pipe 1618 and/or the pontoon 1606, and the turbine chamber valve 1628 is opened to fill the remaining volume of unused space in the first pontoon 1606 via hydrostatic pressure. Once filled, the connections to the pontoon 1606 are closed off, enabling the pontoon to lift its contents and travel along the pontoon chamber 1614 due to the pressure differential created between the first power chamber inlet 1662 the second return system 1650.

Similarly, the second pontoon 1608 is drained in the following manner. First, the first pontoon chamber compartment 1610 is emptied of its contents via valve 1611 into the first pontoon chamber 1614, after which the valve 1611 is closed. Then, the first 1630 and second 1632 multipurpose systems open first 1634 and second 1636 upper connecting valves to create a connection between the first pontoon chamber 1614 and the second pontoon 1608, and the is thereby transferred from the pontoon 1608 into the first pontoon chamber 1614 until equilibrium is reached. At that point, the first 1630 and second 1632 upper multipurpose systems cooperate to pump working fluid from the pontoon 1608 until the first pontoon chamber is filled 1614. Valve 1634 is closed, and penstock inlet valve 1638 is opened, allowing the remaining working fluid in the second pontoon 1608 to flow into the penstock 1640, through the turbine generator 1642 and into the turbine chamber 1644 where it will be returned to the first pontoon 1606 to be carried up on the next stroke.

The remaining components of the system 1600 operate in a similar fashion to those described above. An integrated fountain-type return station 1646 is fed by first 1648 and second 1650 return systems. Each return system is provided with an evacuation tube 1652 that receives working fluid from its respective power chamber via an evacuation tube inlet valve 1654. One or more evacuation pumps 1656 transfers the working fluid from the integral return station 1646 to the reference head of working fluid in the reservoir tank 1602. Reservoir tank valve 1658 is preferably open during operation and used when draining the working fluid from the system for maintenance, and initialization and maintenance valve 1660 is used for access, maintenance and for the initial introduction of working fluid into the system.

Finally, a supply line 1661 directs the working fluid from the reservoir tank 1602 to the power chambers. The working fluid flow into the power chambers is reciprocating and controlled by the first 1662 and second 1664 power chamber valves. Gate turbines 1666 are also preferably placed at the entrance to the power chambers to convert flow energy into power.

FIG. 30, on the other hand, represents an alternative means for reciprocally draining and refilling the first 1714 and second 1716 pontoon chambers in which the first 1748 and second 1750 return systems are connected to the pontoon chambers via several connections. The first return system 1748 is connected to the first pontoon chamber 1714 via upper 1770, middle 1772 and lower 1774 bridge connections, each being connected via actuatable valves 1776, 1778 and 1780 respectively. The second return system 1750 is connected to the second pontoon chamber 1716 via upper 1782, 1784 and 1786 bridge connections, each being connected via actuatable valves 1788, 1790 and 1792, respectively. The first 1770 and second 1782 upper bridge connections are coupled to the power chambers with first 1777 and second 1789 outer multipurpose systems as well. The multipurpose systems connect to each of the pontoons 1706 and 1708 to open a connection via 1770 and 1782, respectively, in order to evacuate the portion of pontoon chamber working fluid received from each pontoon's opposing pontoon chamber. The pontoon chamber compartments 1710 and 1712 operate as described in connection with FIG. 29. The multipurpose systems 1777 and 1789 are also equipped with pumps for use in transferring the working fluid portion from the pontoons 1706 and 1708 to the evacuation tubes 1752.

Since working fluid drained from a pontoon chamber into the return system must be put back into a pontoon chamber, optional return system flowback valves 1745 and 1747 are provided to assist by permitting the working fluid in the integral return station 1746 to bypass its fountain system, thereby increasing the head seen at the bridge connections 1772 and 1784 that are connected to the return systems 1748 and 1750, respectively. Thus, valves 1778 are opened (after draining the middle compartments 1710 and 1712 via valves 1711 and 1713, respectively) and working fluid flows into the first pontoon chamber 1714 to refill the remaining volume and re-establish buoyancy, and likewise for the second pontoon chamber 1716. The optional lower bridge connections 1774 and 1786 are also provided with optional pumps, and are auxiliary components not normally needed in the operation of the system 1700 except for maintenance and access purposes.

In both FIGS. 29 and 30, note that optional mechanized systems 642 may be employed as desired depending upon the application and particular materials used, to lift, align or guide the movement of the bladder systems/coil tubes.

Figure 31:
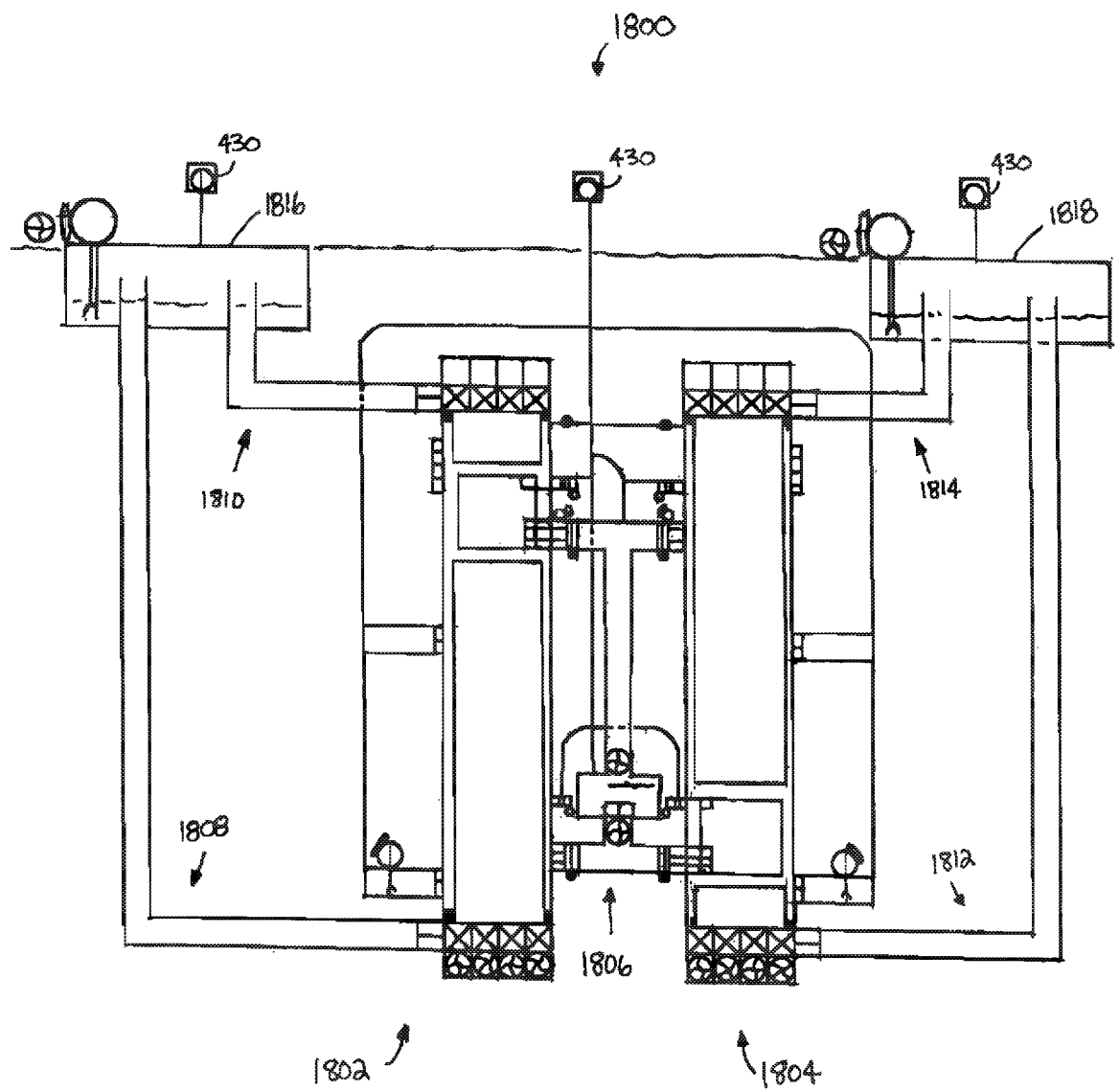
FIG. 31 depicts an embodiment of the integration of two single power chamber systems as a means for replenishing a dam.

FIG. 31 simply demonstrates that the systems and methods described in detail herein may be combined, as will now be evident to those skilled in the art, in various combinations, such as a plant 1800 that utilizes at least two single-chamber systems 1802 and 1804 interconnected with an artificial dam 1806 as the primary power generating means. The single systems 1802 and 1804 operate similarly to the exemplary embodiment described in connection with FIG. 14, but includes return systems 1808, 1810, 1812 and 1814 and integral return stations 1816 and 1818 without the use of an artificial head system.

Figure 32:
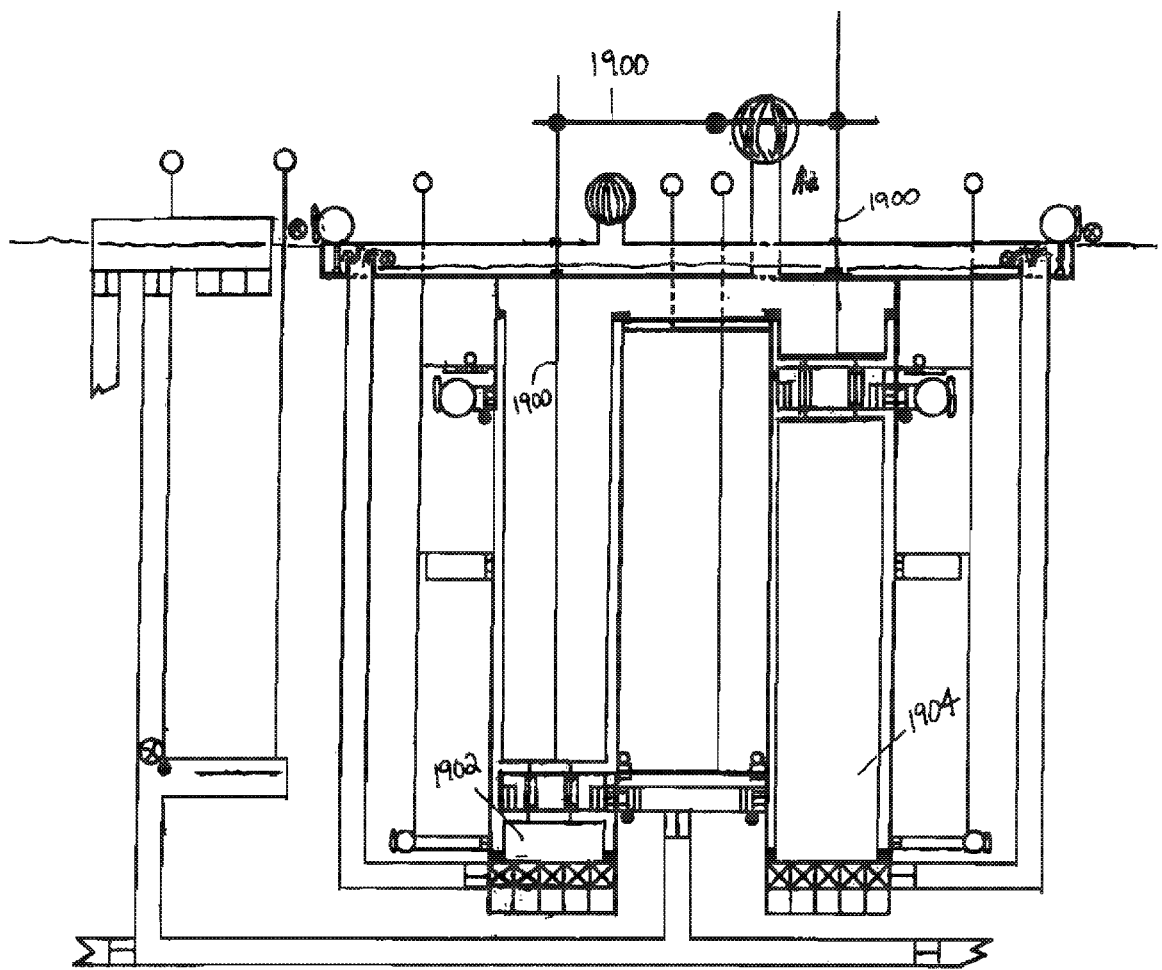
FIG. 32 depicts a further embodiment of the invention wherein the constant volumetric region is replaced with a mechanical connection system.
Figure 33:
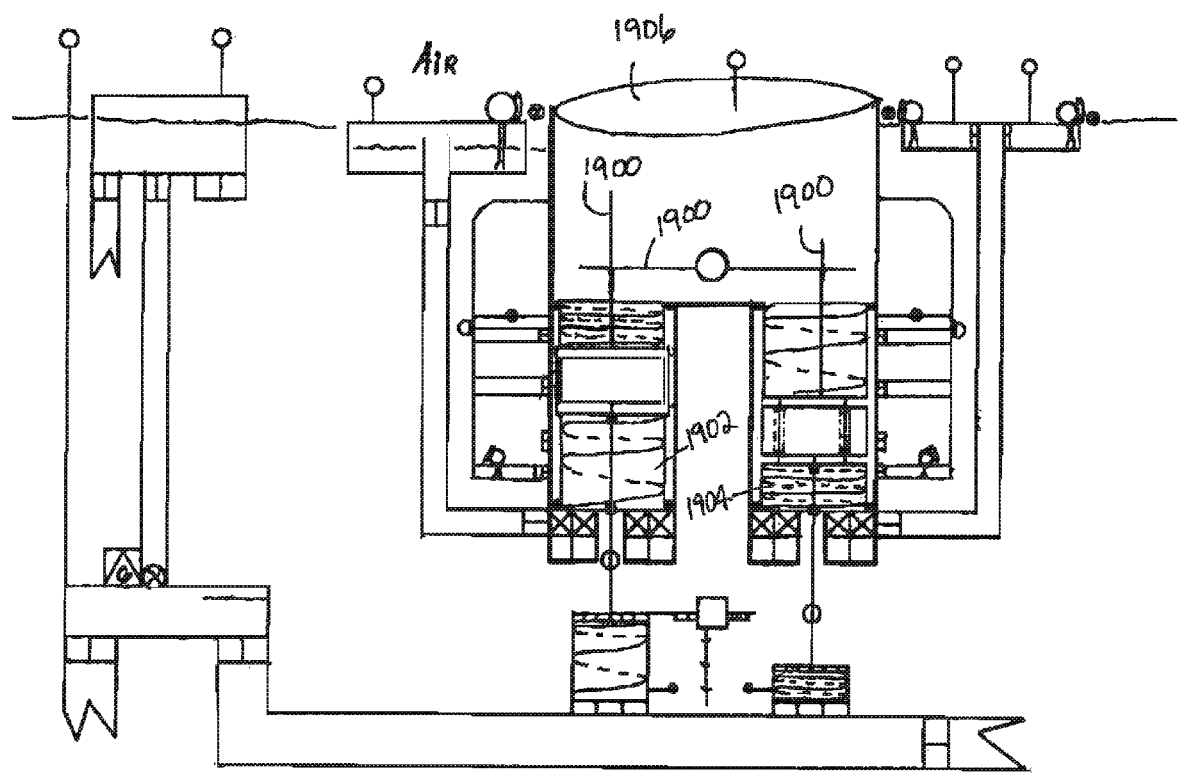
FIG. 33 depicts a further embodiment of the invention wherein the constant volumetric region is replaced with a mechanical connection system.

FIGS. 32-33 illustrate that constant volumetric regions may be open to atmosphere, wherein mechanical connections 1900 can be used in place of a working fluid to translate the pressure differentials created by normal operation of the plant between the first 1902 and second 1904 power chambers. FIG. 32 is a variation of FIG. 20 with a mechanical connection 1900 used in place of the constant volumetric region, and FIG. 33 is a variation of FIG. 15 with a mechanical connection 1900 used in place of the constant volumetric region encapsulated within a protective chamber 1906.

Figure 34:
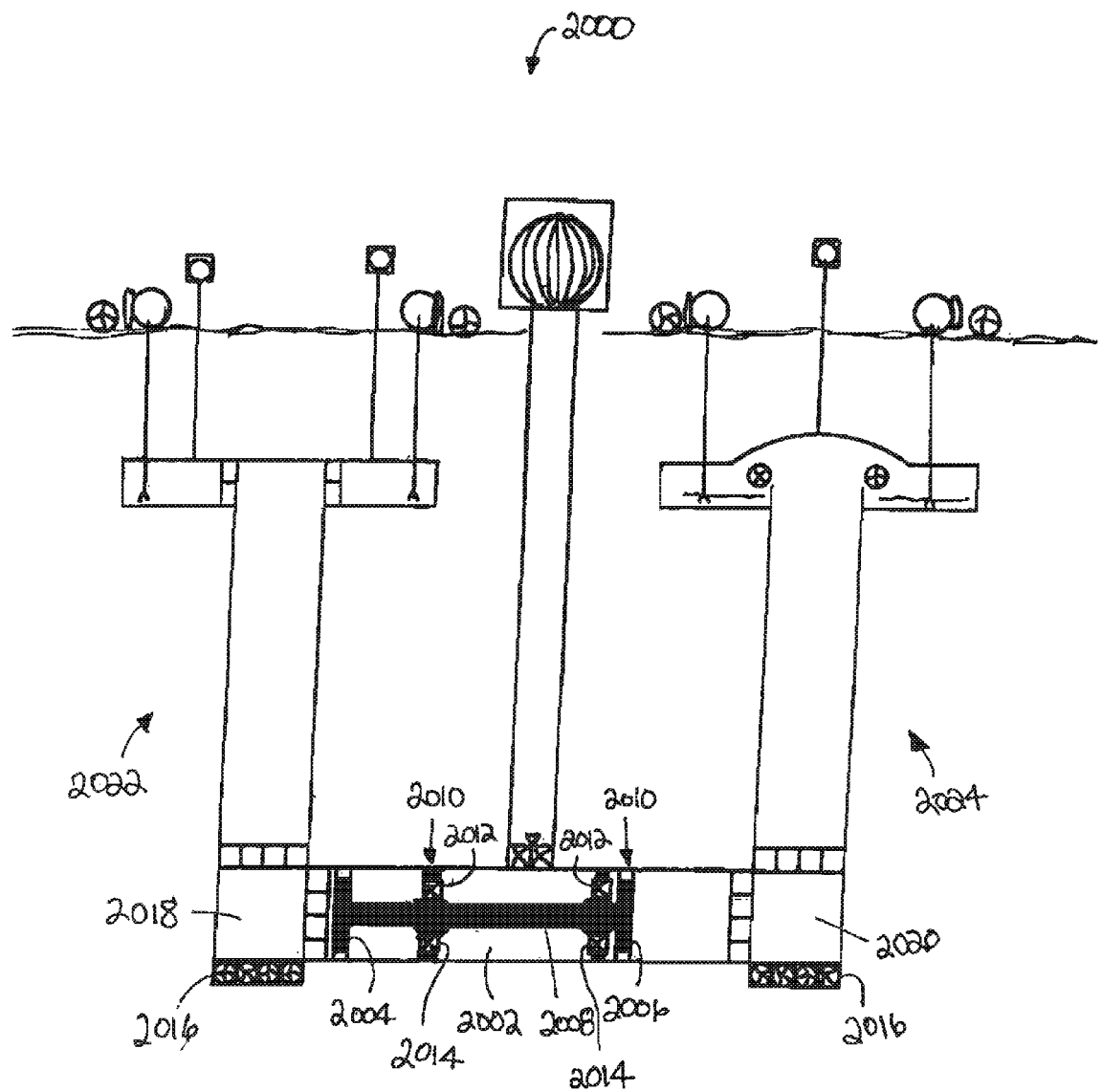
FIG. 34 depicts a further embodiment of the invention wherein the constant volumetric region is positioned at a low end of the pontoon chamber.
Figure 35:
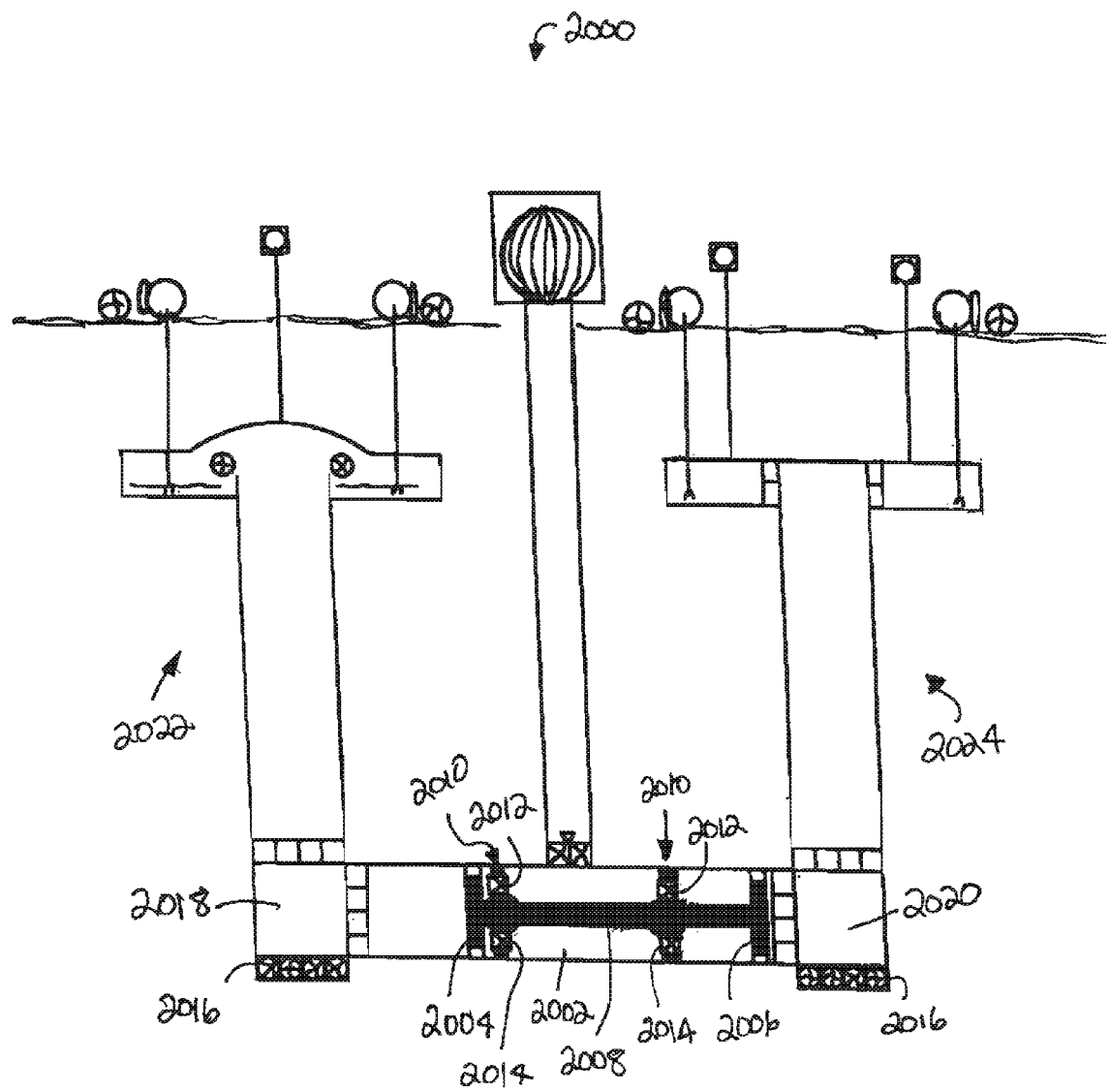
FIG. 35 depicts the embodiment shown in FIG. 34 at a later position in the power cycle.

Finally, FIGS. 34-35 illustrate that vertical and horizontal positioning may be interchangeable in the given systems, wherein orientation is not meant to be limiting. In this exemplary embodiment 2000, the constant volumetric region 2002 is defined at movable boundary ends 2004 and 2006 connected by rod 2008. The region 2002 can be air or water filled, and is preferably provided with one or more baffles 2010. The baffles 2010 may be further provided with turbines or other such generators, such as 2012 and 2014. Note that, in this embodiment turbines 2012 allow flow in one direction, and turbines 2014 allow flow in the other. Less or more turbines can be used, in combination with bypass valves as an alternative, for instance. Finally, gate turbines 2016 are placed at the power chamber 2018 and 2020 inlets, which operate with the first 2022 and second 2024 return systems to cycle as previously described herein.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for generating power from a fluid in a reservoir, comprising:
a power station comprising:
a first power chamber having an external valve actuatable to control flow of the fluid between the reservoir and the first power chamber;
a first upper coil tube having fixed and free ends, the fixed end thereof being secured at a first upper seal to an interior wall of the first power chamber, and the free end thereof forming a first movable boundary;
a first lower coil tube having fixed and free ends, the fixed end thereof being secured at a first lower seal to the interior wall of the first power chamber below the first upper seal, whereby the first upper seal and the first lower seal define a first pontoon chamber;
a first pontoon positioned between the free ends of the first upper coil tube and the first lower coil tube;
a second power chamber having an external valve actuatable to control flow of the fluid between the reservoir and the second power chamber;
a second upper coil tube having fixed and free ends, the fixed end thereof being secured at a second upper seal to an interior wall of the second power chamber, and the free end thereof forming a second movable boundary;
a second lower coil tube having fixed and free ends, the fixed end thereof being secured at a second lower seal to the interior wall of the second power chamber below the second upper seal, whereby the second upper seal and the first lower seal define a second pontoon chamber;
a second pontoon positioned between the free ends of the second upper coil tube and the second lower coil tube;
a connecting pipe coupled to the first power chamber and the second power chamber; and
a constant volumetric flow region defined by the first movable boundary and the second movable boundary, wherein the first and second movable boundaries move synchronously, thereby maintaining the volume of the constant volumetric flow region during movement induced by pressure differentials in the power station;
a first return system in fluid receiving connection with the first power chamber at a first attachment point;
a second return system in fluid receiving connection with the second power chamber at a second attachment point;
at least one return station in fluid receiving connection with the first and second return systems at a return station valve;
a return station pump adapted to pump the fluid received by the at least one return station into the reservoir; and
a means for reciprocally draining and filling the first and second pontoon chambers.

2. The apparatus of claim 1, further comprising an integral return station in fluid receiving connection with the first return system and the second return system.

3. The apparatus of claim 2, wherein the integral return station is adapted to receive fluid from the first return system at a first fountain connection and from the second return system at a second fountain connection by hydrostatic pressure.

4. The apparatus of claim 3, wherein the integral return station further comprises at least one return station pump adapted to pump the fluid received by the integral return station into the reservoir.

5. The apparatus of claim 1, wherein the at least one return station comprises:
a first return station in fluid receiving connection with the first return system at a first return station valve;
a second return station in fluid receiving connection with the first return system at a second return station valve;
a third return station in fluid receiving connection with the second return system at a third return station valve; and
a fourth return station in fluid receiving connection with the second return system at a fourth return station valve,
wherein each return station further comprises a return station pump adapted to pump the fluid received by the return station into the reservoir.

6. The apparatus of claim 1, wherein the means for reciprocally draining and filling the first and second pontoon chambers comprises, for each pontoon chamber:
a middle pontoon chamber compartment coupled to the pontoon chamber at a middle compartment valve;
a lower pontoon chamber compartment coupled to the pontoon chamber at a lower compartment valve;
a pontoon chamber pump adapted to pump working fluid from the lower pontoon chamber compartment to the reservoir; and
a pontoon chamber filling valve in fluid connection with the fluid in the reservoir.

7. The apparatus of claim 1, further comprising a means for replenishing a dam.

8. The apparatus of claim 1, further comprising a replenishment system adapted to return fluid from a low head side of a penstock to a high head side of the penstock.

9. The apparatus of claim 1, further comprising:
a return connecting pipe in actuatable fluid connection with the first and second pontoon chambers and the first and second pontoons at an upper position in each of the first and second pontoon chambers;
a penstock in fluid receiving connection with the return connecting pipe at a penstock inlet valve;
a turbine chamber in fluid receiving connection with the penstock; and
a common feed pipe in actuatable fluid connection with the first and second pontoon chambers and the first and second pontoons at a lower position in each of the first and second pontoon chambers, and in actuatable fluid receiving connection with the turbine chamber,
wherein the common feed pipe is adapted to transfer fluid from the turbine chamber reciprocally to the first and second pontoons at the lower position, the first and second pontoons are adapted to reciprocally transport the fluid to the upper position and transfer the fluid to the penstock via the penstock inlet valve and the return connecting pipe.

10. The apparatus of claim 9, wherein the means for reciprocally draining and filling the first and second pontoon chambers comprises:
a first middle pontoon chamber compartment coupled to the first pontoon chamber at a first middle compartment valve and adapted to receive a first portion of the fluid in the first pontoon chamber via the first middle compartment valve to partially drain the first pontoon chamber; and
a second middle pontoon chamber compartment coupled to the second pontoon chamber at a second middle compartment valve and adapted to receive a first portion of the fluid in the second pontoon chamber via the second middle compartment valve to partially drain the second pontoon chamber;

wherein a second portion of the fluid in the first pontoon chamber is adapted for draining into the second pontoon via the common feed pipe and a second portion of the fluid in the second pontoon chamber is adapted for draining into the first pontoon via the common feed pipe.

* * * * *